United States Patent
Kobayashi

(10) Patent No.: US 9,600,722 B2
(45) Date of Patent: Mar. 21, 2017

(54) EDUCATION SITE IMPROVEMENT SUPPORT SYSTEM, EDUCATION SITE IMPROVEMENT SUPPORT METHOD, INFORMATION PROCESSING APPARATUS, COMMUNICATION TERMINAL, AND CONTROL METHODS AND CONTROL PROGRAMS OF INFORMATION PROCESSING APPARATUS AND COMMUNICATION TERMINAL

(71) Applicant: NEC Corporation, Tokyo (JP)

(72) Inventor: Yoshikazu Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 98 days.

(21) Appl. No.: 14/433,484

(22) PCT Filed: Sep. 9, 2013

(86) PCT No.: PCT/JP2013/074190
§ 371 (c)(1),
(2) Date: Apr. 3, 2015

(87) PCT Pub. No.: WO2014/054385
PCT Pub. Date: Apr. 10, 2014

(65) Prior Publication Data
US 2015/0294151 A1    Oct. 15, 2015

(30) Foreign Application Priority Data
Oct. 5, 2012   (JP) .................................. 2012-222792

(51) Int. Cl.
*G06K 9/00* (2006.01)
*G06Q 50/20* (2012.01)
(Continued)

(52) U.S. Cl.
CPC ... *G06K 9/00624* (2013.01); *G06F 17/30256* (2013.01); *G06K 9/00335* (2013.01);
(Continued)

(58) Field of Classification Search
CPC ........... G06K 9/00; G06F 17/00; G06Q 10/00
(Continued)

(56) References Cited

U.S. PATENT DOCUMENTS 6,915,104 B2 * 7/2005 Yonezu ................... G09B 5/02
434/322
2008/0075418 A1   3/2008 Hook et al.
(Continued)

FOREIGN PATENT DOCUMENTS

JP      2002-108334 A      4/2002
JP      2003-331064 A      11/2003
(Continued)

OTHER PUBLICATIONS

Miyuki Sakashita, "Scheduler o Mochiita Jukyu Management Gakushu Shien System no Kaihatsu", Heisei 20 Nendo Shunki Taikai Yokoshu, Japan Industrial Management Association, May 10, 2008 (May 10, 2008), pp. 10 to 11 (4 pages total).
(Continued)

*Primary Examiner* — Abolfazl Tabatabai
(74) *Attorney, Agent, or Firm* — Wilmer Cutler Pickering Hale and Dorr LLP

(57) ABSTRACT

An apparatus of this invention is directed to an information processing apparatus that aims to improve the quality of the ITC education based on the history of reactions or evaluations to education conducted by different educators to different educatees in different education site environments in education using education application software. An information processing apparatus includes an education site history accumulator that accumulates the history of pieces of (Continued)

education site information representing the reactions or evaluations of education site participants including an educator and an educatee at an education site using an education application software, and the education application software in association with each other, an education site information receiver that receives, from a communication terminal, the pieces of education site information acquired by the communication terminal or a device connected to the communication terminal, and an analysis information generator that generates analysis information of the education site from the received pieces of education site information and the history of the pieces of education site information.

21 Claims, 68 Drawing Sheets

(51) Int. Cl.
| | | |
|---|---|---|
| *G09B 19/00* | (2006.01) | |
| *G06Q 10/10* | (2012.01) | |
| *G06F 17/30* | (2006.01) | |
| *G06K 9/62* | (2006.01) | |
| *G09B 7/00* | (2006.01) | |
| *G09B 25/00* | (2006.01) | |

(52) U.S. Cl.
CPC ........... *G06K 9/6267* (2013.01); *G06Q 10/10* (2013.01); *G06Q 50/20* (2013.01); *G09B 19/00* (2013.01)

(58) Field of Classification Search
USPC .......... 382/103, 236; 348/169; 434/322, 365
See application file for complete search history.

(56) References Cited

U.S. PATENT DOCUMENTS

| 2013/0285909 A1 | 10/2013 | Patel et al. |
| 2014/0045154 A1 | 2/2014 | Hook et al. |

FOREIGN PATENT DOCUMENTS

| JP | 2006-201281 A | 8/2006 |
| JP | 2007-097668 A | 4/2007 |
| JP | 2007-178641 A | 7/2007 |
| JP | 2008-33732 A | 2/2008 |
| JP | 2009-128458 A | 6/2009 |
| WO | WO-2012/088443 A1 | 6/2012 |

OTHER PUBLICATIONS

International Search Report corresponding to PCT/JP2013/074190 mailed Nov. 26, 2013 (2 pages).
Extended European Search Report issued by the European Patent Office for Application No. 13843586.2 dated May 4, 2016 (8 pages).
Japanese Office Action issued by the Japan Patent Office for Application No. 2012-222792 dated Jul. 7, 2016 (13 pages).

\* cited by examiner

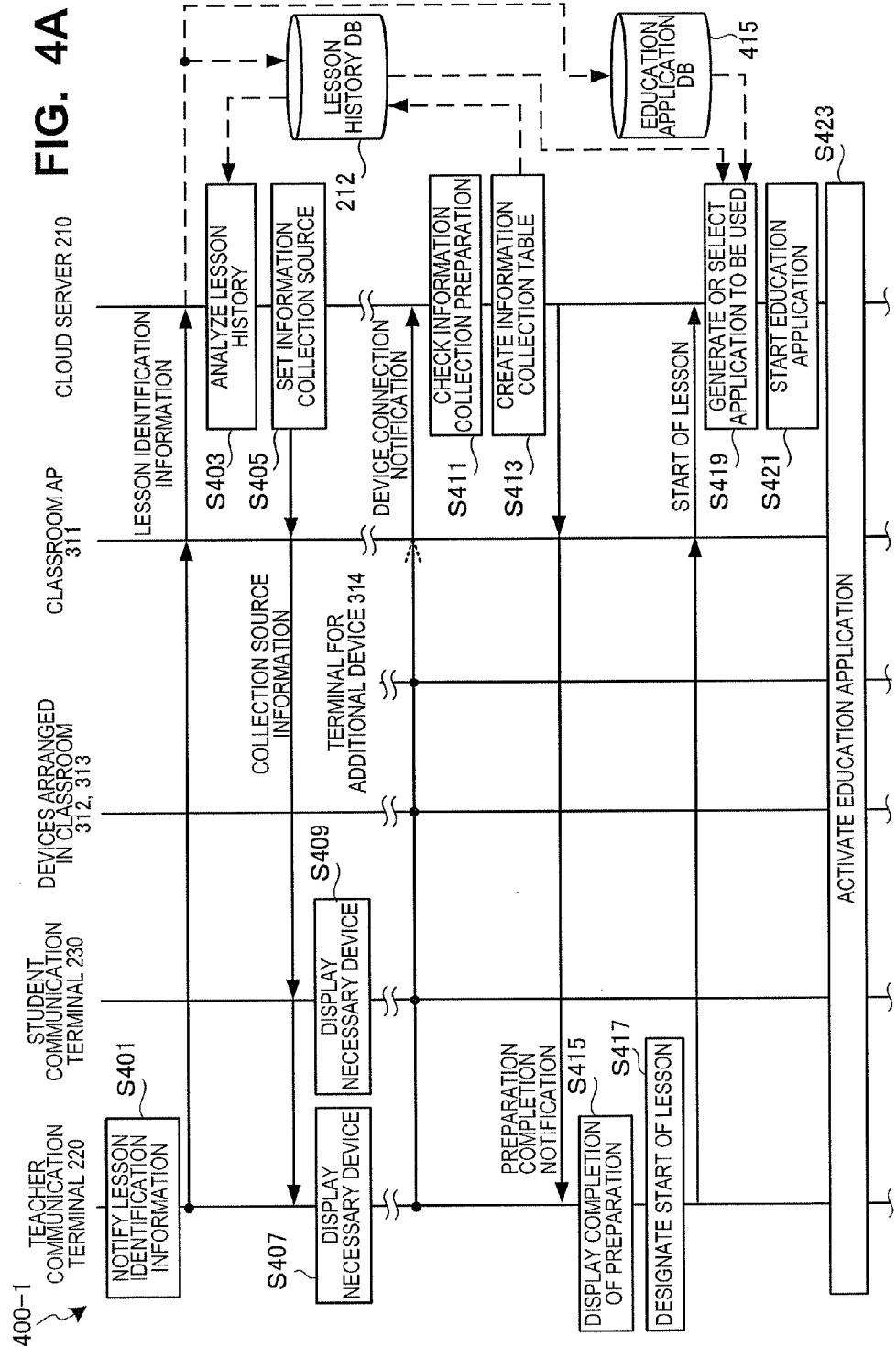

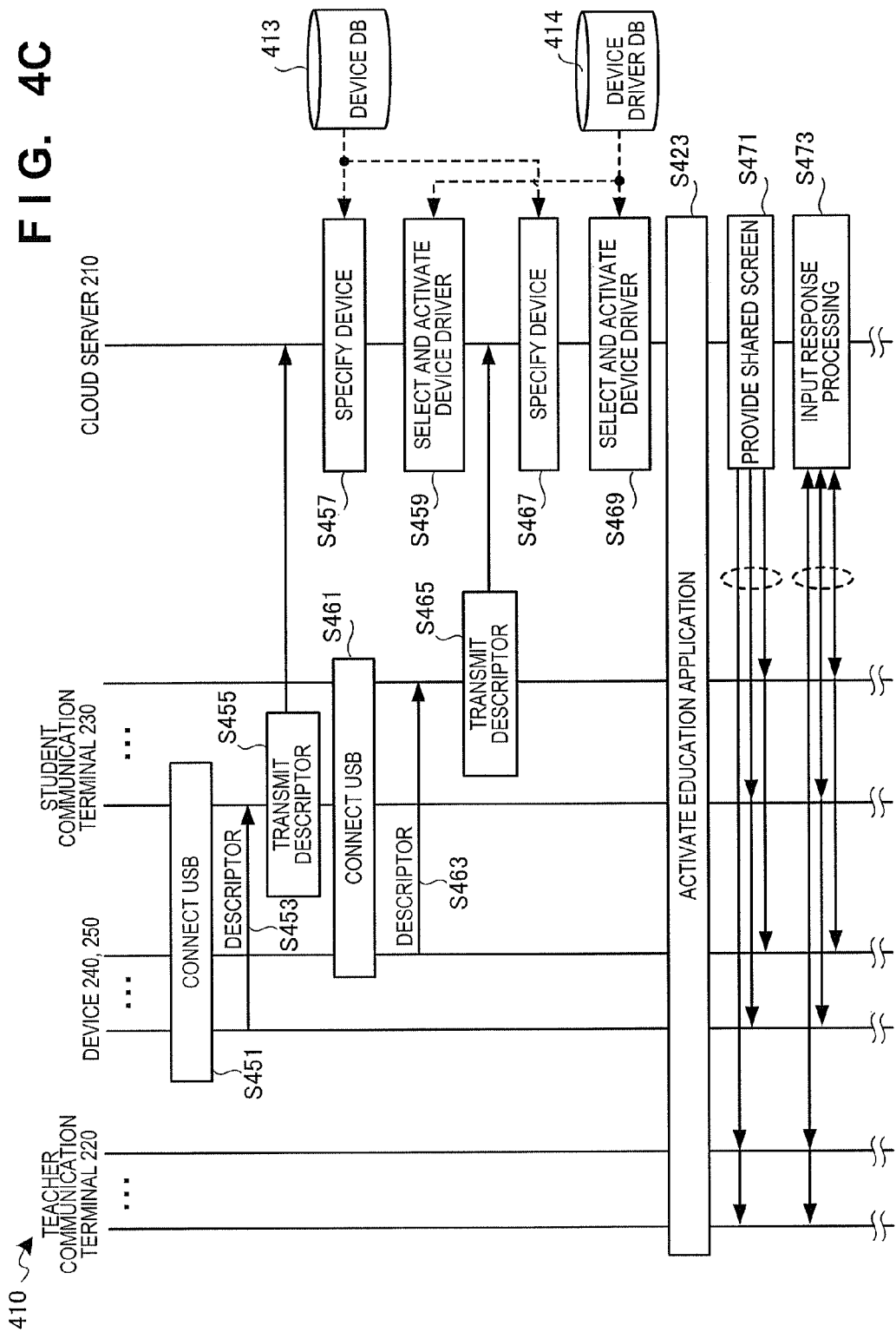

| USER ID 701 | USER AUTHENTICATION (PASSWORD) 702 | TEACHER/STUDENT/ ANOTHER 703 | NATIONALITY 704 | USED LANGUAGE 705 | SCHOOL ID 706 | ADDRESS 707 | CLASS ID 708 | OTHERS (AGE/SEX/HISTORY...) 709 |
|---|---|---|---|---|---|---|---|---|
| U00001 | abcdefg | TEACHER | USA | ENGLISH | S0001 | TOKYO | C01 | AGE 35/FEMALE/... |
| U00002 | hijklmn | STUDENT | JAPAN | JAPANESE | S0001 | KANAGAWA | C01 | AGE 11/MALE/... |
| ... | | | | | | | | |

Table 810 (811-815):

| EDUCATION APPLICATION ID | COUNTRY | GRADE | SUBJECT | TARGET CLASS ||| |
|---|---|---|---|---|---|---|
| | | | | TEACHER INFORMATION | NUMBER OF STUDENTS IN CLASS | CLASS INFORMATION |
| A000001 | JAPAN | FIFTH GRADE OF ELEMENTARY SCHOOL | ENGLISH | USA, FEMALE | 15 | LESSON PROGRESS, LEVEL,... |
| A000002 | JAPAN | FOURTH GRADE OF ELEMENTARY SCHOOL | SCIENCE | JAPAN, MALE | 21 | LESSON PROGRESS, LEVEL,... |
| ... | | | | | | |

Table 820 (821-822):

| EDUCATION APPLICATION ID | TEACHING MATERIAL ID | COMBINED TOOL ||| |
|---|---|---|---|---|---|
| | | SIMULATION CONTENT | PRACTICE CONTENT | EXPERIMENT CONTENT | |
| A000001 | TM001 | | | | ... |
| | TM002 | | | | |
| A000002 | TM101 | | | | |
| ... | ... | | | | |

FIG. 9A

| LESSON ID | RECEPTION DATE & TIME | ACQUISITION DATE & TIME | USER ID | LESSON IDENTIFICATION INFORMATION ||||| DATA |
| --- | --- | --- | --- | --- | --- | --- | --- | --- | --- |
| | | | | COUNTRY ID | SCHOOL ID | CLASS ID | TEACHER ID | USE APPLICATION ID | ... |
| L000001 | 2012/09/21 | 2012/09/18 | U00001 | N001 | S0001 | C01 | T0001 | A000001 | |
| L000010 | 2012/10/01 | 2012/09/27 | U00002 | N005 | S0002 | C03 | T0010 | A000010 | |
| ... | | | | | | | | | |

212

| LESSON ID | LESSON IDENTIFICATION INFORMATION 922 | | | | | LESSON DATE & TIME 923 | USE APPLICATION ID 924 | ANALYSIS INFORMATION 925 |
|---|---|---|---|---|---|---|---|---|
| | COUNTRY ID 921 | SCHOOL ID | CLASS ID | SUBJECT ID | NUMBER OF STUDENTS | ... | | |
| L000001 | N001 | S0001 | C01 | F001 | 15 | 2012/10/15 | A000001 | |
| | N010 | S0010 | C02 | F012 | 21 | 2012/11/12 | A000010 | |
| | ... | | | | | | | |
| L000002 | N005 | S0002 | C03 | F006 | 17 | 2012/12/04 | A000101 | |
| ... | ... | | | | | | | |

| TEACHER ID | TEACHER INFORMATION ||| ... | CLASS ID | SUBJECT ID | LESSON ID | USE APPLICATION ID | ANALYSIS INFORMATION |
| | COUNTRY ID | SCHOOL ID | HISTORY INFORMATION | | | | | | |
|---|---|---|---|---|---|---|---|---|---|
| T0001 | N001 | S0001 | SUBJECT, QUALIFICATION, SCHOOL TRANSFER,.... | | C01 | F001 | L000001 | A000001 | |
| | | | | | C10 | F001 | L000011 | A000001 | |
| T0002 | N003 | S00011 | SUBJECT, QUALIFICATION, ... | | ... | F010 | L000021 | A000025 | |
| ... | | | | | ... | | | | |

F I G. 9E

212 →

| STUDENT ID 951 | STUDENT INFORMATION 952 | | | | SUBJECT ID 953 | LESSON ID 954 | USE APPLICATION ID 955 | ANALYSIS INFORMATION 956 |
|---|---|---|---|---|---|---|---|---|
| | COUNTRY ID | SCHOOL ID | CLASS ID | STUDENT HISTORY | ... | | | |
| S00001 | N001 | S0001 | C01 | BIRTHDAY, SCHOOL TRANSFER, CLASS CHANGE, PERFORMANCE HISTORY,... | | F001 | L000001 | A000001 | |
| | | | | | | F002 | L001001 | A001001 | |
| | | | | | | ... | ... | ... | |
| S00002 | N001 | S0001 | C01 | BIRTHDAY, CLASS CHANGE, PERFORMANCE HISTORY,... | | F001 | L000001 | A000001 | |
| | | | | | | ... | ... | ... | |
| ... | | | | | | | | | |

{ 950 }

| EDUCATION APPLICATION ID | APPLICATION INFORMATION | | ... | COUNTRY ID | SCHOOL ID | CLASS ID | USED TEACHING MATERIAL ID | COMBINATION OF EXPERIMENT PRACTICE AND SIMULATION | LESSON INFORMATION | ANALYSIS INFORMATION |
|---|---|---|---|---|---|---|---|---|---|---|
| | SUBJECT ID | PROCESS | | | | | | | | |
| A000001 | F001 | ST001 | | N001 | S0001 | C01 | TM001 | E001/SM001 | | |
| A000002 | F001 | ST002 | | N003 | S1001 | C09 | TM011 | E001/SM002 | | |
| ... | | | | N001 | S0002 | C02 | | | | |

| SUCCESSFUL CASE ID | APPLICATION ID | COUNTRY ID | SCHOOL ID | CLASS ID | SUBJECT ID | LESSON ID | TEACHER ID | ... | CASE CONTENT |
|---|---|---|---|---|---|---|---|---|---|
| SS0000001 | A000001 | N001 | S0001 | C01 | F001 | L000001 | T0001 | | |
| SS0000002 | A001002 | N004 | S0101 | C01 | F001 | L001001 | T1010 | | |
| S0000003 | A100005 | N011 | S0033 | C11 | F001 | L000023 | T2003 | | |
| ... | | | | | | | | | |

| CLUB ACTIVITY ID | CLUB ACTIVITY INFORMATION ||||| ACTIVITY DATE & TIME | USE APPLICATION ID | ACTIVITY CONTENT/ ACTIVITY INFORMATION | ANALYSIS INFORMATION |
| --- | --- | --- | --- | --- | --- | --- | --- | --- | --- |
| | COUNTRY ID | SCHOOL ID | TYPE | LEVEL | NUMBER OF MEMBERS | ... | | | |
| CA001 | N001 | S0001 | BASEBALL | | 150 | | 2012/10/15 | A100001 | | |
| | N010 | S0010 | BASEBALL | | 31 | | 2012/11/12 | A100010 | | |
| | ... | | | | | | | | | |
| CA002 | N005 | S0002 | SOCCER | | 49 | | 2012/12/04 | A100101 | | |
| ... | ... | | | | | | | | | |

| LESSON ANALYSIS ALGORITHM ID (1001) | LESSON INFORMATION TO BE COLLECTED (1002) | ANALYSIS INFORMATION (1003) | |
|---|---|---|---|
| LAA0001 | NUMBER OF QUESTIONS, ACCURACY RATE, EXPRESSION, ... | LEVEL OF UNDERSTANDING OF STUDENT | DEGREE OF CONCENTRATION OF STUDENT |
| | | ... | LEVEL OF SATISFACTION OF STUDENT |
| LAA0002 | NUMBER OF QUESTIONS, EXPLANATION TIME, EXPRESSION, ... | LEVEL OF ACHIEVEMENT OF TEACHER | LEVEL OF SATISFACTION OF TEACHER |
| | | ... | ... |
| LAA0003 | QUESTION CONTENT, EXPLANATION CONTENT, EXPRESSION, ... | LEVEL OF ACHIEVEMENT OF LESSON | LEVEL OF ADAPTATION TO LESSON |
| | | ... | ... |
| LAA0004 | CALMNESS, IRRITATION, EXPRESSION, ... | LEVEL OF SATISFACTION OF APPLICATION | LEVEL OF ADAPTATION TO APPLICATION |
| | | ... | ... |
| ... | | | ... |
| LAA1001 | NOISE, DOZING RATE, EXPRESSION, ... | PROGRESS EASY POINT | PROGRESS DIFFICULT POINT |
| | | ... | ... |
| LAA1002 | NUMBER OF OVERLAPPING QUESTIONS, ACCURACY RATE, EXPRESSION, ... | WELL UNDERSTANDING POINT | AVERAGE UNDERSTANDING POINT |
| | | | POOR UNDERSTANDING POINT |

(1010 brackets rows LAA0001–LAA0004; 1020 brackets rows LAA1001–LAA1002; reference 513)

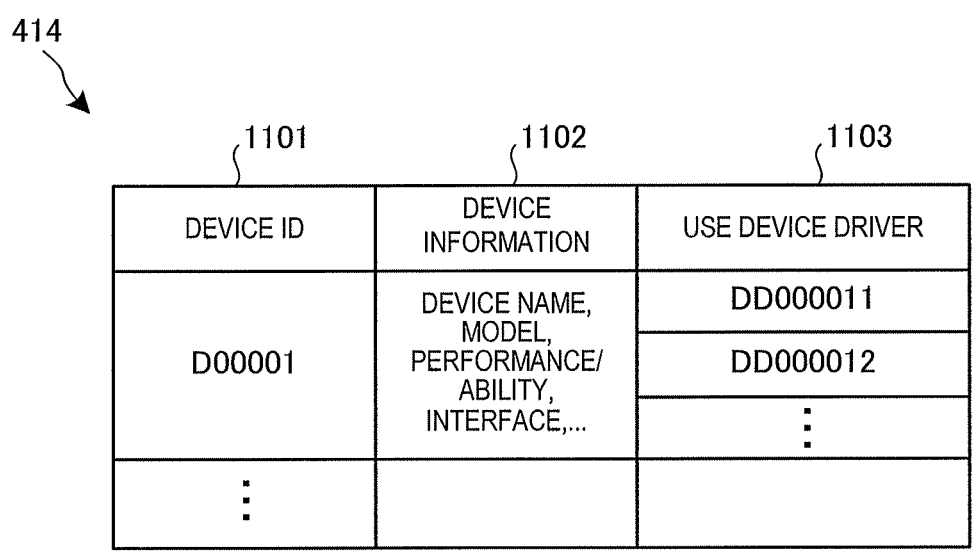
F I G. 11

| LESSON ID | LESSON PROCESS | CLASS ID | USE APPLICATION ID | USE DEVICE | INFORMATION COLLECTION DEVICE (INSTALLATION PLACE) |
|---|---|---|---|---|---|
| L000001 | ST001 | C01 | A000001 | DISPLAY | CAMERA (BACK IN CLASSROOM), MICROPHONE (FRONT IN CLASSROOM) |
| | | C03 | A000010 | DISPLAY, KEYBOARD | CAMERA (ON DISPLAY), MICROPHONE (IN FRONT OF TEACHER) |
| | | ... | | | |

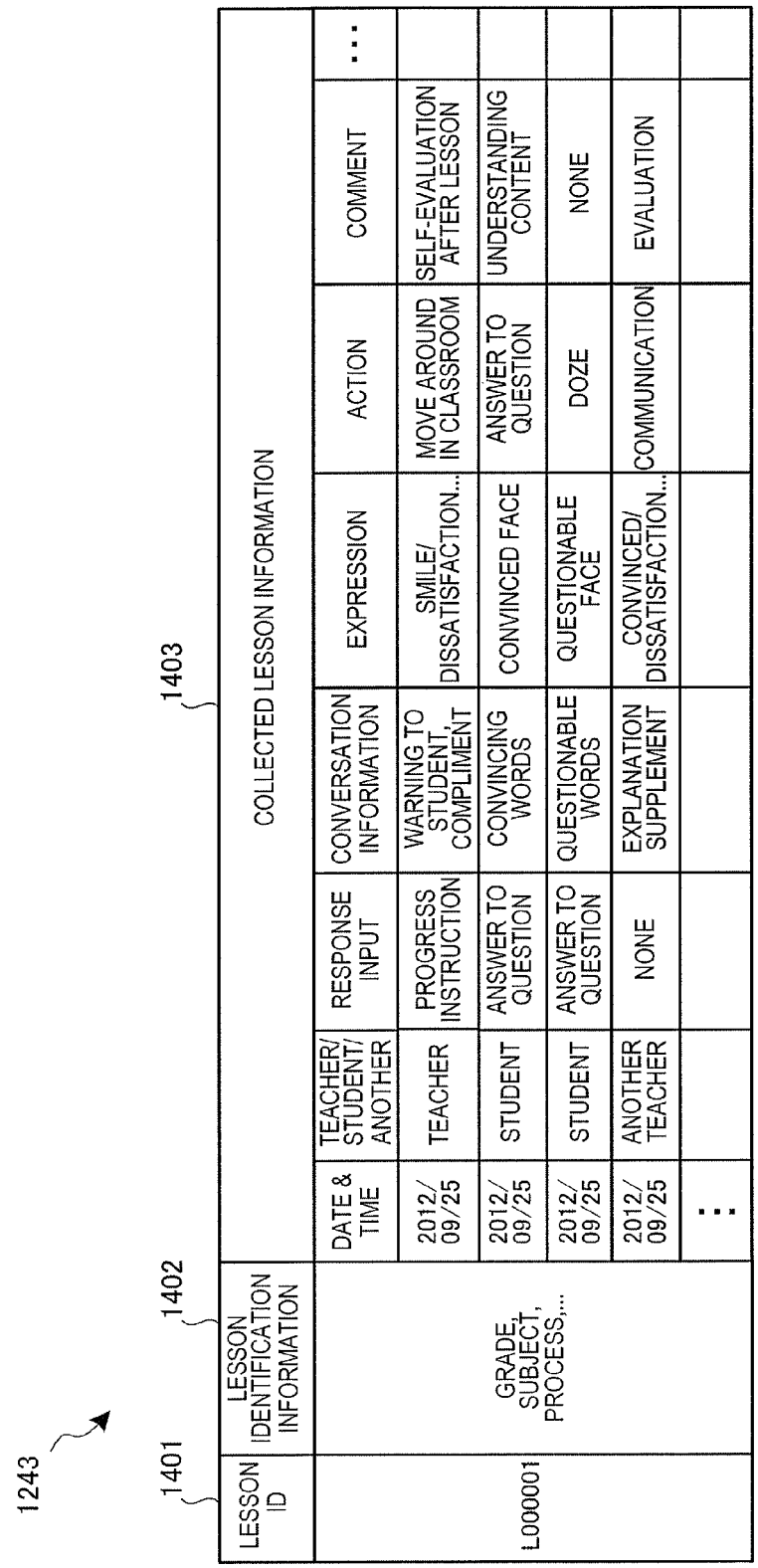

FIG. 14

| LESSON ID | LESSON IDENTIFICATION INFORMATION | COLLECTED LESSON INFORMATION | | | | | | | |
|---|---|---|---|---|---|---|---|---|---|
| | | DATE & TIME | TEACHER/ STUDENT/ ANOTHER | RESPONSE INPUT | CONVERSATION INFORMATION | EXPRESSION | ACTION | COMMENT | ... |
| L000001 | GRADE, SUBJECT, PROCESS,... | 2012/ 09/25 | TEACHER | PROGRESS INSTRUCTION | WARNING TO STUDENT, COMPLIMENT | SMILE/ DISSATISFACTION... | MOVE AROUND IN CLASSROOM | SELF-EVALUATION AFTER LESSON | |
| | | 2012/ 09/25 | STUDENT | ANSWER TO QUESTION | CONVINCING WORDS | CONVINCED FACE | ANSWER TO QUESTION | UNDERSTANDING CONTENT | |
| | | 2012/ 09/25 | STUDENT | ANSWER TO QUESTION | QUESTIONABLE WORDS | QUESTIONABLE FACE | DOZE | NONE | |
| | | 2012/ 09/25 | ANOTHER TEACHER | NONE | EXPLANATION SUPPLEMENT | CONVINCED/ DISSATISFACTION... | COMMUNICATION | EVALUATION | |
| | | ... | | | | | | | |

| USER ID | TRANSMISSION DESTINATION ADDRESS | TEACHER/STUDENT/ ANOTHER | USED LESSON ANALYSIS ALGORITHM | ANALYSIS INFORMATION | PRESENTATION INFORMATION | | |
|---|---|---|---|---|---|---|---|
| | | | | | TEXT | DRAWING | VOICE |
| U000001 | URLxxxx1 | TEACHER | LAA1002 | | | | |
| U000002 | URLxxxx2 | STUDENT | LAA0001 | | | | |
| ... | | | | | | | |

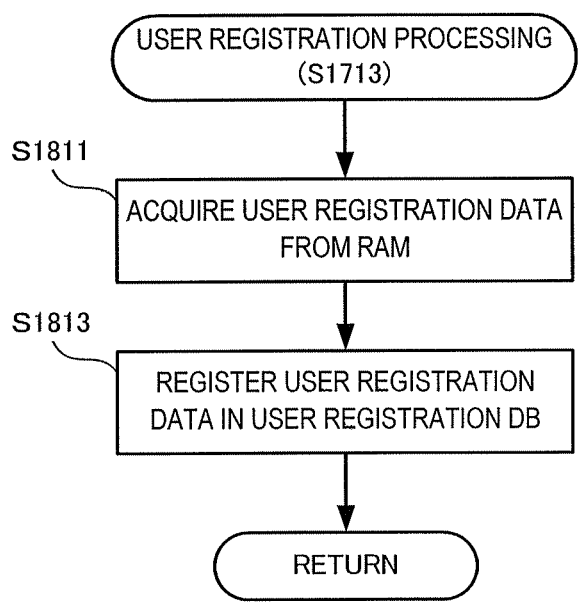
F I G. 18A

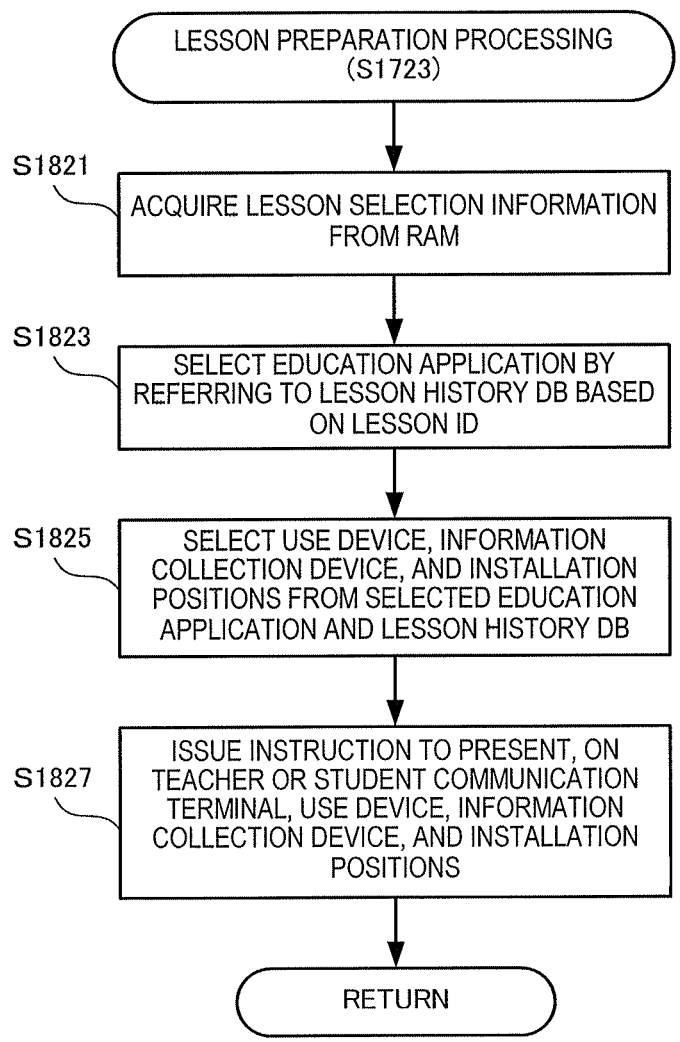
F I G. 18B

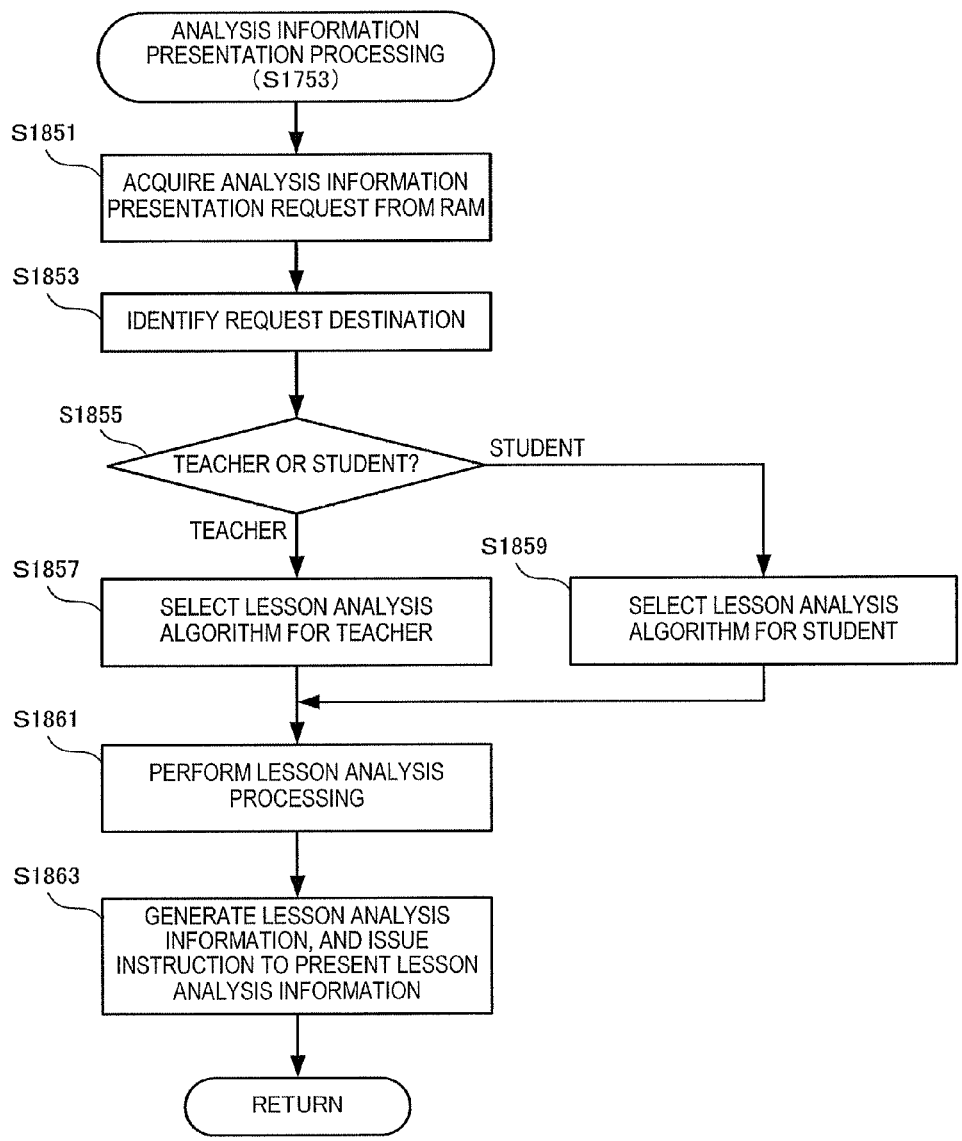
F I G. 18E

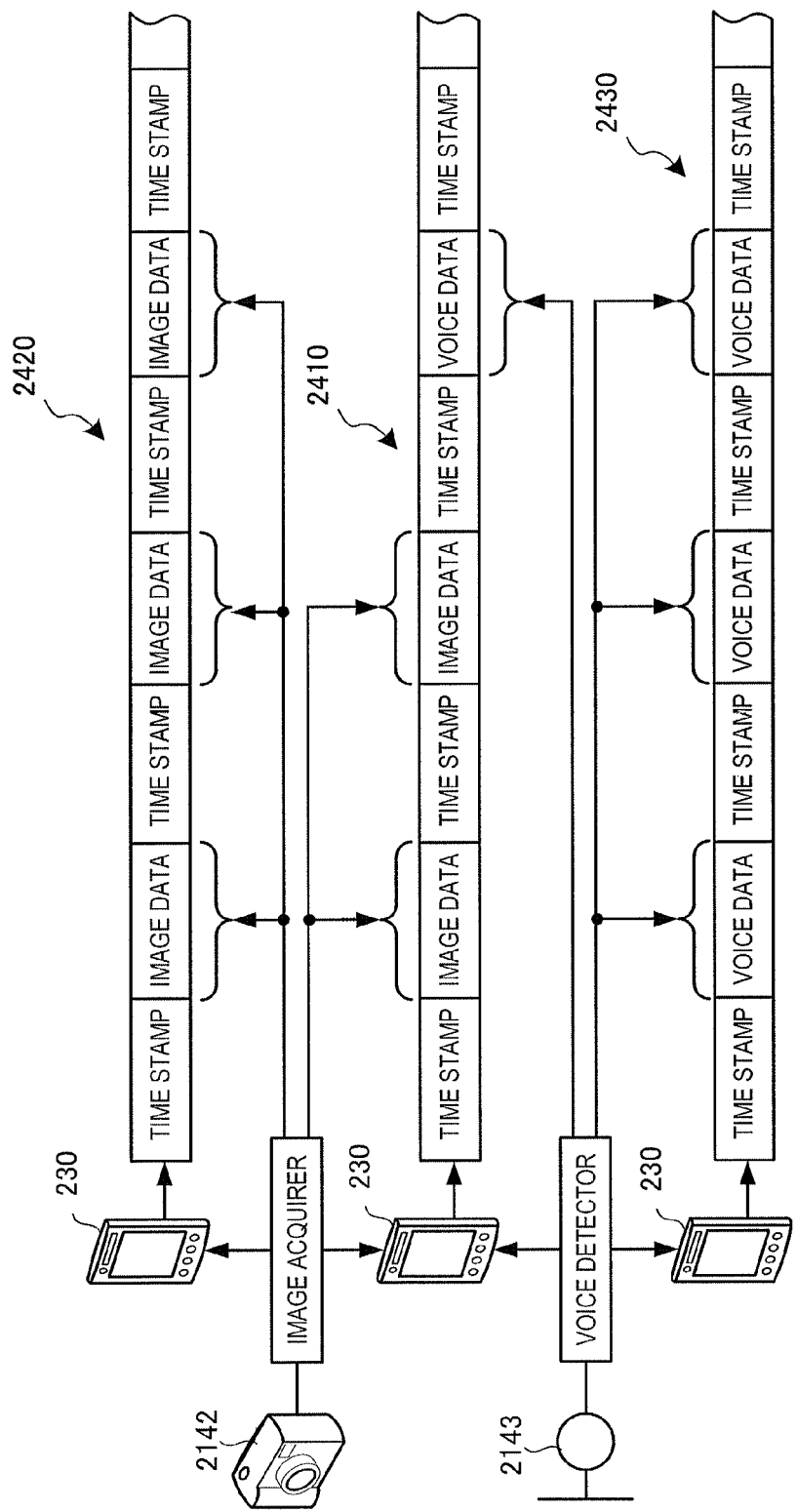
F I G. 24

FIG. 25B

| COUNTRY | VOICE | | | ... | EXPRESSION | | | ... | RESPONSE | | | ... | INTERMEDIATE INFORMATION (REACTION) | | | | ... |
|---|---|---|---|---|---|---|---|---|---|---|---|---|---|---|---|---|---|
| | STRONG/WEAK | HIGH/LOW | FAST/SLOW | ... | SMILING FACE | ANGRY FACE | CRYING FACE | LONELY FACE | PRESENCE/ABSENCE | FAST/SLOW | STRONG/WEAK | RIGHT/WRONG | ... | GET ANGRY | PRAISE | ANXIETY | SATISFACTION | CONVINCED | ... |
| JAPAN | | | | ... | | | | | | | | | | | | | | | |
| | | | | | | | | | | | | | | | | | | | |
| CHINA | | | | ... | | | | | | | | | | | | | | | |
| | | | | | | | | | | | | | | | | | | | |
| INDIA | | | | ... | | | | | | | | | | | | | | | |
| ... | | | | | | | | | | | | | | | | | | | |

FIG. 26

| COUNTRY ID | VOICE | | IMAGE | | RESPONSE | | INTERMEDIATE INFORMATION | | |
|---|---|---|---|---|---|---|---|---|---|
| | INPUT VOICE | RECOGNIZED VOICE | INPUT IMAGE | RECOGNIZED EXPRESSION | INPUT DATA | INPUT DETERMINATION | REACTION | MOOD | FEELING |
| N001 | | "souka!" | | SATISFACTION | | CORRECT | | | |

2600 → 2601, 2602, 2603, 2604, 2605

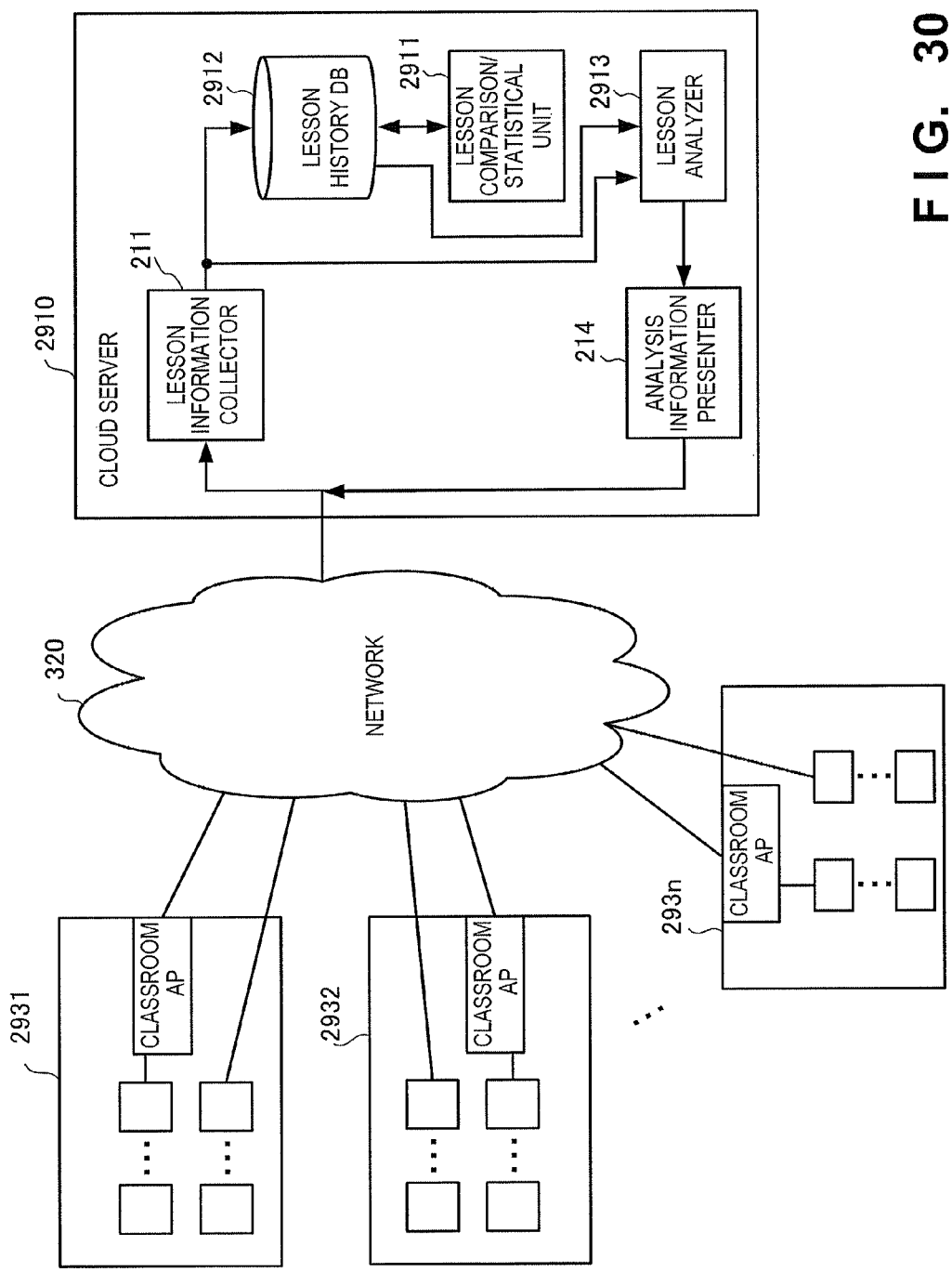
F I G. 30

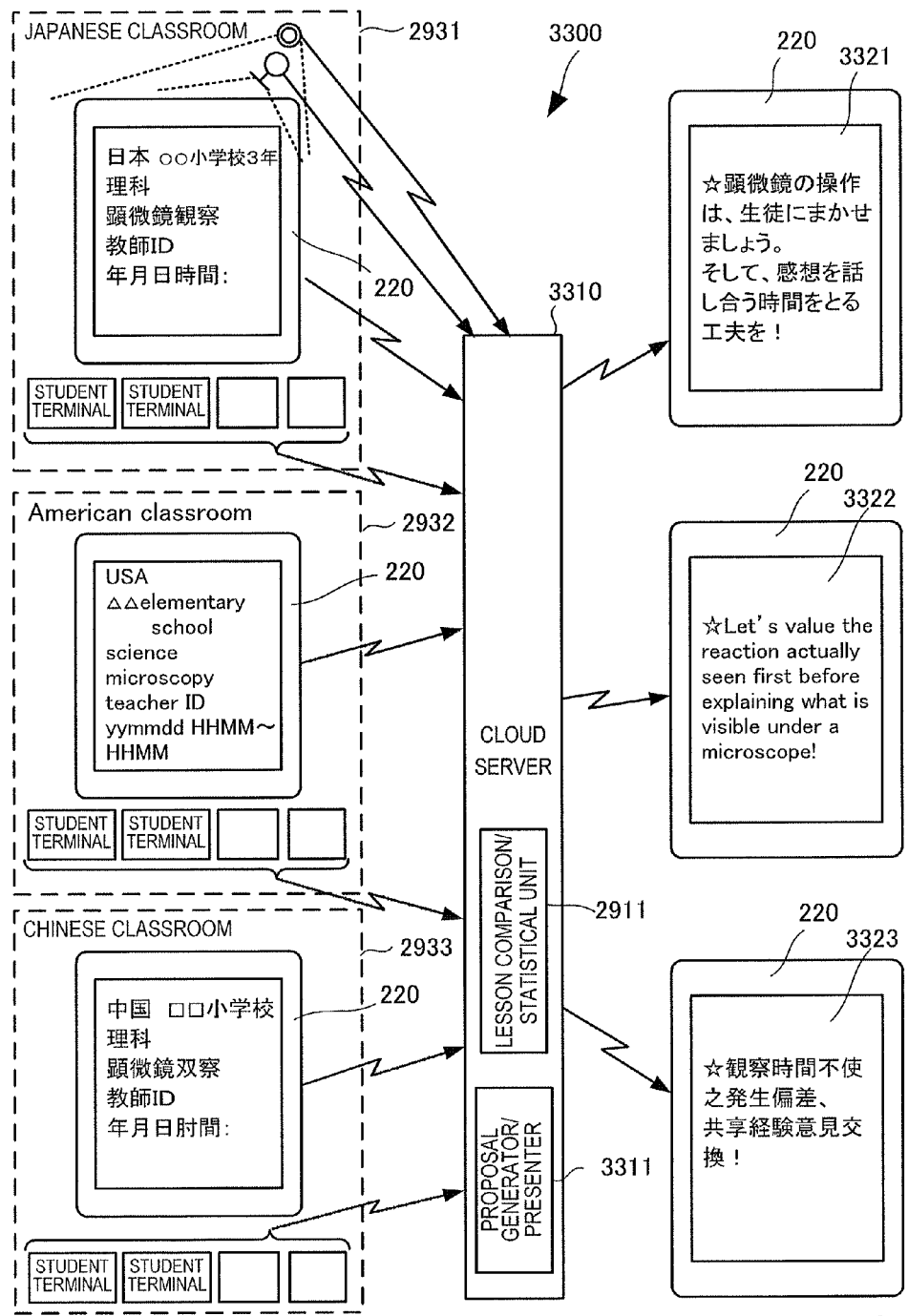
F I G. 33

| EDUCATION APPLICATION ID | LESSON ACQUISITION GOAL | TEACHER-SIDE LESSON INFORMATION | | STUDENT-SIDE LESSON INFORMATION | |
|---|---|---|---|---|---|
| | | COLLECTION POINT | COLLECTION TARGET DATA | COLLECTION POINT | COLLECTION TARGET DATA |
| A000001 | MICROSCOPE OPERATION | OPERATION EXPLANATION | EXPLANATION LENGTH, KEYWORD,... | OPERATION EXPLANATION | NUMBER OF QUESTIONS, QUESTION CONTENT |
| | | OPERATION ASSISTANCE | OPERATION INSTRUCTION, EXPLANATION AFTER OPERATION,... | OPERATION EXECUTION | CONVERSATION FREQUENCY, EXPRESSION,... |
| | | ... | ... | | |
| | CELL OBSERVATION | AFTER OBSERVATION | NUMBER OF QUESTIONS, NUMBER OF ANSWERS,... | DURING OBSERVATION | EXCLAMATORY PHRASE, OBSERVATION EXPLANATION, |
| | ... | | | | |

| 3621 EDUCATION APPLICATION ID | 3622 LESSON ID | 3623 LESSON ENVIRONMENT INFORMATION | 3624 LESSON ACQUISITION GOAL | 3625 RELATED TEACHING METHOD INFORMATION | 3626 STUDENT REACTION INFORMATION | 3627 COMPARISON INFORMATION WITH ANOTHER LESSON OR STATISTICAL VALUE | 3628 PROPOSAL INFORMATION | 3629 PROPOSAL EVALUATION (IMPROVE OR NOT) |
|---|---|---|---|---|---|---|---|---|
| A000001 | L000001 | GRADE, SUBJECT (SCIENCE), MICROSCOPY | MICROSCOPE OPERATION | TEACHER HELPS | LEAVE TO TEACHER | OPERATION TIME IS SHORT BUT LEVEL OF ACQUIREMENT IS LOW | LEAVE TO STUDENT | IMPROVE |
| | L000012 | | CELL OBSERVATION | LEAVE TO STUDENT | UNOBSERVABLE DISSATISFACTION | TIME TILL OBSERVATION IS LONG, OBSERVATION TIME VARIES | TEACHER HELPS WITH OPERATION | IMPROVE |
| ... | ... | | ... | ... | | | | |

3412

| EDUCATION APPLICATION ID | LESSON ACQUISITION GOAL | LESSON POINT | STATISTICAL ALGORITHM | COMPARISON ALGORITHM | RESULT EVALUATION |
|---|---|---|---|---|---|
| 3711 | 3712 | 3713 | 3714 | 3715 | 3716 |
| A000001 | MICROSCOPY, CELL OBSERVATION | MICROSCOPE OPERATION | INVOLVEMENT OF TEACHER AND LEVEL OF ACQUIREMENT | CA0002 | |
| A000002 | | CELL OBSERVATION | OBSERVATION DURATION AND LEVEL OF UNDERSTANDING | CA0003 | |
| ... | | ... | | | |

| EDUCATION APPLICATION ID 3721 | PROPOSAL CATEGORY 3722 | PROPOSAL CONTENT 3723 | PROPOSAL MESSAGE 3724 |
|---|---|---|---|
| SCIENCE: MICROSCOPY | LESSON STANCE | ENHANCEMENT OF LEADERSHIP OF TEACHERS | ... |
| | | RESPECT TO AUTONOMY OF STUDENTS | ... |
| | LESSON PROGRESS | TIME OF SAYING OF LESSON GOAL | ... |
| | | CHANGE OF EXPLANATION ORDER | ... |
| | LESSON SPEED | TARGET TO BE REPEATED SLOWLY | ... |
| | | TARGET TO BE EXPLAINED BRIEFLY | ... |
| ... | | | |

3514

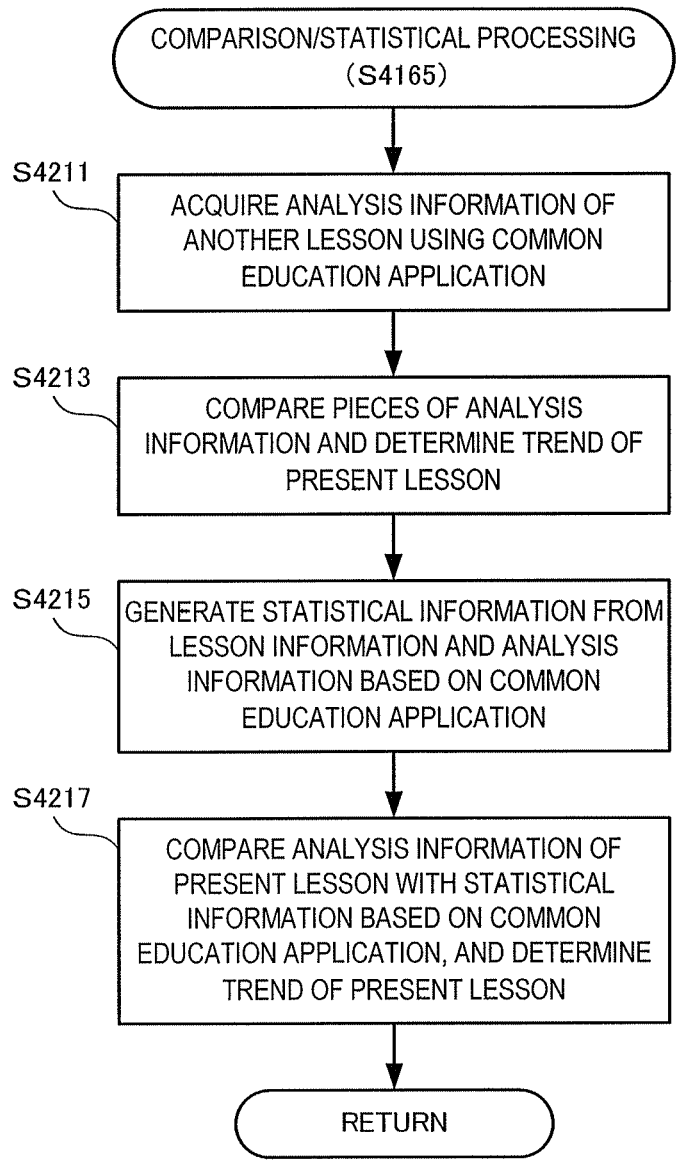
F I G. 42A

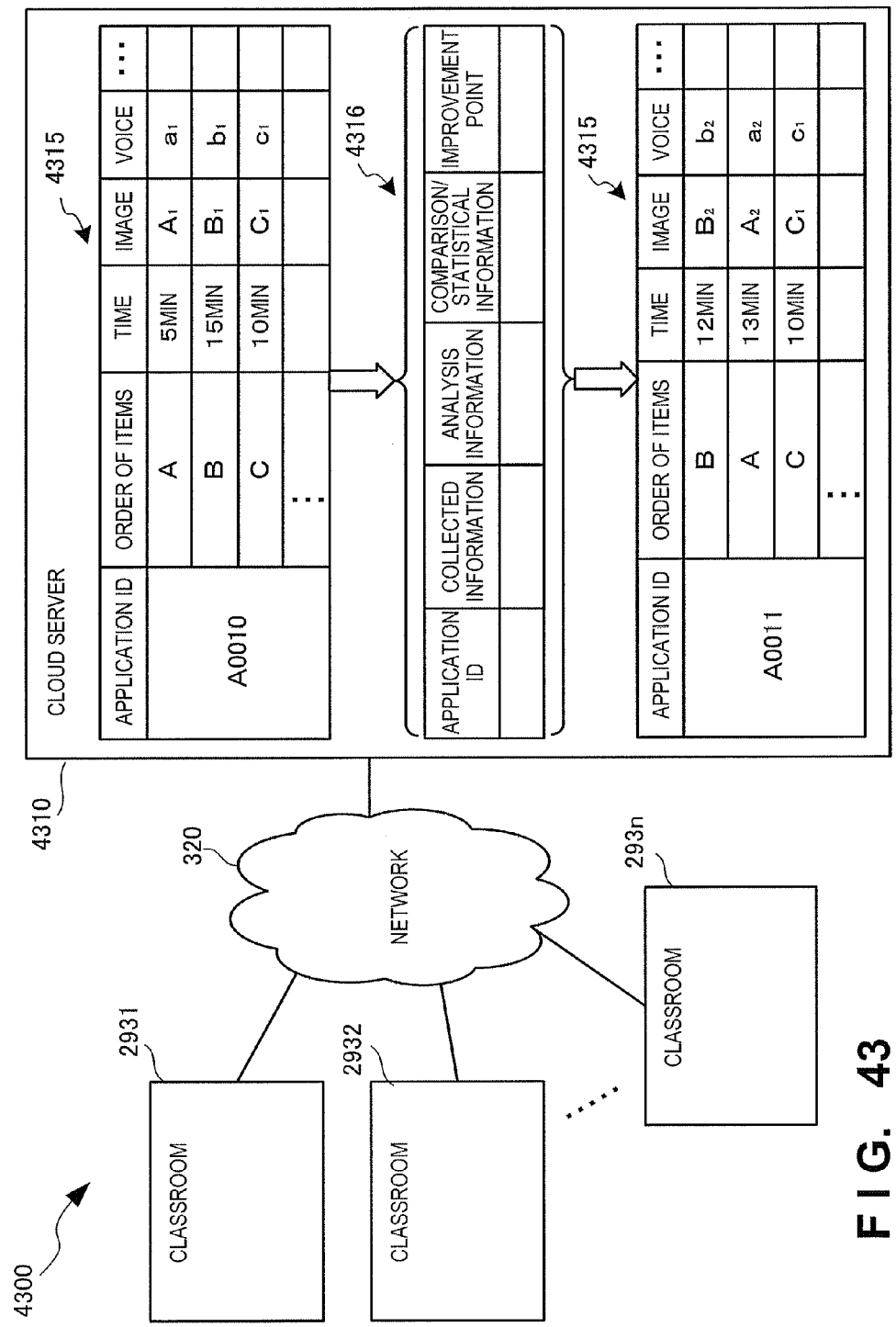
F I G. 43

| EDUCATION APPLICATION ID (4601) | VERSION (4602) | IMPROVEMENT DATE (4603) | IMPROVEMENT POINT (4604) | IMPROVEMENT TARGET (4605) | PREFERABLE COMBINATION DRIVER ID (4606) | LESSON EVALUATION (4607) |
|---|---|---|---|---|---|---|
| A000001 | V001 | 2012/03/05 | ORIGINAL | | DD00011 | |
| | V002 | 2012/10/01 | PROGRESS OF FIRST HALF IS SLOWED | 5 MIN FROM START IS CHANGED TO 12 MIN | DD00012 | |
| | ... | | | | | |
| A000002 | V001 | 2011/11/12 | ORIGINAL | | DD10011 | |
| | ... | | | | | |

4315

F I G. 46

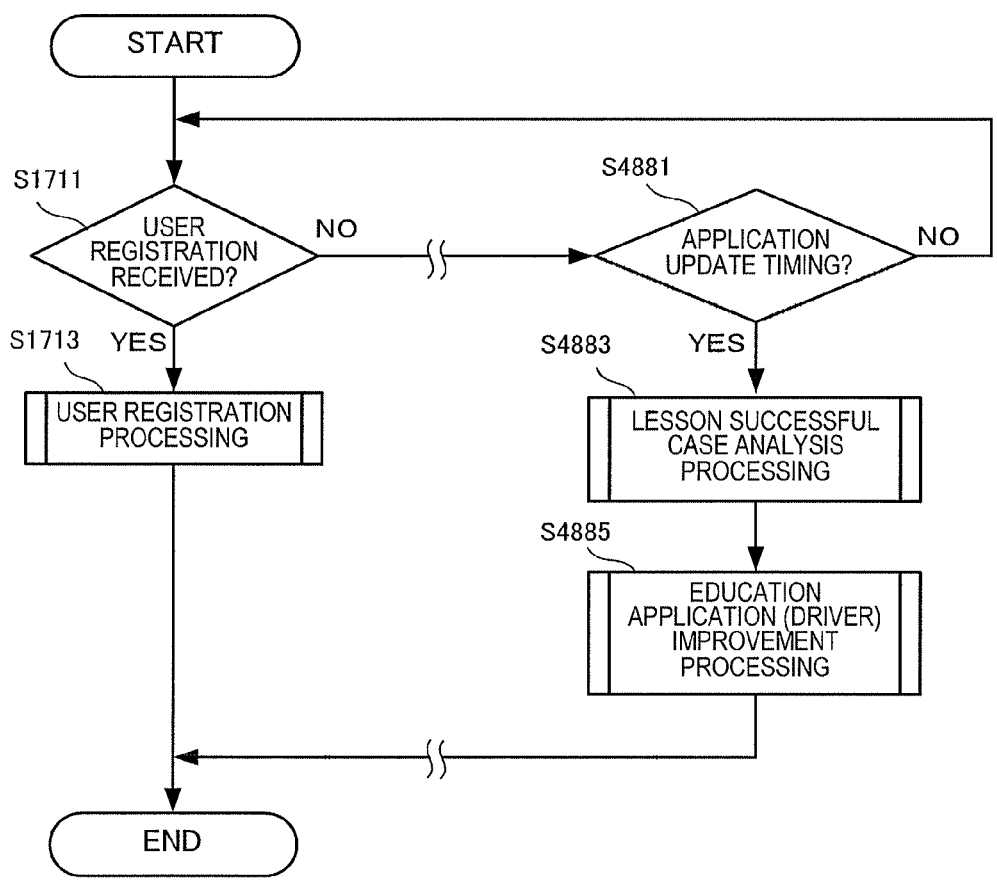
F I G. 48

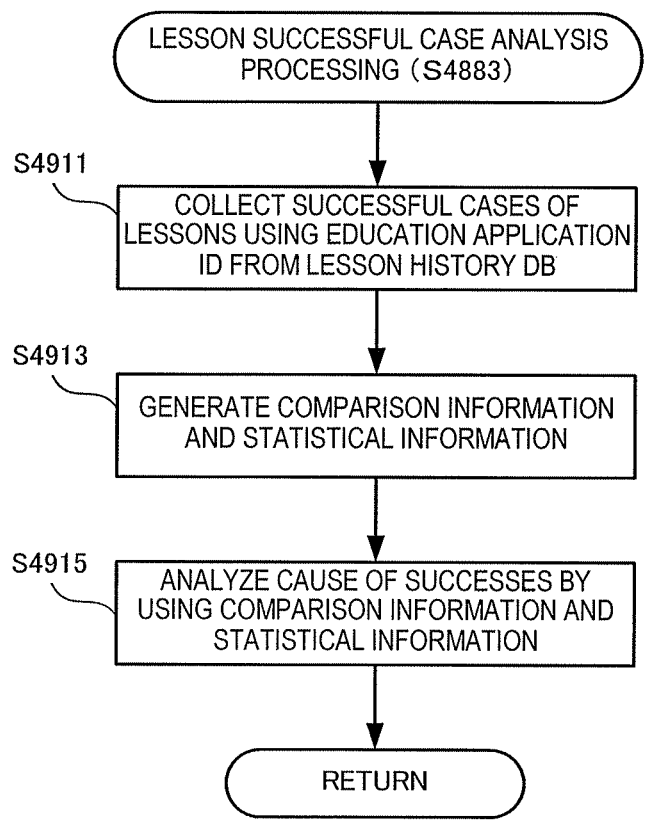
F I G. 49A

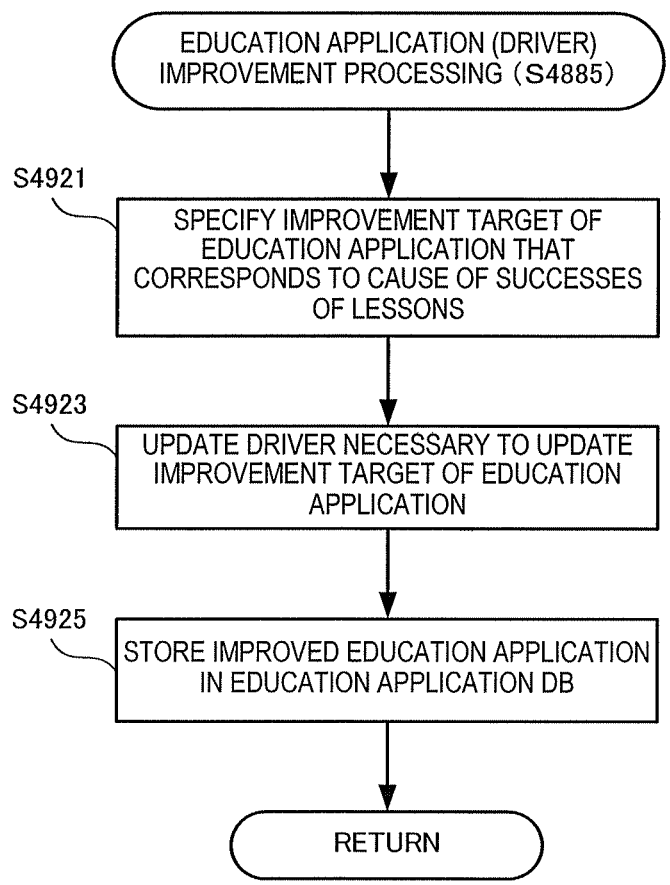
F I G. 49B

EDUCATION SITE IMPROVEMENT SUPPORT SYSTEM, EDUCATION SITE IMPROVEMENT SUPPORT METHOD, INFORMATION PROCESSING APPARATUS, COMMUNICATION TERMINAL, AND CONTROL METHODS AND CONTROL PROGRAMS OF INFORMATION PROCESSING APPARATUS AND COMMUNICATION TERMINAL

CROSS-REFERENCE TO RELATED APPLICATIONS

This application is a national stage application of International Application No. PCT/JP2013/074190 entitled "Education Site Improvement Support System, Education Site Improvement Support Method, Information Processing Apparatus, Communication Terminal, and Control Methods and Control Programs of Information Processing Apparatus and Communication Terminal ," filed on Sep. 9, 2013 which claims the benefit of the priority of Japanese Patent Application No. 2012-222792, filed on Oct. 5, 2012, the disclosures of each of which are hereby incorporated by reference in their entirety.

TECHNICAL FIELD

The present invention relates to a technique for supporting the improvement of an education site using education application software, for example, the improvement of an ITC (Information and Communications Technology) lesson.

BACKGROUND ART

In the above technical field, patent literature 1 discloses a technique of determining a doze, note taking, a nod, and leaving the seat, which are reactions of trainees, from captured images, and evaluating the discourse or lecture based on the ratio of the reactions.

CITATION LIST

Patent Literature

Patent literature 1: Japanese Patent Laid-Open No. 2007-097668

SUMMARY OF THE INVENTION

Technical Problem

In the technique described in patent literature 1, the contents and way of a discourse or lecture by a lecturer are evaluated from the attitude of attendance of trainees, and the lecturer can be motivated to improve the discourse or lecture. However, the technique disclosed in patent literature 1 is merely a technique based on not the evaluation of the lecturer himself but the evaluation of trainees. When education is performed using common education application software by different educators to different educatees in different educational environments, the quality of the education site cannot be improved by referring to the history of them in patent literature 1.

The present invention enables to provide a technique of solving the above-described problem.

Solution to Problem

One aspect of the present invention provides an information processing apparatus comprising:

an education site history accumulator that accumulates a history of pieces of education site information representing reactions or evaluations of education site participants including an educator and an educatee at an education site using an education application software, and the education application software in association with each other;

an education site information receiver that receives, from a communication terminal, the pieces of education site information acquired by the communication terminal or a device connected to the communication terminal; and an analysis information generator that generates analysis information of the education site from the received pieces of education site information and the history of the pieces of education site information.

Another aspect of the present invention provides a control method of an information processing apparatus, comprising:

accumulating, in an education site history accumulator, a history of pieces of education site information representing reactions or evaluations of education site participants including an educator and an educatee at an education site using an education application software, and the education application software in association with each other;

receiving, from a communication terminal, the pieces of education site information acquired by the communication terminal or a device connected to the communication terminal; and generating analysis information of the education site from the received pieces of education site information and the history of the pieces of education site information.

Still other aspect of the present invention provides a control program of an information processing apparatus for causing a computer to execute a method, comprising:

accumulating, in an education site history accumulator in association with education application software, a history of pieces of education site information representing reactions or evaluations of education site participants including an educator and an educatee at an education site using the education application software;

receiving, from a communication terminal, the pieces of education site information acquired by the communication terminal or a device connected to the communication terminal; and generating analysis information of the education site from the received pieces of education site information and the history of the pieces of education site information.

Still other aspect of the present invention provides a communication terminal comprising:

an education content identification information transmitter that transmits, to an information processing apparatus, education content identification information for identifying an education content;

a device information receiver that receives, from the information processing apparatus, information of a device to be used to acquire education site information selected by the information processing apparatus in correspondence with the transmitted education content identification information;

an education site information transmitter that transmits, to the information processing apparatus, pieces of education site information which have been acquired by the communication terminal or the device connected to the communication terminal, and represent reactions or evaluations of education site participants including an educator and an educatee at an education site using the education application software;

an analysis information receiver that receives, from the information processing apparatus, analysis information of the education site generated by the information processing apparatus from the transmitted pieces of education site information and a history of the pieces of education site information; and a notifier that notifies the received analysis information.

Still other aspect of the present invention provides a control method of a communication terminal, comprising:

transmitting, to an information processing apparatus, education content identification information for identifying an education content;

receiving, from the information processing apparatus, information of a device to be used to acquire education site information selected by the information processing apparatus in correspondence with the transmitted education content identification information;

transmitting, to the information processing apparatus, pieces of education site information which have been acquired by the communication terminal or the device connected to the communication terminal, and represent reactions or evaluations of education site participants including an educator and an educatee at an education site using the education application software;

receiving, from the information processing apparatus, analysis information of the education site generated by the information processing apparatus from the transmitted pieces of education site information and a history of the pieces of education site information; and notifying the received analysis information.

Still other aspect of the present invention provides a control program of a communication terminal for causing a computer to execute a method, comprising:

transmitting, to an information processing apparatus, education content identification information for identifying an education content;

receiving, from the information processing apparatus, information of a device to be used to acquire education site information selected by the information processing apparatus in correspondence with the transmitted education content identification information;

transmitting, to the information processing apparatus, pieces of education site information which have been acquired by the communication terminal or the device connected to the communication terminal, and represent reactions or evaluations of education site participants including an educator and an educatee at an education site using the education application software;

receiving, from the information processing apparatus, analysis information of the education site generated by the information processing apparatus from the transmitted pieces of education site information and a history of the pieces of education site information; and notifying the received analysis information.

Still other aspect of the present invention provides an education site improvement support system comprising:

an education site history accumulator that accumulates, a history of pieces of education site information representing reactions or evaluations of education site participants including an educator and an educatee at an education site using an education application software, and the education application software in association with each other;

an education site information acquirer that acquires the pieces of education site information from a communication terminal or a device connected to the communication terminal;

an analysis information generator that generates analysis information of the education site from the acquired pieces of education site information and the history of the pieces of education site information; and a presenter that presents the analysis information from the communication terminal.

Still other aspect of the present invention provides an education site improvement support method comprising:

acquiring, from a communication terminal or a device connected to the communication terminal, pieces of education site information representing reactions or evaluations of education site participants including an educator and an educatee at an education site using the education application software;

generating analysis information of the education site from a history of pieces of education site information acquired from an education site history accumulator that accumulates the history of the pieces of education site information in association with the education application software, and the pieces of education site information acquired by the device; and presenting the analysis information from the communication terminal.

Advantageous Effects of Invention

According to the present invention, the quality of the ITC education can be improved based on the history of reactions or evaluations to education performed by different educators to different educatees in different education site environments in education using education application software.

BRIEF DESCRIPTION OF DRAWINGS

FIG. 4A is a sequence chart showing the operation procedure of the lesson improvement support system including the cloud server according to the second embodiment of the present invention;

FIG. 4C is a sequence chart showing the control procedure of a USB-connected device according to the second embodiment of the present invention;

FIG. 8 is a table showing the arrangement of an education application DB according to the second embodiment of the present invention;

FIG. 9A is a table showing the arrangement of a lesson history DB according to the second embodiment of the present invention;

FIG. 9B is a table showing the arrangement of the lesson history DB according to the second embodiment of the present invention;

FIG. 9D is a table showing the arrangement of the lesson history DB according to the second embodiment of the present invention;

FIG. 9E is a table showing the arrangement of the lesson history DB according to the second embodiment of the present invention;

FIG. 9F is a table showing the arrangement of the lesson history DB according to the second embodiment of the present invention;

FIG. 9G is a table showing the arrangement of the lesson history DB according to the second embodiment of the present invention;

FIG. 9I is a table showing the arrangement of a club activity history accumulated in the lesson history DB according to the second embodiment of the present invention;

FIG. 10 is a table showing the arrangement of a lesson analysis algorithm DB according to the second embodiment of the present invention;

FIG. 11 is a table showing the arrangement of a device driver DB according to the second embodiment of the present invention;

FIG. 14 is a table showing the arrangement of a lesson information table according to the second embodiment of the present invention;

FIG. 16 is a table showing the arrangement of a presentation information generation table according to the second embodiment of the present invention;

FIG. 18A is a flowchart showing the procedure of user registration processing according to the second embodiment of the present invention;

FIG. 18B is a flowchart showing the procedure of lesson preparation processing according to the second embodiment of the present invention;

FIG. 18E is a flowchart showing the procedure of analysis information presentation processing according to the second embodiment of the present invention;

FIG. 24 is a view showing a communication format for extracting a reaction from lesson information by the cloud server according to the third embodiment of the present invention;

FIG. 25B is a table showing the arrangement of the lesson history DB according to the third embodiment of the present invention;

FIG. 26 is a table showing the arrangement of a reaction extraction table according to the third embodiment of the present invention;

FIG. 30 is a view showing the arrangement of the lesson improvement support system including the cloud server according to the fourth embodiment of the present invention;

FIG. 33 is a view showing an outline of a lesson improvement support system including a cloud server according to the fifth embodiment of the present invention;

FIG. 36A is a table showing the arrangement of an education application DB according to the fifth embodiment of the present invention;

FIG. 36B is a table showing the arrangement of a lesson history DB according to the fifth embodiment of the present invention;

FIG. 37A is a table showing the arrangement of a comparison/statistical algorithm DB according to the fifth embodiment of the present invention;

FIG. 37B is a table showing the arrangement of a proposal message DB according to the fifth embodiment of the present invention;

FIG. 42A is a flowchart showing the procedure of comparison/statistical processing according to the fifth embodiment of the present invention;

FIG. 43 is a view showing an outline of a lesson improvement support system including a cloud server according to the sixth embodiment of the present invention;

FIG. 46 is a table showing the arrangement of an education application DB according to the sixth embodiment of the present invention;

FIG. 48 is a flowchart showing the processing procedure of the cloud server according to the sixth embodiment of the present invention;

FIG. 49A is a flowchart showing the procedure of lesson successful case analysis processing according to the sixth embodiment of the present invention; and FIG. 49B is a flowchart showing the procedure of education application improvement processing according to the sixth embodiment of the present invention.

DESCRIPTION OF THE EMBODIMENTS

A preferred embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Note that terms "education", "education site", "educator", and "educatee" are used in the first embodiment of this specification. Concrete terms "lesson", "classroom", "teacher", and "student" are used in the second to sixth embodiments. These terms can also be rewritten into "lecture or discourse", "lecture room", "lecturer", and "trainee". That is, the terms "education", "education site", "educator", and "educatee" are used as terms representing a concept including these concrete examples. Terms "education site information" or "lesson information" represents information about the reactions or evaluations of participants to an education site or lesson. To the contrary, a term "education site identification information" or "lesson identification information" represents information that specifies an education site or lesson. A term "device" is a generic name of devices that are connected to a communication terminal via a wire or wirelessly, provide a predetermined input/output function, and basically perform data transmission/reception to/from the outside via the communication terminal.

"Education content" described in the appended claims is equivalent to "lesson content", "education content identification information" is equivalent to "lesson identification information", and "reception of education content identification information" or "transmission of education content identification information" is equivalent to "reception of lesson identification information" or "transmission of lesson identification information". Also, "transmission of education site information" is equivalent to "transmission of lesson information", and "acquisition of education site information" is equivalent to "acquisition of lesson information".

[First Embodiment]

An information processing apparatus 100 according to the first embodiment of the present invention will be described with reference to FIG. 1. The information processing apparatus 100 is an apparatus that evaluates an education site from education site information including reactions or evaluations at the education site.

Figure 1:
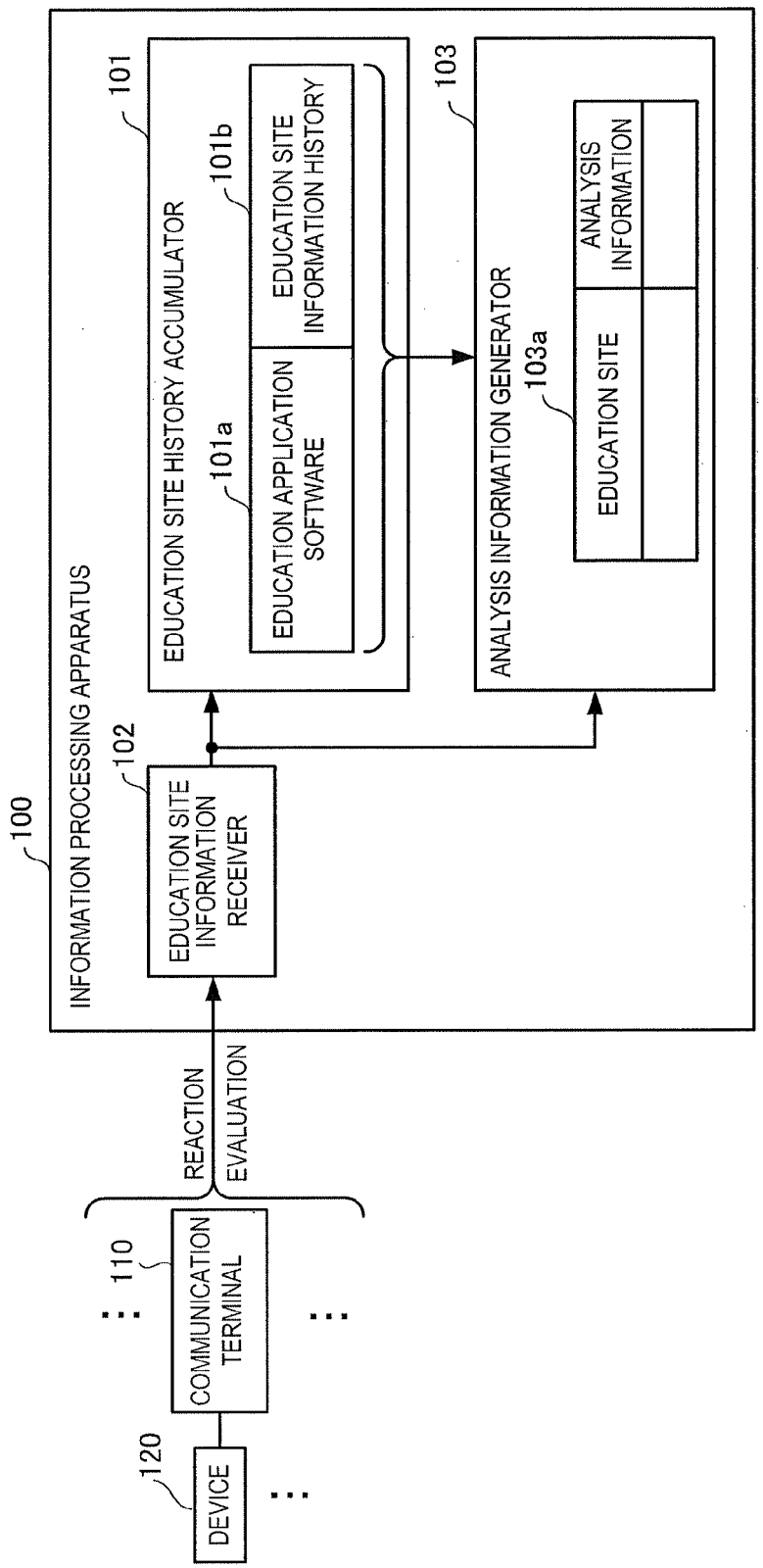
FIG. 1 is a block diagram showing the arrangement of an information processing apparatus according to the first embodiment of the present invention.

As shown in FIG. 1, the information processing apparatus 100 includes an education site history accumulator 101, an education site information receiver 102, and an analysis information generator 103. The education site history accumulator 101 accumulates, in association with education application software 101a, an education site information history 101b representing the reactions or evaluations of education site participants including an educator and educatees at an education site using education application software. The education site information receiver 102 receives, from the communication terminal 110, education site information acquired by a communication terminal 110 or a device 120 connected to the communication terminal 110. The analysis information generator 103 generates education site analysis information 103a from the received education site information and education site information history.

According to the first embodiment, the quality of the ITC education can be improved based on the history of reactions or evaluations to education performed by different educators to different educatees in different educational environments at education sites using education application software.

[Second Embodiment]

A lesson improvement support system including a cloud server serving as an information processing apparatus according to the second embodiment of the present invention will be described next. This embodiment will give an explanation in regard to, for example, a lesson that is conducted by a teacher to students in a classroom, but the present invention is not limited to this. That is, the lesson improvement support system according to this embodiment is one concrete example of an education site improvement support system, and a lesson can be rewritten into an education site. This embodiment will give an explanation using a cloud server as an example of a server, but the server is not limited to the cloud server. In the second embodiment, the cloud server presents an appropriate device that corresponds to a designated lesson and is used to acquire lesson information by referring to the history. The cloud server accumulates, in a lesson history database (to be referred to as a DB hereinafter), the reactions or evaluations of lesson participants to a lesson that are collected using devices connected to communication terminals. By referring to the lesson history DB, the cloud server analyzes the reactions or evaluations of the lesson participants to the lesson. The cloud server presents the analysis information to the communication terminals to visualize the objective evaluation of the lesson and promote an improvement.

According to the second embodiment, since information necessary to evaluate a lesson can be selectively acquired by referring to history information, analysis information leading to a more accurate lesson evaluation can be provided.

In this embodiment, a communication terminal used by a teacher or a student may be a portable terminal such as a smartphone or a digitizer, or a desktop or notebook personal computer (to be referred to as a PC hereinafter). A device presented by the cloud server may be a list of devices necessary to acquire lesson information, a request to connect a device except for an already connected device, or presentation of the result of selection from already connected devices. A lesson participant refers to this presentation and connects a necessary device. When a communication terminal to which a device is connected is a portable terminal such as a smartphone, the cloud server controls the connected device. In this embodiment, USB (Universal Serial Bus) connection will be representatively explained as device connection to a portable terminal, but the device connection is not limited to the USB connection.

<<Lesson Improvement Support System>>

The lesson improvement support system including the cloud server serving as the information processing apparatus according to this embodiment will be described with reference to FIGS. 2 to 4D. Although FIGS. 2 to 4D show an example in which a communication terminal for a teacher is a PC and portable terminals such as a smartphone are used as some communication terminals for students, the communication terminal for a teacher may be a portable terminal such as a smartphone. For example, when a trouble such as a fault occurs in PCs for a teacher and students, necessary devices can also be connected to portable terminals such as a smartphone.

(Outline of System)

Figure 2:
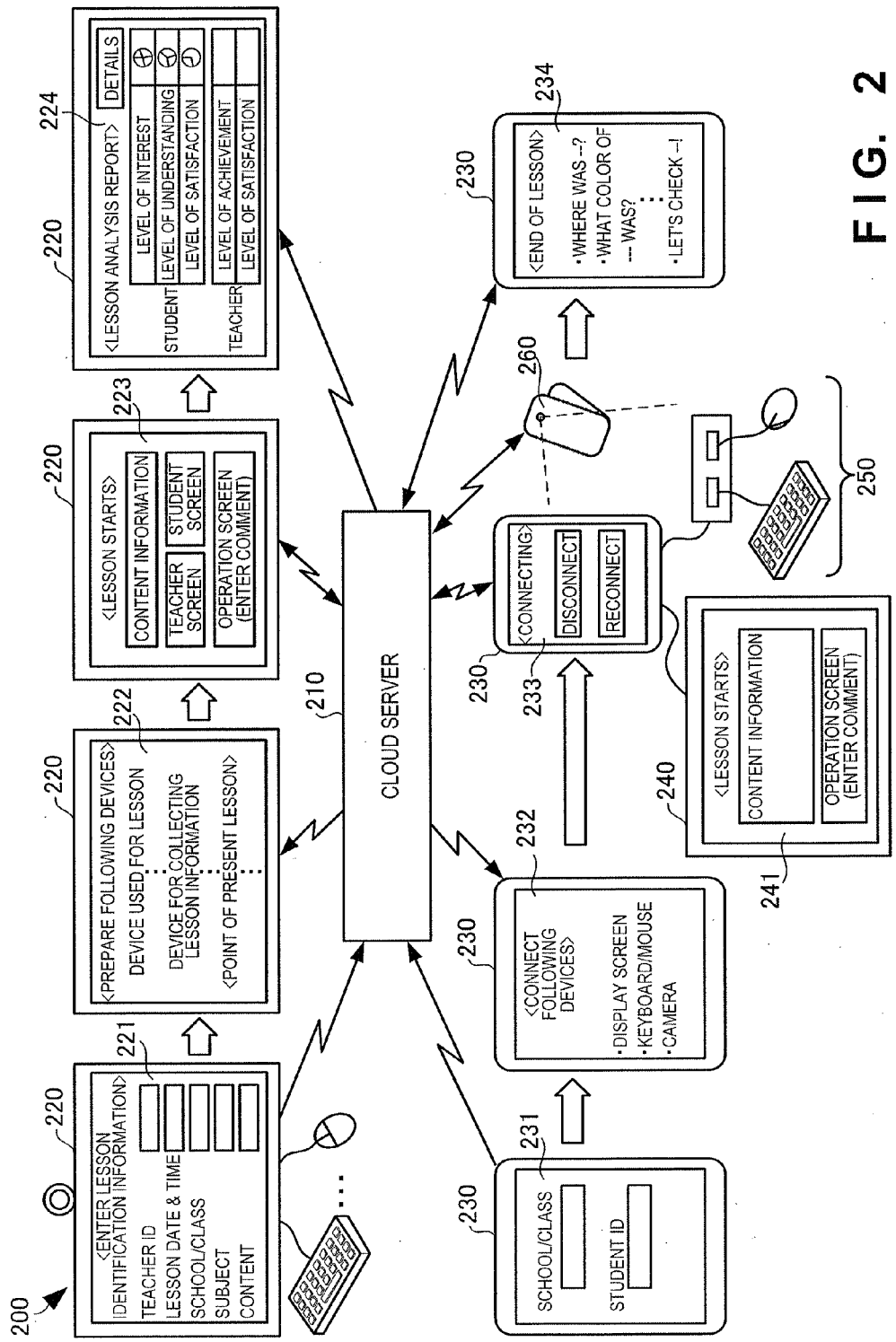
FIG. 2 is a view showing an outline of a lesson improvement support system including a cloud server according to the second embodiment of the present invention.

FIG. 2 is a view showing an outline of a lesson improvement support system 200 including a cloud server 210 according to this embodiment. FIG. 2 shows an example in which a communication terminal for a teacher (to be referred to as a teacher communication terminal 220 hereinafter), which is a PC, or a communication terminal for a student (to be referred to as a student communication terminal 230 hereinafter), which is a smartphone, accumulates a lesson information history in the cloud server 210 and receives the analysis information of it from the cloud server 210.

"Lesson identification information" for specifying a lesson to be conducted by a teacher is input from a display screen 221 of the teacher communication terminal 220, and transmitted to the cloud server 210. In response to this, the cloud server 210 selects devices for acquiring, from the lesson to be conducted, proper lesson information in order to analyze the lesson, and presents the devices to the teacher communication terminal 220, like a display screen 222. When student identification information is input from a display screen 231 in the student communication terminal 230, the cloud server 210 presents, to the student communication terminal 230, proper devices to collect lesson information such as the reaction of a student, like a display screen 232. Note that the presentation of devices may be a list of connection candidates.

The teacher or the student connects, to the teacher communication terminal 220, the student communication terminal 230, or a classroom AP (Access Point), devices that are displayed on the display screen 222 or 232 and should be prepared. Here, as a device connection example, a display device 240 and a keyboard & pointing device 250 via a router are connected to the USB connector of the student communication terminal 230. Further, the camera of a mobile phone 260 is used as a device for acquiring the motion and expression of a student as lesson information. Assume that both the teacher communication terminal 220 and the student communication terminal 230 basically include, as standard equipment, a camera for capturing an image of the teacher or student, a microphone for acquiring a voice of the teacher or student, and a display screen and loudspeaker for presenting information to the teacher or student. Although not shown, if the preparation of a device that cannot be connected by only the teacher communication terminal 220 or the student communication terminal 230 under a limitation on communication capacity or the like is requested, lesson information can be transmitted to the cloud server 210 by connecting the requested device to a mobile phone, a smartphone, or a digitizer in this embodiment.

When necessary devices are prepared and the teacher communication terminal 220 instructs the cloud server 210 to start a lesson, the cloud server 210 activates corresponding education application software and starts the lesson. Then, the teacher communication terminal 220 displays, like a display screen 223, information of the lesson content, a classroom screen from a camera that captures an image of the whole classroom, a student screen that captures an image of a specific student or students, an operation screen for inputting an operation such as the progress of the lesson from the teacher, and the like. Note that the contents and format of the display screen 223 are not limited to those in FIG. 2. After the lesson starts, a display screen 233 of the student communication terminal 230 displays a state in which the student communication terminal 230 is now connected to the cloud server 210. A display screen 241 of the display device 240 connected to the student communication terminal 230 displays the sharing screen of the content information of the display screen 223 with the teacher communication terminal 220, an operation screen for inputting an operation such as a question or an answer from the student, and the like. Pieces of lesson information detected from participants including the teacher and students in the course of the lesson are sequentially accumulated in the cloud server 210. Note that the pieces of lesson information include image information, voice information, and operation information.

After the lesson ends, the cloud server 210 analyzes the pieces of lesson information and presents pieces of analysis information of the lesson in a visible format. For example, the levels of interest, understanding, and satisfaction of students to the lesson, and the like are analyzed from pieces of lesson information such as the expressions or reactions of the students, and are presented as pie charts on a display screen 224 of the teacher communication terminal 220. For example, in the pie chart of the level of interest of the students, the number of students determined to show a keen interest, the number of students determined to ordinarily show interest, the number of students determined to hardly show interest, and the number of students determined to show no interest are displayed by dividing the pie chart into areas corresponding to the ratio of them. Each area is desirably displayed to be identifiable by color, pattern, or the like. Also, the levels of achievement and satisfaction of the teacher himself to the lesson are analyzed from pieces of lesson information such as the expression or reaction of the teacher, and are presented. The teacher checks the display screen 224 and can find out a problem from analysis information in which his lesson is objectively determined, and improve the lesson. Note that the contents and format of the display screen 224 are not limited to those in FIG. 2. For example, pieces of analysis information in time series from the start to end of a lesson may be displayed, or the point of a lesson may be extracted to display analysis information. This can also contribute to letting the teacher find out a more detailed problem such as a problem in progress or teaching, and improve the lesson.

A display screen 234 of the student communication terminal 230 displays a question about basic contents that should be gained from this lesson, and contents that should be reviewed. A student checks the display screen 234 and can improve his understanding of the lesson. Note that the contents and format of the display screen 234 are not limited to those in FIG. 2.

Note that the display of the display screen may be notified simultaneously by a voice from an earphone. Lesson analysis information is presented after the end of the lesson in FIG. 2, but may be sequentially presented during the lesson or along with the course of the lesson. This arrangement can also improve the way of the lesson in the course of the lesson, as needed.

(Arrangement of System)

Figure 3:
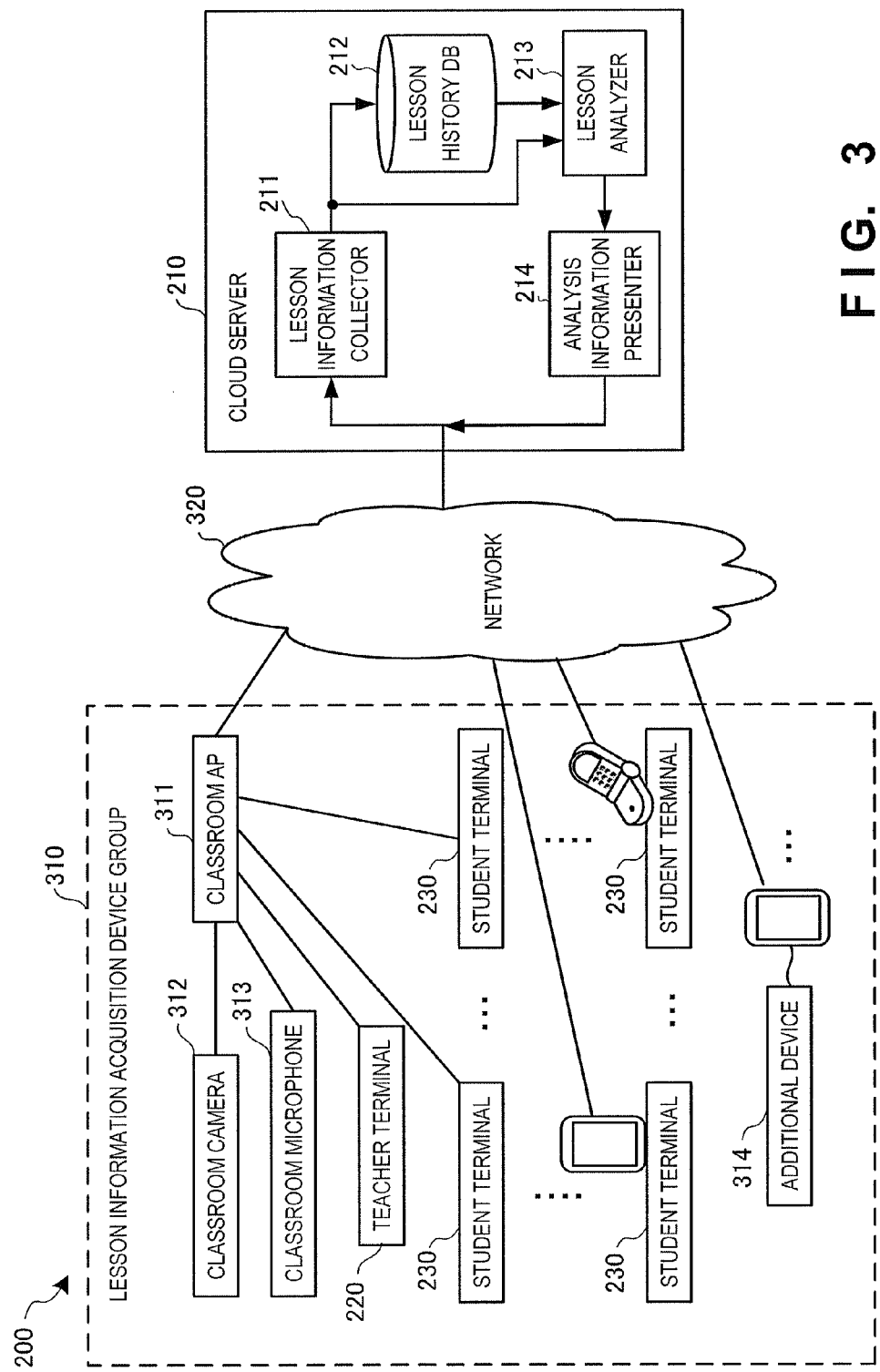
FIG. 3 is a view showing the arrangement of the lesson improvement support system including the cloud server according to the second embodiment of the present invention.

FIG. 3 is a view showing the arrangement of the lesson improvement support system 200 including the cloud server 210 according to this embodiment.

The lesson improvement support system 200 includes the cloud server 210 that is connected via a network 320, and a lesson information acquisition device group 310 that acquires lesson information in a given lesson. Note that the lesson information acquisition device group 310 is also used as an interactive device based on education application software (to be also referred to as an education application hereinafter) of an ITC lesson provided by the cloud server 210.

The basic arrangement of the cloud server 210 according to this embodiment includes a lesson information collector 211, a lesson history database (to be referred to as a DB hereinafter) 212, a lesson analyzer 213, and an analysis information presenter 214. The lesson information collector 211 collects pieces of lesson information from the lesson information acquisition device group 310 via the network 320. The lesson history DB 212 accumulates the history of the pieces of lesson information collected by the lesson information collector 211 directly or after organizing them in association with, e.g., an education application to be used. The lesson analyzer 213 analyzes the history of pieces of lesson information accumulated in the lesson history DB 212, and generates analysis information so that lesson participants can obtain the objective evaluation of this lesson. The analysis information presenter 214 generates a screen of a display format that can grasp the analysis information of the lesson analyzer 213 at a glance, and presents the screen to a communication terminal, especially, to the teacher communication terminal 220.

In addition to the teacher communication terminal 220 and the student communication terminals 230, the lesson information acquisition device group 310 includes a classroom camera 312 that acquires an image of the entire classroom or part of it, and a classroom microphone 313 that acquires the atmosphere of the classroom. The classroom camera 312 and the classroom microphone 313 are connected to a classroom AP 311. The atmosphere of the classroom is used to determine whether students concentrate on the lesson, or they have a lot of chattering and do not concentrate. Depending on the lesson, an additional device 314 designated from the cloud server 210 is connected to a portable terminal to collect pieces of lesson information. For example, when the lesson is microscopy in science, a USB microscope may be connected as the additional device 314 to the portable terminal.

(Operation Procedures of System)

Figure 4B:
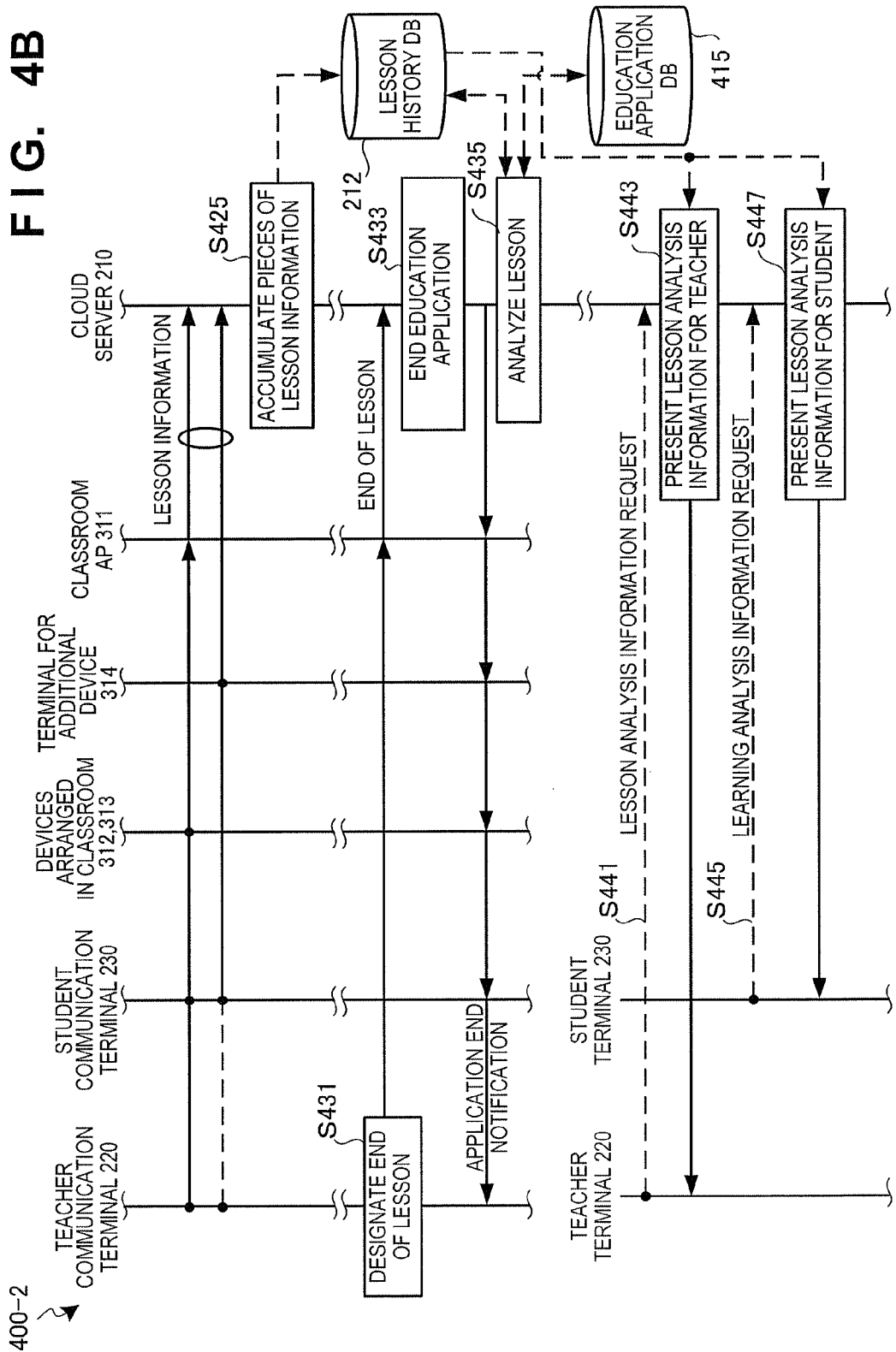
FIG. 4B is a sequence chart showing the operation procedure of the lesson improvement support system including the cloud server according to the second embodiment of the present invention.

FIGS. 4A and 4B are sequence charts showing operation procedures 400-1 and 400-2 of the lesson improvement support system 200 including the cloud server 210 according to this embodiment. Note that the education application is sometimes abbreviated as an education appli in the drawings.

The operation procedure 400-1 in FIG. 4A represents an operation procedure until an education application provided by the cloud server 210 is activated after a teacher inputs lesson identification information.

In step S401, the teacher communication terminal 220 transmits, to the cloud server 210 via the classroom AP 311, lesson identification information input by the teacher from the display screen 221 of FIG. 2.

In step S403, the cloud server 210 acquires, from the lesson history DB 212, a lesson history corresponding to the lesson identification information received from the teacher communication terminal 220, and analyzes the lesson history. Based on this analysis, the cloud server 210 sets in step S405 a device serving as an information collection source capable of appropriately collecting pieces of lesson information such as the reaction of lesson participants in a lesson specified by the lesson identification information. The information of the information collection source is presented to the teacher communication terminal 220 and the student communication terminal 230. The teacher communication terminal 220 and the student communication terminal 230 display devices that need to be connected, in steps S407 and S409, respectively.

After that, the cloud server 210 is notified of device connections from the teacher communication terminal 220, the student communication terminal 230, the classroom camera 312 and classroom microphone 313 serving as devices arranged in the classroom, and a terminal as the new additional device 314 from information of the information collection source. In step S411, the cloud server 210 checks whether the preparation of lesson information collection is completed. If the preparation is completed, the cloud server 210 creates in step S413 an information collection table for collecting pieces of lesson information and accumulating them in the lesson history DB 212, and transmits a preparation completion notification to the teacher communication terminal 220.

In step S415, the teacher communication terminal 220 displays the preparation completion received from the cloud server 210. If the teacher inputs a lesson start instruction, the teacher communication terminal 220 notifies the cloud server 210 of the start of the lesson in step S417. In step S419, the cloud server 210 refers to the history in the lesson history DB 212 based on the lesson identification information, and generates an education application to be used based on an education application DB 415 or selects it from the education application DB 415. In step S421, the cloud server 210 starts the generated or selected education application.

In step S423, the education application is synchronously activated using the communication terminals and devices associated with this lesson, and the ITC lesson starts.

The operation procedure 400-2 in FIG. 4B represents an operation procedure until the result of analyzing lesson information by the cloud server 210 is presented on the teacher communication terminal 220 and the student communication terminal 230 after the ITC lesson starts.

In step S425, the cloud server 210 receives, as pieces of lesson information, the reactions or expressions of lesson participants including a teacher and students during the lesson, which have been detected by respective devices, and accumulates the pieces of lesson information in the lesson history DB 212. After that, pieces of lesson information during the lesson are sequentially accumulated in the lesson history DB 212.

In step S431, the teacher communication terminal 220 transmits a lesson end instruction from the teacher to the cloud server 210. In step S433, the cloud server 210 ends the activated education application. The cloud server 210 then notifies the respective devices or the communication terminals connected to the devices of the end of the application. Although the teacher designates the end of the lesson in FIG. 4B, the cloud server 210 may determine the end of the education application and end the lesson. In step S435, the cloud server 210 refers to the lesson history accumulated in the lesson history DB 212 or the feature of this lesson from the education application DB 415, analyzes the lesson based on the pieces of lesson information, and accumulates them in the lesson history DB 212.

When the teacher wants to know the analysis information of this lesson, he requests lesson analysis information of the cloud server 210 in step S441. In step S443, the cloud server 210 reads out the analysis information accumulated in the lesson history DB 212, and presents it to the teacher communication terminal 220 in a format capable of evaluating the lesson at a glance. When the student wants to know the analysis information of learning by this lesson, he requests learning analysis information of the cloud server 210 in step S445. In step S447, the cloud server 210 reads out the analysis information accumulated in the lesson history DB 212, and presents it to the student communication terminal 230 in a format capable of evaluating the learning by the lesson at a glance. Although the teacher communication terminal 220 or the student communication terminal 230 requests analysis information in FIG. 4B, the cloud server 210 may be configured to present the analysis information without the request.

(Control Procedures of Connected Device)

Figure 4D:
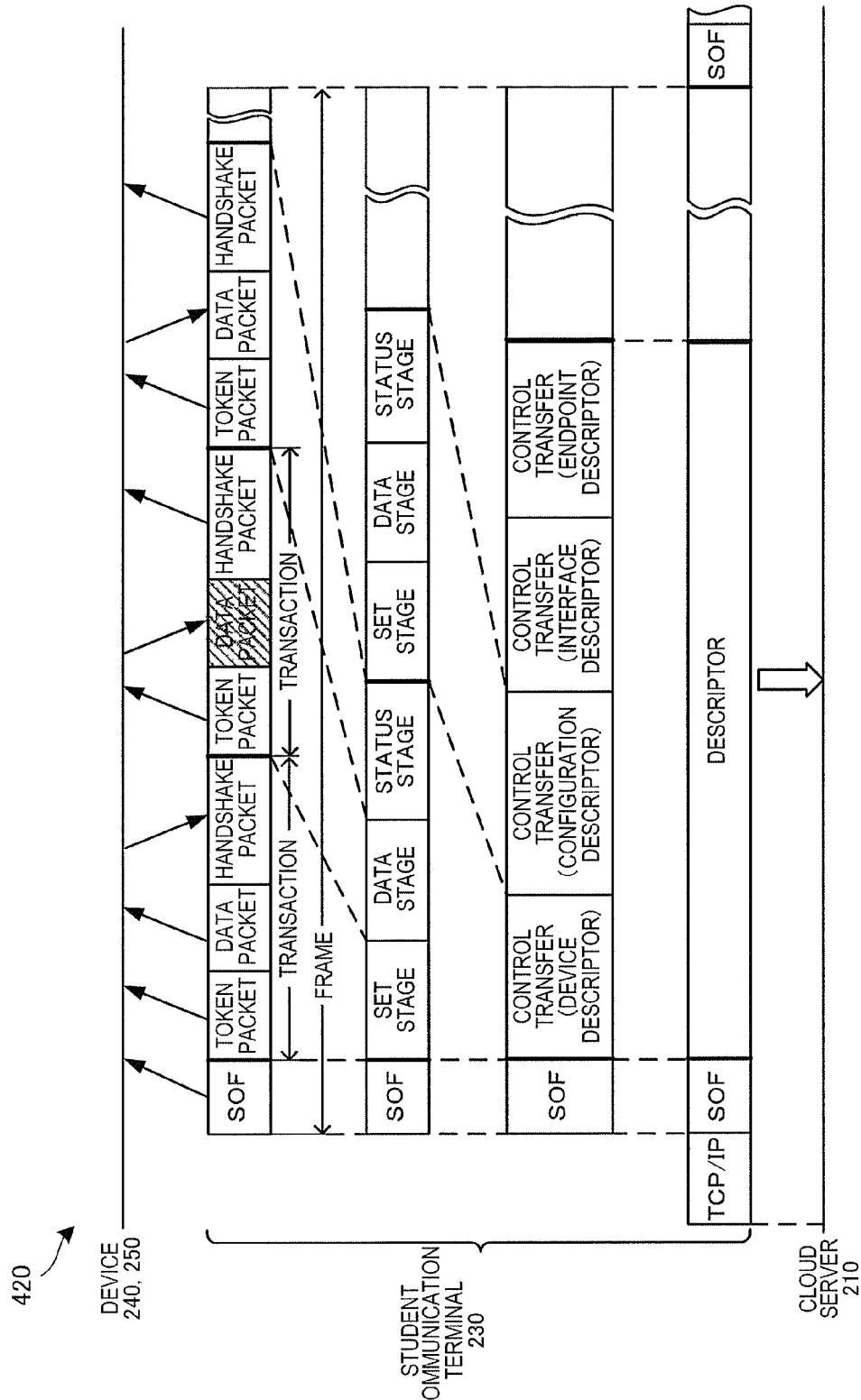
FIG. 4D is a sequence chart showing the control procedure of a USB-connected device according to the second embodiment of the present invention.

FIGS. 4C and 4D are sequence charts showing control procedures 410 and 420 of the USB-connected devices 240 and 250 according to this embodiment.

FIG. 4C is a sequence chart showing the control procedure 410 at the time of connecting the devices 240 and 250 to the USB connector of the student communication terminal 230. Although FIG. 4C shows a sequence at the time of connecting the device to the student communication terminal 230, this also applies to a sequence for the teacher communication terminal 220 constituted by a portable terminal or a portable terminal for connecting the additional device 314.

In step S451, the student communication terminal 230 detects the USB connection of the device 240. In step S453, the student communication terminal 230 reads out a descriptor from the device 240 by a USB general-purpose driver. In step S455, the student communication terminal 230 transmits the descriptor to the cloud server 210. Upon receiving the descriptor, the cloud server 210 refers to a device DB 413 to specify the connected device from the descriptor in step S457. Then, in step S459, the cloud server 210 refers to a device driver DB 414, and selects and activates a device driver based on the specified device.

In step S461, the student communication terminal 230 detects the USB connection of the device 250. In step S463, the student communication terminal 230 reads out the descriptor from the device 250 by the USB general-purpose driver. In step S465, the student communication terminal 230 transmits the descriptor to the cloud server 210. In step S467, the cloud server 210 refers to the device DB 413 to specify the connected device from the descriptor. Then, in step S469, the cloud server 210 refers to the device driver DB 414, and selects and activates a device driver based on the specified device.

As in FIG. 4A, in step S423, the education application is activated. Although details are not shown in FIG. 4A, for example, the cloud server 210 provides a shared screen to each display in step S471 upon activation of the education application, and if there is an input from each terminal or device, executes input response processing in step S473.

FIG. 4D is a sequence chart showing the control procedure 420 to acquire the descriptor of a USB-connected device.

Descriptors set in the devices 240 and 250 are acquired by USB requests such as GET_DESCRIPTOR. The USB requests are exchanged with the devices 240 and 250 by control transfers, respectively. Each control transfer is constituted by a set stage, a data stage, and a status stage. Each stage is constituted by a token packet, a data packet, and a handshake packet. The descriptor is acquired by a data packet in each data stage.

The descriptors acquired from the devices 240 and 250 undergo IP encapsulation in an IP header or a TCP header, and are transmitted from the student communication terminal 230 to the cloud server 210.

Note that the data input/output procedures of a USB device including a data output procedure from the cloud server 210 to the devices 240 and 250 and a data input procedure from the devices 240 and 250 to the cloud server 210 have the standard specifications of the USB protocol, and a description thereof will be omitted.

<<Functional Arrangement of Cloud Server>>

Figure 5:
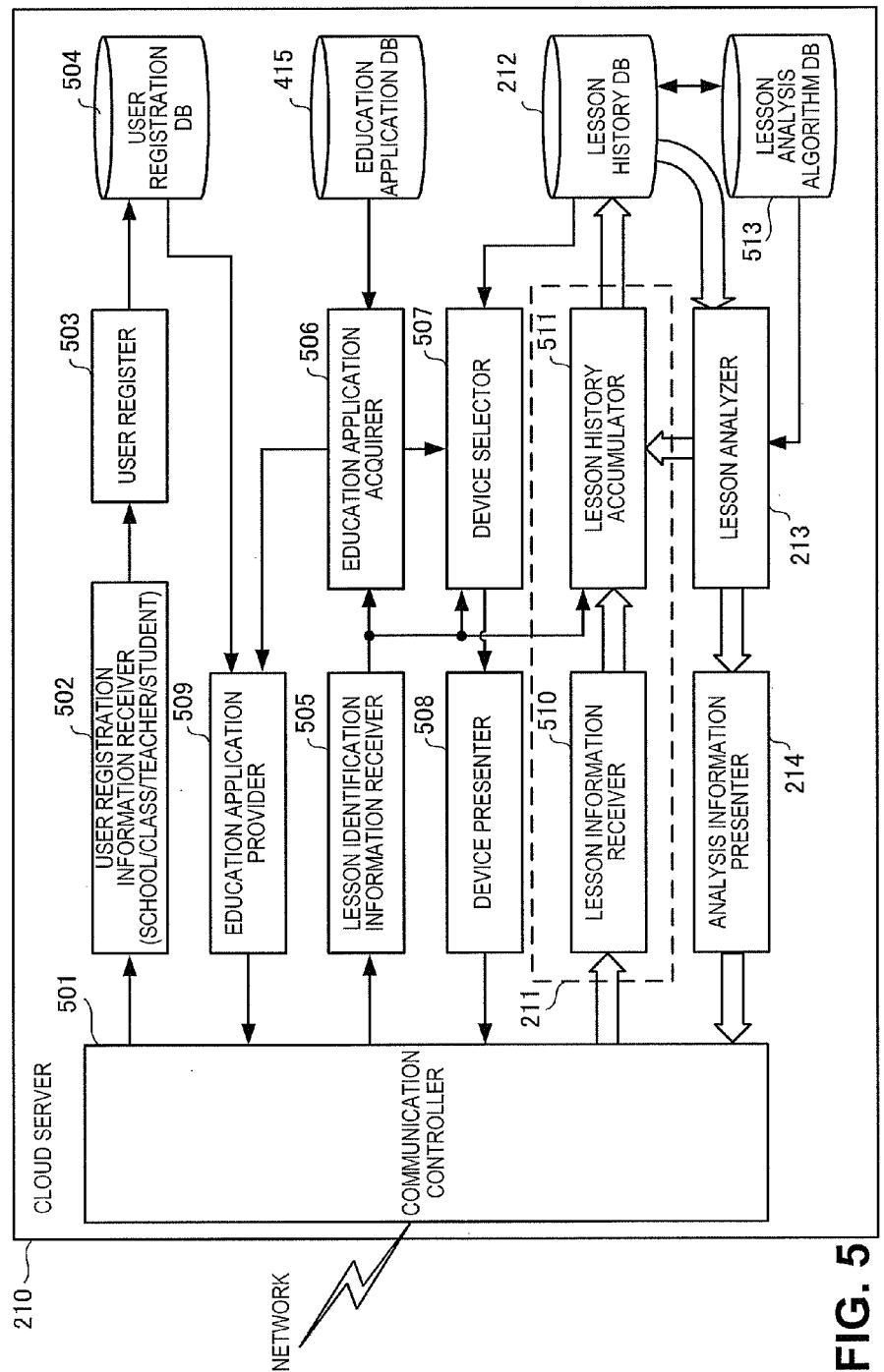
FIG. 5 is a block diagram showing the functional arrangement of the cloud server according to the second embodiment of the present invention.

FIG. 5 is a block diagram showing the functional arrangement of the cloud server 210 according to this embodiment.

The cloud server 210 includes a communication controller 501 that controls communication via the network 320. A user registration information receiver 502 receives received user registration information. For example, the user registration information includes information representing a school and class to which a user belongs, and also representing a teacher or a student. A user register 503 registers, in a user registration DB 504, user registration information received by the user registration information receiver 502 (see FIG. 7). A lesson identification information receiver 505 receives lesson identification information received from the teacher communication terminal 220. Based on the lesson identification information, an education application acquirer 506 acquires an education application corresponding to the lesson identification information from the education application DB 415 (see FIG. 8).

By referring to the education application acquired by the education application acquirer 506, and the lesson identification information, a device selector 507 selects a device for acquiring lesson information appropriate for lesson analysis from the lesson history accumulated in the lesson history DB 212. A device presenter 508 presents the selected device to the teacher communication terminal 220 or the student communication terminal 230 so as to connect the selected device. On the other hand, an education application provider 509 provides necessary software to the teacher communication terminal 220 or the student communication terminal 230 to execute it, in order to execute the education application acquired by the education application acquirer 506.

A lesson information receiver 510 and a lesson history accumulator 511 constitute the lesson information collector 211 in FIG. 3. The lesson information receiver 510 receives, from a communication terminal or a device connected to the communication terminal, pieces of lesson information such as expressions, motions, or remarks representing the reactions or evaluations of lesson participants including a teacher and students. The lesson history accumulator 511 accumulates the pieces of lesson information received by the lesson information receiver 510 in the lesson history DB 212 along with the lapse of time directly or after organizing them in association with lesson identification information, the education application, or the like (see FIGS. 9A to 9G). Note that the lesson history accumulator 511 accumulates the analysis information of the lesson analyzer 213 in the lesson history DB 212 in association with the lesson, the education application, and the like.

A lesson analysis algorithm DB 513 stores a lesson analysis algorithm for analyzing each lesson from the lesson history in the lesson history DB 212 (see FIG. 10). The lesson analyzer 213 selects an appropriate lesson analysis algorithm from the lesson analysis algorithm DB 513 based on the lesson history accumulated in the lesson history DB 212, and analyzes pieces of lesson information obtained from a corresponding lesson. The analysis information presenter 214 presents the lesson analysis information of the lesson analyzer 213 to the corresponding teacher communication terminal 220 or student communication terminal 230 to which the lesson was conducted.

In FIG. 5, the presentation of analysis information of a lesson in which a user participated is obtained. However, it is also easy to acquire, for example, analysis information of another lesson as a reference.

<<Functional Arrangement of Communication Terminal>>

Figure 6:
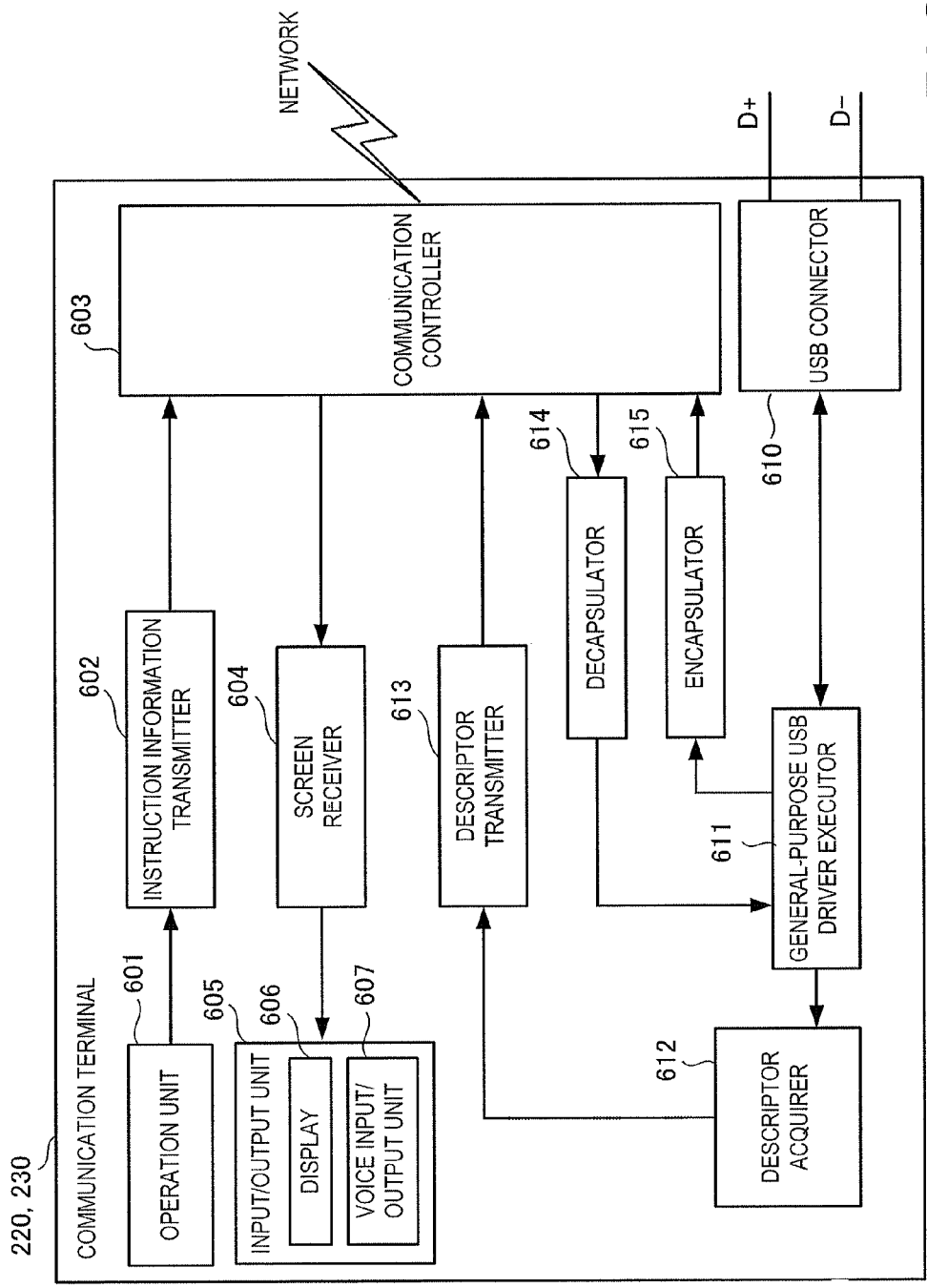
FIG. 6 is a block diagram showing the functional arrangement of a communication terminal according to the second embodiment of the present invention.

FIG. 6 is a block diagram showing the functional arrangement of the communication terminals 220 and 230 according to this embodiment. Note that the functional arrangement in this embodiment does not change regardless of whether the communication terminal is a PC or a portable terminal such as a smartphone.

Each of the communication terminals 220 and 230 according to this embodiment includes a communication controller 603 that controls communication with the cloud server 210 via the network. Also, each of the communication terminals 220 and 230 includes an operation unit 601 formed from a touch panel, a keyboard, and the like, an instruction information transmitter 602 that transmits an instruction from the operation unit 601 to the cloud server 210, and an input/output unit 605. A screen receiver 604 receives a shared screen, a lesson instruction screen, or a lesson analysis information display screen from the cloud server 210. The screen receiver 604 therefore constitutes an analysis information receiver and a proposal information receiver. The input/output unit 605 includes a display 606 that displays the shared screen, the lesson instruction screen, or the lesson analysis information display screen from the cloud server 210 that has been received by the screen receiver 604, and a voice input/output unit 607 that inputs/outputs a voice. The input/output unit 605 may include a position generator constituted by a camera and a GPS (Global Positioning System).

Each of the communication terminals 220 and 230 includes a USB connector 610 serving as a device connection connector for connecting a USB device. Each of the communication terminals 220 and 230 includes a general-purpose USB driver executor 611 for acquiring the descriptors of the devices 240 and 250 connected to the USB connector 610. Further, each of the communication terminals 220 and 230 includes a descriptor acquirer 612 that acquires the descriptors of the devices 240 and 250 from USB packets acquired by the general-purpose USB driver executor 611. Also, each of the communication terminals 220 and 230 includes a descriptor transmitter 613 that transmits the descriptors of the devices 240 and 250 acquired by the descriptor acquirer 612 to the cloud server 210.

Each of the communication terminals 220 and 230 includes a decapsulator 614 and encapsulator 615 for exchanging USB packets between the devices 240 and 250 connected to the USB connector 610 and the cloud server 210 via the general-purpose USB driver executor 611. The decapsulator 614 decapsulates an IP message from the cloud server 210. The encapsulator 615 performs IP encapsulation to the cloud server 210. The general-purpose USB driver executor 611, the decapsulator 614, and the encapsulator 615 relay device control by the cloud server 210.

In this embodiment, the instruction information transmitter 602 performs lesson identification information transmission and lesson information transmission. The screen receiver 604 performs to-be-connected device information reception and lesson identification information reception. When an operation unit, a display, or the like is connected as a device to the USB connector 610, lesson identification information transmission, lesson information transmission, device information reception, and lesson identification information reception are performed in each device by relay of the communication terminals 220 and 230.

FIG. 6 shows a case in which data transmission/reception between the cloud server 210 and the devices 240 and 250 is relayed. However, an arrangement in which a corresponding device driver is downloaded from the cloud server 210 to control the device, or an arrangement in which a device driver is installed in advance as in a PC to control the device is also possible.

(User Registration DB)

Figure 7:
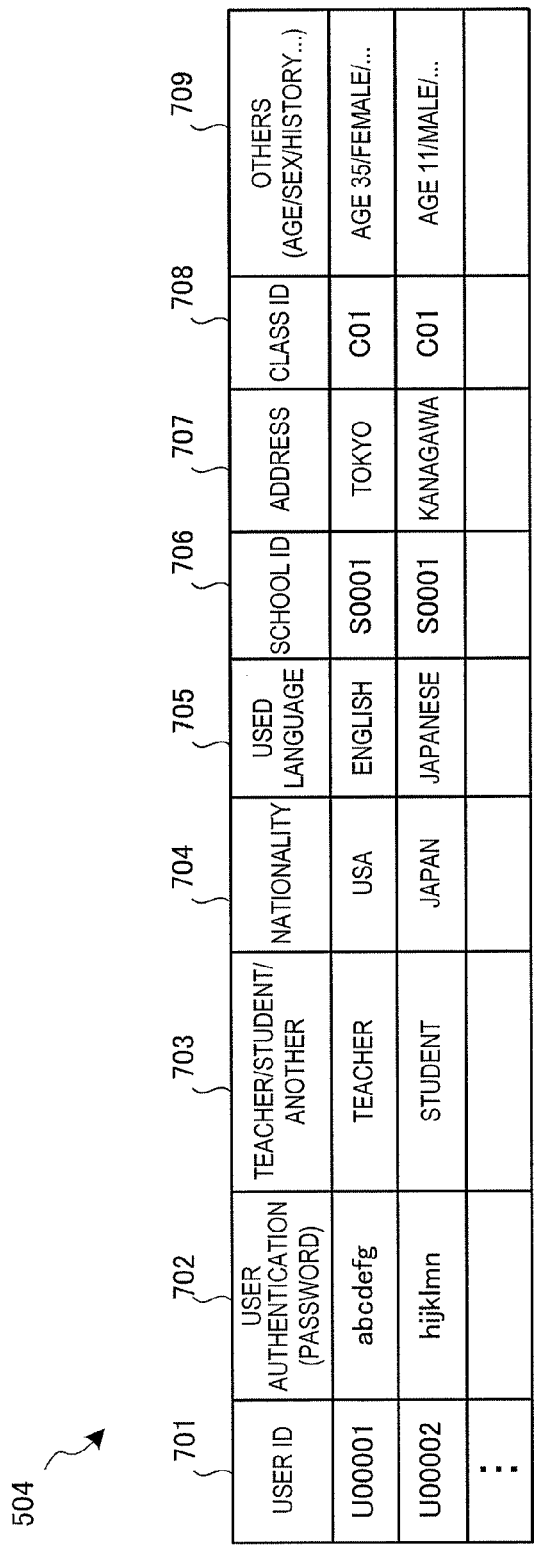
FIG. 7 is a table showing the arrangement of a user registration DB according to the second embodiment of the present invention.

FIG. 7 is a table showing the arrangement of the user registration DB 504 according to this embodiment. The user register 503 registers, in the user registration DB 504, a user who requests registration in the lesson improvement support system. Note that the arrangement of the user registration DB 504 is not limited to one in FIG. 7.

The user registration DB 504 stores, in association with a user ID 701, user authentication 702 such as a password, a user type 703 representing a teacher, a student, or another as the user, a nationality 704, and a used language 705. The user registration DB 504 also stores, in association with the user ID 701, an ID 706 of a school to which the user belongs, a school address 707, an ID 708 of a class to which the user belongs, and another data 709 including the age, sex, and history.

(Education Application DB)

FIG. 8 is a table showing the arrangement of the education application DB 415 according to the second embodiment of the present invention. An education application appropriate for a lesson to be conducted is selected from the education application DB 415 based on lesson identification information, and is executed. Note that the arrangement of the education application DB 415 is not limited to one in FIG. 8.

The education application DB 415 has a storage area 810 used to select an education application appropriate for a lesson to be conducted, and a storage area 820 used to store a combined tool such as teaching materials for executing a selected education application.

The storage area 810 of the education application DB 415 stores pieces of lesson identification information such as a country 812, a grade 813, a subject 814, and a target class 815 as conditions for selecting an education application ID 811 for identifying an education application. The information of the target lesson 815 includes teacher information, and class information representing the number of students in a class and the class level. The education application ID 811 appropriate for these pieces of lesson identification information is selected and executed by the cloud server 210.

The storage area 820 of the education application DB 415 stores a combined tool 822 used in combination with an education application ID 821 for identifying a selected education application. For example, as for a science experiment, a teaching material ID, a simulation content, a practice content, an experiment content, and the like are stored in a selectable manner in the combined tool 822. From the combined tool 822, a teacher may select a proper combination from his teacher communication terminal, or the cloud server 210 may refer to the history, and select and designate a proper combination.

(Lesson History DB)

The characteristic arrangement of the lesson history DB 212 according to this embodiment will be explained with reference to FIGS. 9A to 9I. Note that the arrangement of the lesson history DB 212 is not limited to those in FIGS. 9A to 9I. As the arrangement of the lesson history DB 212, an arrangement is shown, in which the lesson history DB 212 is organized by seven different items in order to clarify a data structure seen when the lesson history DB 212 according to this embodiment is used. However, these seven arrangements are not individually organized and accumulated. FIGS. 9A to 9I show the arrangement of the lesson history DB 212 plainly, and data of all the items may be integrated into one and linked so that they can be searched from each other.

FIG. 9A is a table showing an arrangement 910 in which the lesson history DB 212 according to this embodiment is accumulated for each collected lesson information. More specifically, lesson information is directly accumulated. In FIG. 9A, a reception date & time 912, an acquisition date & time 913, the ID of a user who acquired lesson information, lesson identification information 915, and data 916 of actual lesson information are stored in association with a lesson ID 911 for specifying collected lesson information. The lesson ID 911 may be a serial number assigned in the order of reception by the cloud server 210.

FIG. 9B is a table showing an arrangement 920 in which the lesson history DB 212 according to this embodiment is organized for each lesson. In FIG. 9B, lesson identification information 922, a lesson date & time 923, a use application ID 924, and analysis information 925 by the lesson analyzer 213 are stored in association with a lesson ID 921 for specifying a lesson.

Figure 9C:
FIG. 9C is a table showing the arrangement of the lesson history DB according to the second embodiment of the present invention.

FIG. 9C is a table showing an arrangement 930 in which the lesson history DB 212 according to this embodiment is organized for each class. In FIG. 9C, class information 932, a subject ID 933, a lesson ID 934, a use application ID 935, and analysis information 936 are stored in association with a class ID 931 for specifying a class.

FIG. 9D is a table showing an arrangement 940 in which the lesson history DB 212 according to this embodiment is organized for each teacher. In FIG. 9D, teacher information 942, a class ID 943, a subject ID 944, a lesson ID 945, a use application ID 946, and analysis information 947 are stored in association with a teacher ID 941 for specifying a teacher.

FIG. 9E is a table showing an arrangement 950 in which the lesson history DB 212 according to this embodiment is organized for each student. In FIG. 9E, student information 952, a subject ID 953, a lesson ID 954, a use application ID 955, and analysis information 956 are stored in association with a student ID 951 for specifying a student.

FIG. 9F is a table showing an arrangement 960 in which the lesson history DB 212 according to this embodiment is organized for each education application. In FIG. 9F, application information 962, a country ID 963, a school ID 964, a class ID 965, a used teaching material ID 966, and a combination 967 of a selected experiment practice and simulation are stored in association with an education ID 961 for specifying an education application. Also, lesson information 968 collected from a lesson, and analysis information 969 are stored.

FIG. 9G is a table showing an arrangement 970 in which the lesson history DB 212 according to this embodiment is organized by a successful case of a lesson. In FIG. 9G, an application ID 972, a country ID 973, a school ID 974, a class ID 975, a subject ID 976, a lesson ID 977, a teacher ID 978, and a successful case content 979 are stored in association with a successful case ID 971 for specifying a successful case. Note that failure cases are similarly accumulated.

FIG. 9I is a table showing the arrangement of a club activity history 980 accumulated in the lesson history DB 212 according to this embodiment. In this fashion, the lesson history DB 212 can include the history of outdoor learning, a club activity, or another educational activity in addition to a lesson in a classroom. In FIG. 9I, club activity information 982, an activity date & time 983, a use application ID 984, collected activity content & activity information 985, and analysis information 986 by the lesson analyzer 213 are stored in association with a club activity ID 981. Note that the club activity information 982 includes a country ID, a school ID, and as for an athletic club, the type such as baseball or football, the level, and the number of members.

As described above, if the history of pieces of lesson information linked to be sortable is accumulated in the lesson history DB 212, the analysis of pieces of lesson information described in the embodiment becomes possible.

(Lesson Analysis Algorithm DB)

FIG. 10 is a table showing the arrangement of the lesson analysis algorithm DB 513 according to this embodiment. The lesson analyzer 213 analyzes lesson information by selecting a lesson analysis algorithm appropriate for a lesson from the lesson analysis algorithm DB 513, or selecting a lesson analysis algorithm complying with a selection instruction from a user. Note that the arrangement of the lesson analysis algorithm DB 513 is limited to one in FIG. 10.

In association with a lesson analysis algorithm ID 1001 for specifying a lesson analysis algorithm, the lesson analysis algorithm DB 513 stores pieces of lesson information 1002 to be collected, and pieces of analysis information 1003 to be analyzed by the lesson analysis algorithm. The lesson analysis algorithm DB 513 includes a lesson evaluation algorithm group 1010 for analyzing and evaluating an entire lesson, and a lesson evaluation algorithm group 1020 for analyzing and evaluating a lesson in time series along with the course of the lesson.

(Device Driver DB)

FIG. 11 is a table showing the arrangement of the device driver DB 414 according to this embodiment. The device driver DB 414 stores a device driver for driving a device that acquires pieces of lesson information to be collected in an education application selected based on lesson identification information. Note that the arrangement of the device driver DB 414 is not limited to one in FIG. 11.

The device driver DB 414 stores, in association with a device ID 1101 for specifying a device, device information 1102 such as the performance and version of the device, and a plurality of available device drivers 1103.

Note that the device DB 413 shown in FIG. 4C will readily occur to those skilled in the art, so the illustration and description thereof will be omitted here.

<<Hardware Arrangement of Cloud Server>>

Figure 12:
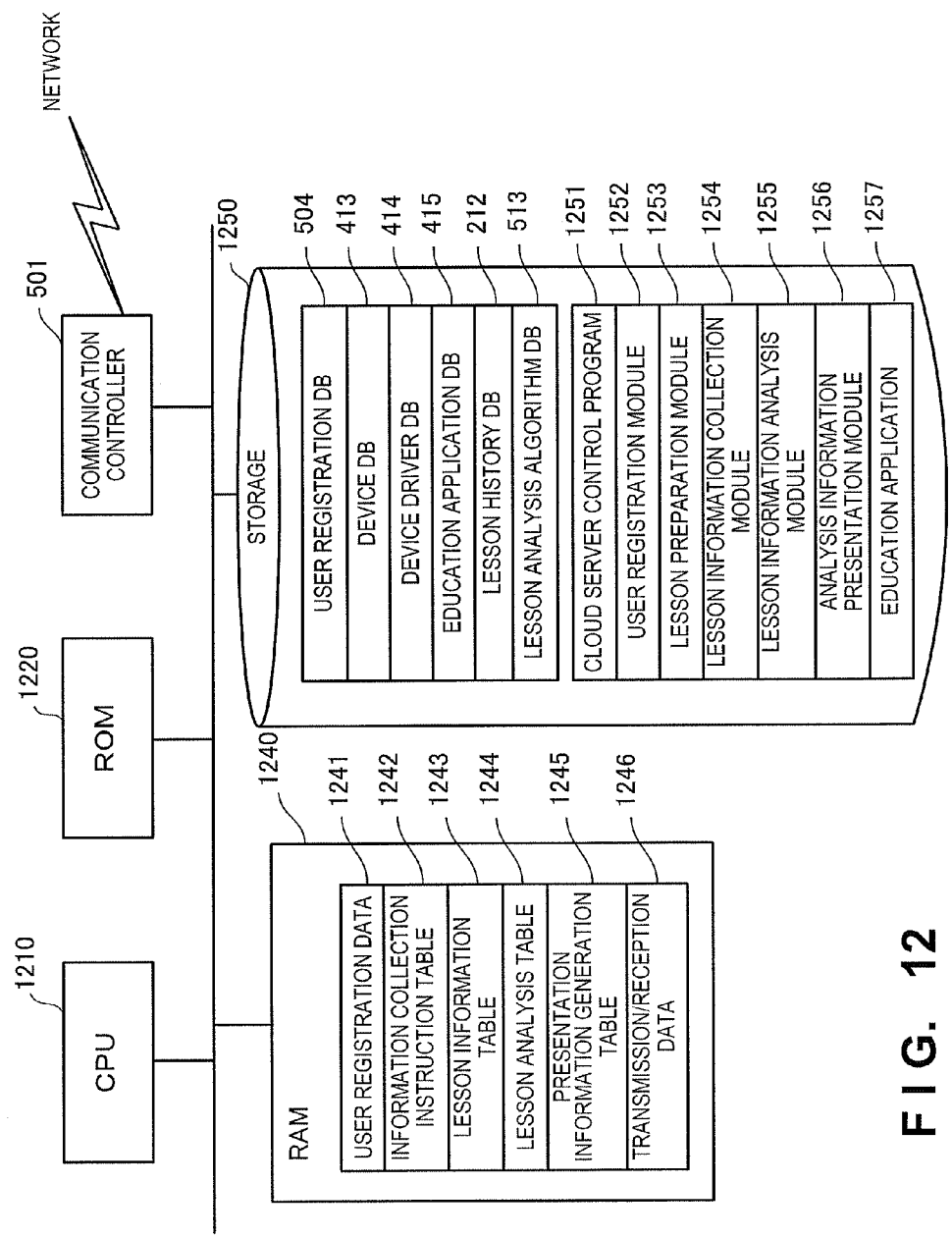
FIG. 12 is a block diagram showing the hardware arrangement of the cloud server according to the second embodiment of the present invention.

FIG. 12 is a block diagram showing the hardware arrangement of the cloud server 210 according to this embodiment.

In FIG. 12, a CPU (Central Processing Unit) 1210 is an arithmetic control processor, and executes a program to implement each functional building part of the cloud server 210 in FIG. 5. A ROM (Read Only Memory) 1220 stores permanent data and programs such as initial data and programs. The communication controller 501 communicates with the teacher communication terminal 220 and the student communication terminal 230 via the network 320. Note that the CPU 1210 may not be limited to one and may include a plurality of CPUs or an image processing GPU (Graphics Processing Unit). The communication controller 501 desirably includes a CPU independent of the CPU 1210, and writes or reads out transmission/reception data in or from the area of a RAM 1240. A DMAC (Direct Memory Access Controller) that transfers data between the RAM 1240 and a storage 1250 is desirably arranged. The CPU 1210 recognizes that data has been received in or transferred to the RAM 1240, and processes the data. The CPU 1210 prepares the processing result in the RAM 1240, and leaves subsequent transmission or transfer to the communication controller 501 or the DMAC.

The RAM (Random Access Memory) 1240 is used as a temporary storage work area by the CPU 1210. In the RAM 1240, an area for storing data necessary to implement this embodiment is allocated. User registration data 1241 is data for user registration received from the communication terminal 220 or 230. An information collection instruction table 1242 is a table for selecting a device to be used or an information collection device that should be connected based on lesson identification information received from the teacher communication terminal 220 (see FIG. 13). A lesson information table 1243 is a table for storing pieces of lesson information representing the reactions or evaluations of a teacher and students that have been collected from the devices 240 and 250 (see FIG. 14). A lesson analysis table 1244 is a table for analyzing collected pieces of lesson information (see FIG. 15). A presentation information generation table 1245 is a table for generating information for presenting analysis information to a teacher and students (see FIG. 16). Transmission/reception data 1246 is data that is transmitted/received by the communication controller 501 via the network 320. Assume that the storage location of the transmission/reception data 1246 has been specified in correspondence with each data type.

The storage 1250 stores databases, various parameters, or the following data or programs necessary to implement this embodiment. The user registration DB 504 is a database shown in FIG. 7 in which a user is registered. As shown in FIG. 4C, the device DB 413 is a database for specifying a device from a descriptor. The device driver DB 414 is a database shown in FIG. 11 in which a device driver is stored in correspondence with a device. The education application DB 415 is a database shown in FIG. 8 in which an education application is stored in correspondence with lesson identification information. The lesson history DB 212 is a database shown in FIGS. 9A to 9G in which the history of pieces of lesson information acquired from each lesson is accumulated. The lesson analysis algorithm DB 513 is a database shown in FIG. 10 in which a lesson analysis algorithm is stored.

The storage 1250 stores the following programs. A cloud server control program 1251 is a program that controls the overall cloud server 210. A user registration module 1252 is a module that performs user registration requested from a communication terminal in the cloud server control program 1251. A lesson preparation module 1253 is a module that selects a device to be connected in correspondence with lesson identification information designated from a teacher communication terminal in the cloud server control program 1251. A lesson information collection module 1254 is a module that collects pieces of lesson information detected by respective devices during a lesson and accumulates them in the lesson history DB 212 in the cloud server control program 1251. A lesson information analysis module 1255 is a module that reads out a lesson analysis algorithm from the lesson analysis algorithm DB 513 and analyzes a lesson. An education application 1257 is a program that is read out from the education application DB 415 and executed. In FIG. 12, the illustrations of device recognition and a device driver are omitted.

In the RAM 1240 and the storage 1250 in FIG. 12, programs and data associated with the general-purpose functions of the cloud server 210 and other implementable functions are not illustrated.

(Information Collection Instruction Table)

Figure 13:
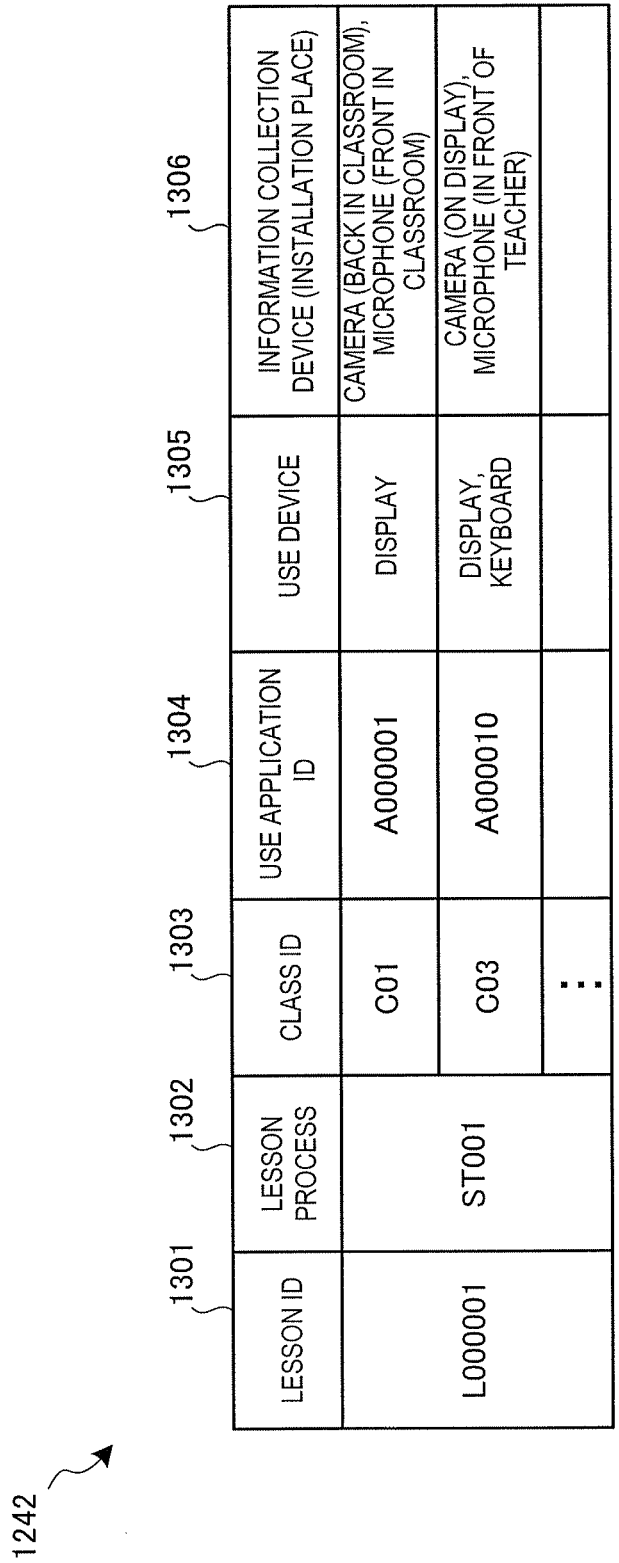
FIG. 13 is a table showing the arrangement of an information collection instruction table according to the second embodiment of the present invention.

FIG. 13 is a table showing the arrangement of the information collection instruction table 1242 according to this embodiment. The information collection instruction table 1242 is a table for selecting, based on lesson identification information received from a teacher communication terminal, a device to be used in a lesson and a device necessary to collect pieces of lesson information. The device selector 507 and the device presenter 508 use the information collection instruction table 1242.

In association with a lesson ID 1301 specified from lesson identification information, a lesson process 1302, a class ID 1303, and the like, the information collection instruction table 1242 stores a selected use application ID 1304, a use device 1305 that is used in a lesson, and a lesson collection device 1306 for collecting lesson information.

(Lesson Information Table)

FIG. 14 is a table showing the arrangement of the lesson information table 1243 according to this embodiment. The lesson information table 1243 is a table that receives and stores lesson information detected by each device. The lesson information receiver 510 and the lesson history accumulator 511 use the lesson information table 1243.

The lesson information table 1243 stores collected pieces of lesson information 1403 in association with a lesson ID 1401 and lesson identification information 1402.

(Lesson Analysis Table)

Figure 15:
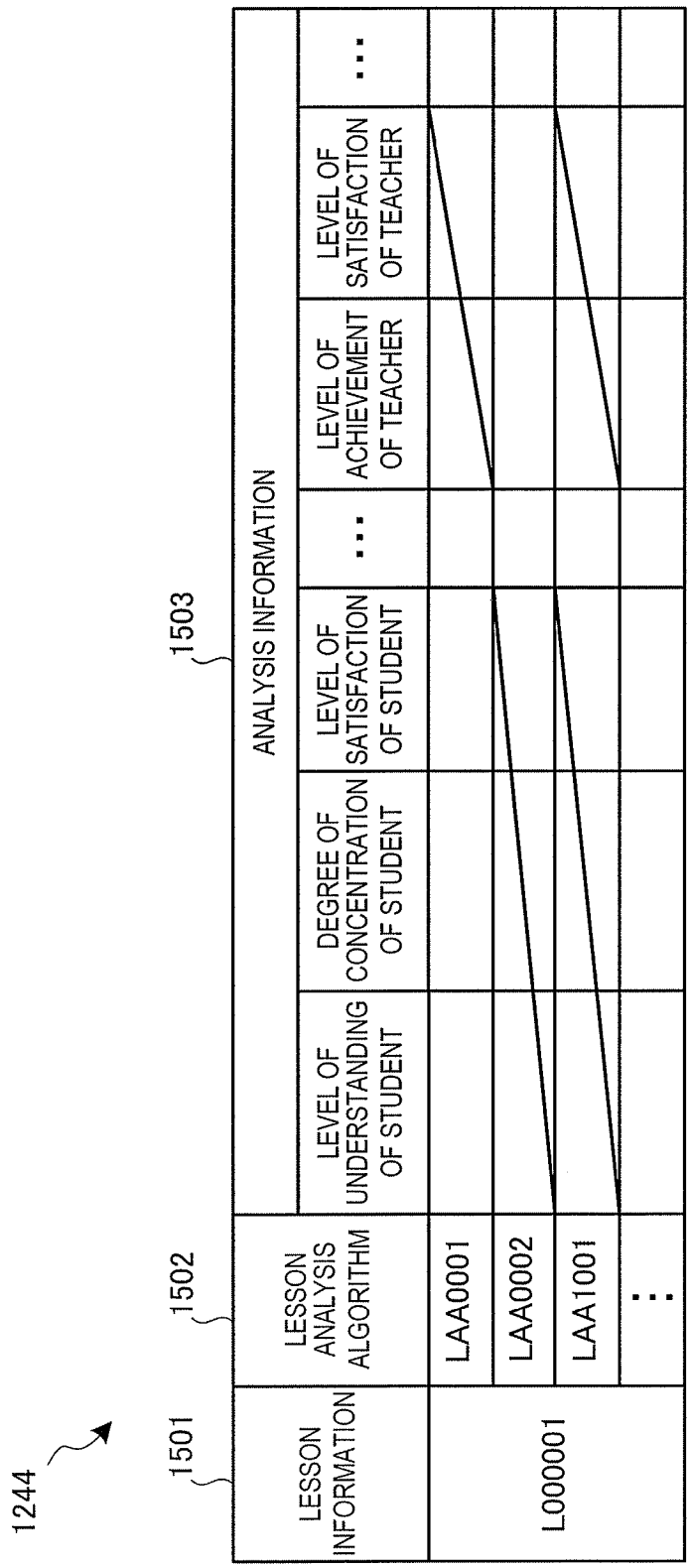
FIG. 15 is a table showing the arrangement of a lesson analysis table according to the second embodiment of the present invention.

FIG. 15 is a table showing the arrangement of the lesson analysis table 1244 according to this embodiment. The lesson analysis table 1244 is a table for analyzing collected pieces of lesson information in accordance with a lesson analysis algorithm and generating pieces of analysis information. The lesson analyzer 213 uses the lesson analysis table 1244.

The lesson analysis table 1244 stores pieces of analysis information 1503 analyzed by each lesson analysis algorithm 1502 based on collected lesson information 1501.

(Presentation Information Generation Table)

FIG. 16 is a table showing the arrangement of the presentation information generation table 1245 according to this embodiment. The presentation information generation table 1245 is a table for generating pieces of presentation information suited to a user at each transmission destination from the analysis information of lesson information. The analysis information presenter 214 uses the presentation information generation table 1245.

The presentation information generation table 1245 stores, in association with a user ID 1601, a presentation information transmission destination address 1602, a type 1603 representing a teacher, a student, or another, a used lesson analysis algorithm 1604, and analysis information 1605. The presentation information generation table 1245 stores pieces of presentation information 1606 that are generated based on the piece of information from the analysis information 1605 and are suited to the user at the transmission destination.

<<Processing Procedure of Cloud Server>>

Figure 17:
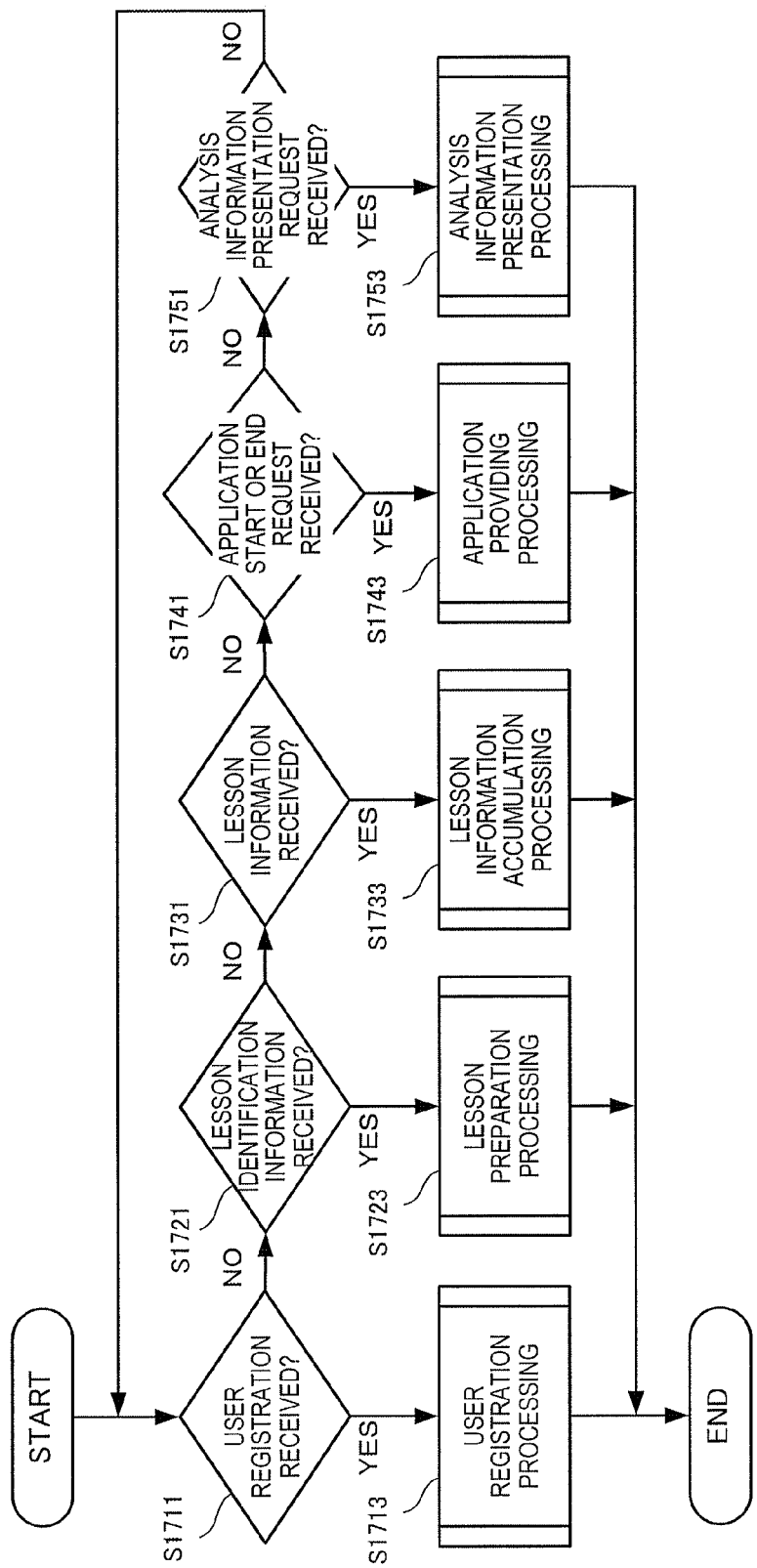
FIG. 17 is a flowchart showing the processing procedure of the cloud server according to the second embodiment of the present invention.

FIG. 17 is a flowchart showing the processing procedure of the cloud server 210 according to this embodiment. The CPU 1210 in FIG. 12 executes this flowchart using the RAM 1240, thereby implementing the functional building parts in FIG. 5. Note that the CPU 1210 recognizes that data has been received in or transferred to the RAM 1240, and processes the data. In addition, the CPU 1210 prepares the processing result in the RAM 1240, and leaves subsequent transmission or transfer to the communication controller 501 or the DMAC. This arrangement will be explained as an example.

In step S1711, the CPU 1210 determines whether user registration data has been received. If user registration data has been received, the CPU 1210 advances to step S1713 to perform user registration processing (see FIG. 18A). If no user registration data has been received, the CPU 1210 determines in step S1721 whether lesson identification information has been received. If lesson identification information has been received, the CPU 1210 advances to step S1723 to perform lesson preparation processing (see FIG. 18B). If no lesson identification information has been received, the CPU 1210 determines in step S1731 whether lesson information has been received. If lesson information has been received, the CPU 1210 advances to step S1733 to perform lesson information accumulation processing (see FIG. 18C). If no lesson information has been received, the CPU 1210 determines in step S1741 whether an education application start request or end request has been received. If the start request or end request has been received, the CPU 1210 advances to step S1743 to perform application providing processing (see FIG. 18D). If neither the start request nor end request has been received, the CPU 1210 determines in step S1751 whether an analysis information presentation request has been received. If the analysis information presentation request has been received, the CPU 1210 advances to step S1753 to perform analysis information presentation processing (see FIG. 18E).

(User Registration Processing)

FIG. 18A is a flowchart showing the procedure of user registration processing (S1713) according to this embodiment.

In step S1811, the CPU 1210 acquires the user registration data 1241 from the RAM 1240. In step S1813, the CPU 1210 registers the user registration data 1241 in the user registration DB 504.

(Lesson Preparation Processing)

FIG. 18B is a flowchart showing the procedure (S1723) of lesson preparation processing according to this embodiment.

In step S1821, the CPU 1210 acquires lesson identification information from the transmission/reception data 1246 in the RAM 1240. Then, in step S1823, the CPU 1210 generates the information collection instruction table 1242, and selects an education application to be used from the education application DB 415 by referring to even the lesson history DB 212 based on a lesson ID specified from the lesson identification information. In step S1825, the CPU 1210 selects, from the selected education application and the lesson history in the lesson history DB 212, a device to be used for the lesson, a lesson information collection device, and their installation positions. In step S1827, the CPU 1210 issues an instruction to present, on a teacher communication terminal or a student communication terminal, the selected device to be used for the lesson, the selected lesson information collection device, and their selected installation positions.

(Lesson Information Accumulation Processing)

Figure 18C:
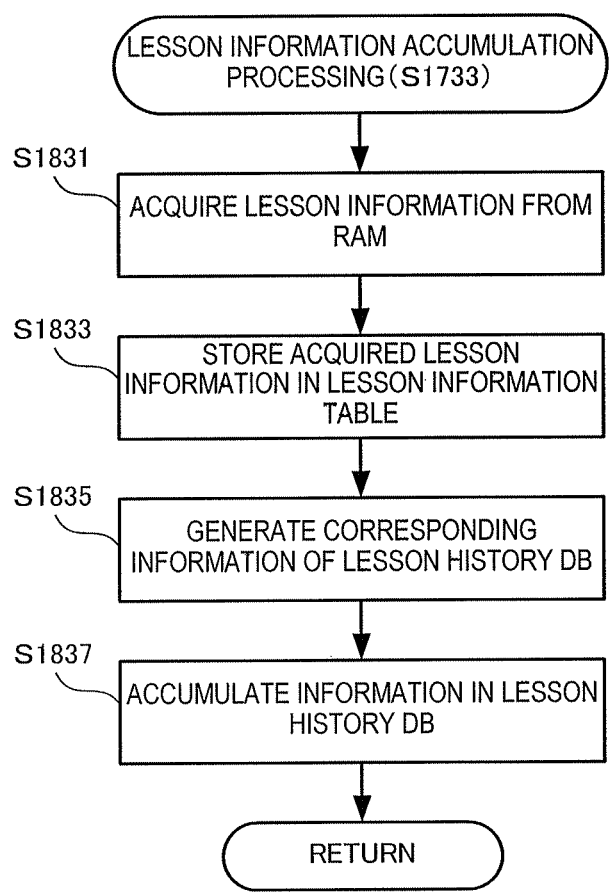
FIG. 18C is a flowchart showing the procedure of lesson information accumulation processing according to the second embodiment of the present invention.

FIG. 18C is a flowchart showing the procedure of lesson information accumulation processing (S1733) according to this embodiment.

In step S1831, the CPU 1210 acquires lesson information from the transmission/reception data 1246 in the RAM 1240. Then, in step S1833, the CPU 1210 stores the acquired lesson information in the lesson information table 1243. In step S1835, the CPU 1210 generates information of an arrangement to be stored in the lesson history DB 212. In step S1837, the CPU 1210 accumulates the acquired lesson information in the lesson history DB 212.

(Application Providing Processing)

Figure 18D:
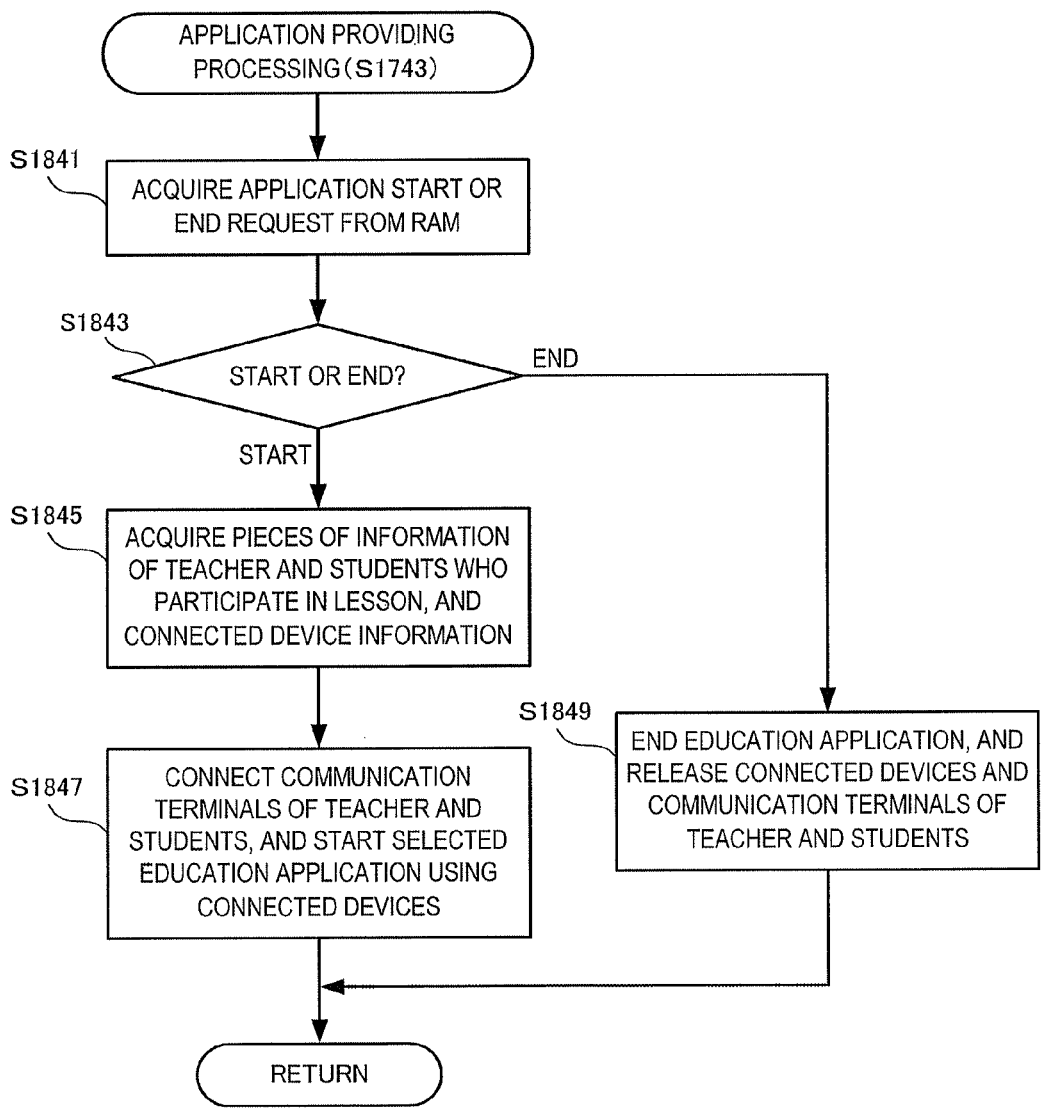
FIG. 18D is a flowchart showing the procedure of education application providing processing according to the second embodiment of the present invention.

FIG. 18D is a flowchart showing the procedure of education application providing processing (S1743) according to this embodiment.

In step S1841, the CPU 1210 acquires an education application start request or end request from the transmission/reception data 1246 in the RAM 1240. In step S1843, the CPU 1210 determines which of the start request or the end request has been acquired. If the start request has been acquired, the CPU 1210 advances to step S1845 to acquire pieces of information of a teacher and students who are to participate in a lesson, and connected device information. In step S1847, the CPU 1210 connects a teacher communication terminal and student communication terminals, and uses the connected devices to start the selected education application. If the end request has been acquired, the CPU 1210 advances to step S1849 to end the education application, and release the connected devices, the teacher communication terminal, and the student communication terminals.

(Analysis Information Presentation Processing)

FIG. 18E is a flowchart showing the procedure of analysis information presentation processing (S1753) according to this embodiment.

In step S1851, the CPU 1210 acquires an analysis information presentation request from the transmission/reception data 1246 in the RAM 1240. In step S1853, the CPU 1210 identifies a user at the request destination. In step S1855, the CPU 1210 determines a teacher or a student as the user at the request destination. If the user is a teacher, the CPU 1210 advances to step S1857 to select a lesson analysis algorithm for the teacher from the lesson analysis algorithm DB 513. If the user is a student, the CPU 1210 advances to step S1859 to select a lesson analysis algorithm for the student from the lesson analysis algorithm DB 513.

In step S1861, the CPU 1210 executes lesson analysis processing using the selected lesson analysis algorithm. In step S1863, the CPU 1210 generates lesson analysis information suited to the request destination user, and instructs the communication controller 501 to transmit the lesson analysis information.

<<Hardware Arrangement of Communication Terminal>>

Figure 19:
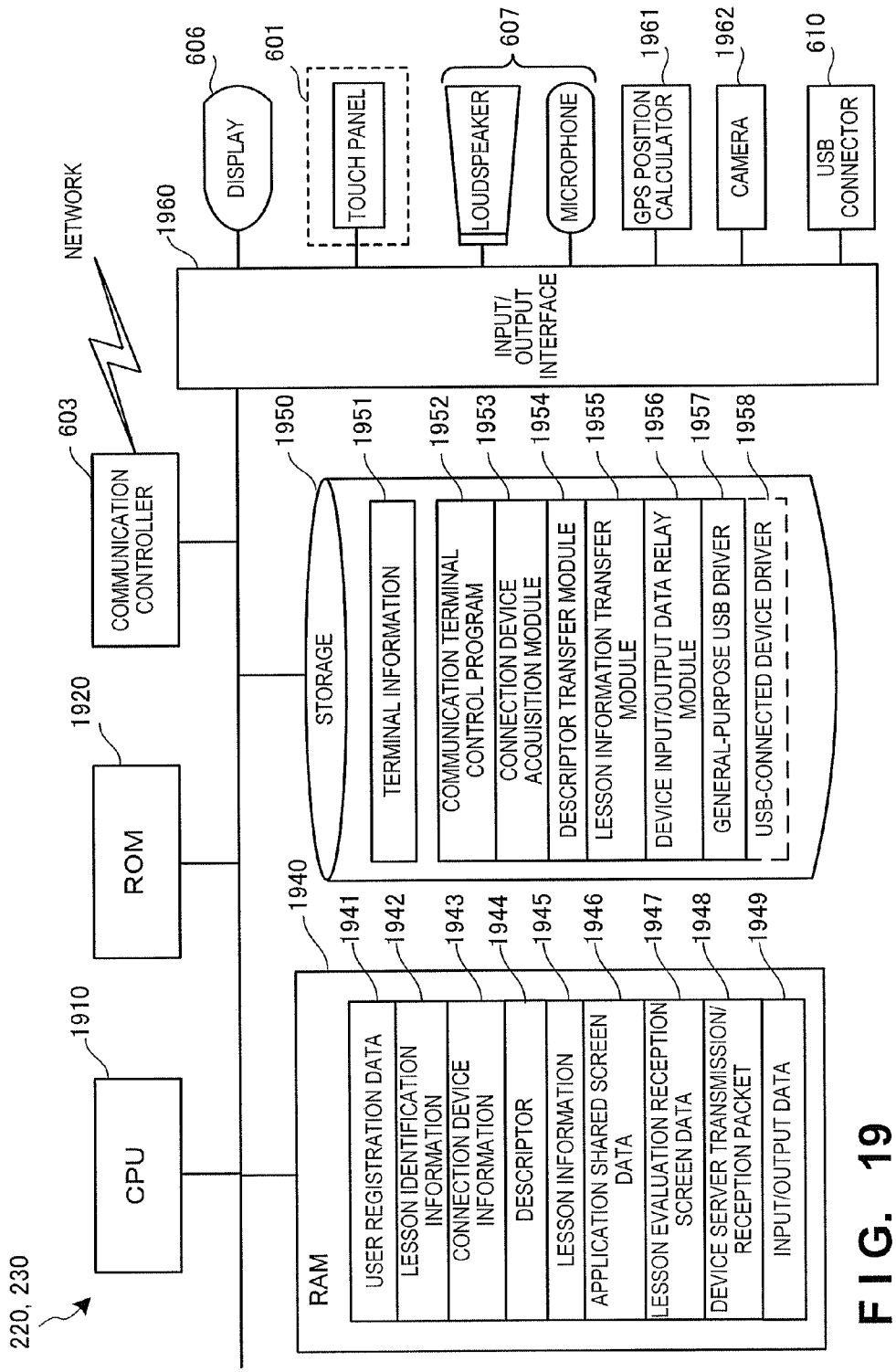
FIG. 19 is a block diagram showing the hardware arrangement of the communication terminal according to the second embodiment of the present invention.

FIG. 19 is a block diagram showing the hardware arrangement of the communication terminals 220 and 230 according to this embodiment. Note that the basic arrangement does not change regardless of whether the communication terminals 220 and 230 are PCs or portable terminals such as a smartphone.

In FIG. 19, a CPU 1910 is an arithmetic control processor, and executes a program to implement the functional building parts of each of the communication terminals 220 and 230 in FIG. 6. A ROM 1920 stores permanent data and programs such as initial data and programs. The communication controller 603 communicates with the cloud server 210 via the network 320. Note that the CPU 1910 may not be limited to one and may include a plurality of CPUs or an image processing GPU. The communication controller 603 desirably includes a CPU independent of the CPU 1910, and writes or reads out transmission/reception data in or from the area of a RAM 1940. A DMAC that transfers data between the RAM 1940 and a storage 1950 is desirably arranged (not shown). Further, an input/output interface 1960 desirably includes a CPU independent of the CPU 1910, and writes or reads out input/output data in or from the area of the RAM 1940. The CPU 1910 recognizes that data has been received in or transferred to the RAM 1940, and processes the data. The CPU 1910 prepares the processing result in the RAM 1940, and leaves subsequent transmission or transfer to the communication controller 603, the DMAC, or the input/output interface 1960.

The RAM 1940 is a random access memory used as a temporary storage work area by the CPU 1910. In the RAM 1940, an area for storing data necessary to implement this embodiment is allocated. User registration data 1941 is data input by a user for the purpose of user registration in the cloud server 210. Lesson identification information 1942 is information for specifying a lesson input by a teacher in the teacher communication terminal 220. Connection device information 1943 is information of a device to be connected that has been received from the cloud server 210. A descriptor 1944 is device information read out from a device connected to the USB connector 610. Lesson information 1945 is information that is collected by a device and represents the reaction or evaluation of a teacher or student serving as a user to a lesson. Application shared screen data 1946 is shared screen display data received from the cloud server 210. Lesson evaluation reception screen data 1947 is lesson evaluation result display screen data received from the cloud server 210. A device server transmission/reception packet 1948 includes packets to be input/output to/from a USB device, and IP-encapsulated packets to be transmitted/received to/from the cloud server 210 via the communication controller 603. Input/output data 1949 is data to be input/output via the input/output interface 1960.

The storage 1950 stores databases, various parameters, or the following data or programs necessary to implement this embodiment. Terminal information 1951 is information including the identifier of the communication terminal. The storage 1950 stores the following programs. A communication terminal control program 1952 is a control program for controlling each of the entire communication terminals 220 and 230. A connection device acquisition module 1953 is a module that transmits input lesson identification information to the cloud server 210 and acquires information of a device to be connected as a response in the communication terminal control program 1952. A descriptor transfer module 1954 is a module that transfers a descriptor acquired from a connected device to the cloud server 210. A lesson information transfer module 1955 is a module for transferring, to the cloud server 210, lesson information representing the reaction or evaluation of a teacher or student detected by a connected device. A device input/output data relay module 1956 is a module that relays input/output of data between the cloud server 210 and a connected device. A general-purpose USB driver 1957 is a program that executes the basic USB protocol of device descriptor readout or the like. A USB-connected device driver 1958 is a program downloaded from the cloud server 210 when the communication terminal has a function of executing a device driver. If the communication terminal can share part of an education application, this program may be stored in the storage 1950.

The input/output interface 1960 interfaces input/output data to/from an input/output device. The display 606, and the operation unit 601 formed from a touch panel or the like are connected to the input/output interface 1960. The voice input/output unit 607 formed from a loudspeaker and a microphone is also connected. Further, a GPS position generator 1961, a camera 1962, and the like are connected. In addition, the USB connector 610 is connected.

In the RAM 1940 and the storage 1950 in FIG. 19, programs and data associated with the general-purpose functions of the communication terminals 220 and 230 and other implementable functions are not illustrated.

<<Processing Procedure of Communication Terminal>>

Figure 20:
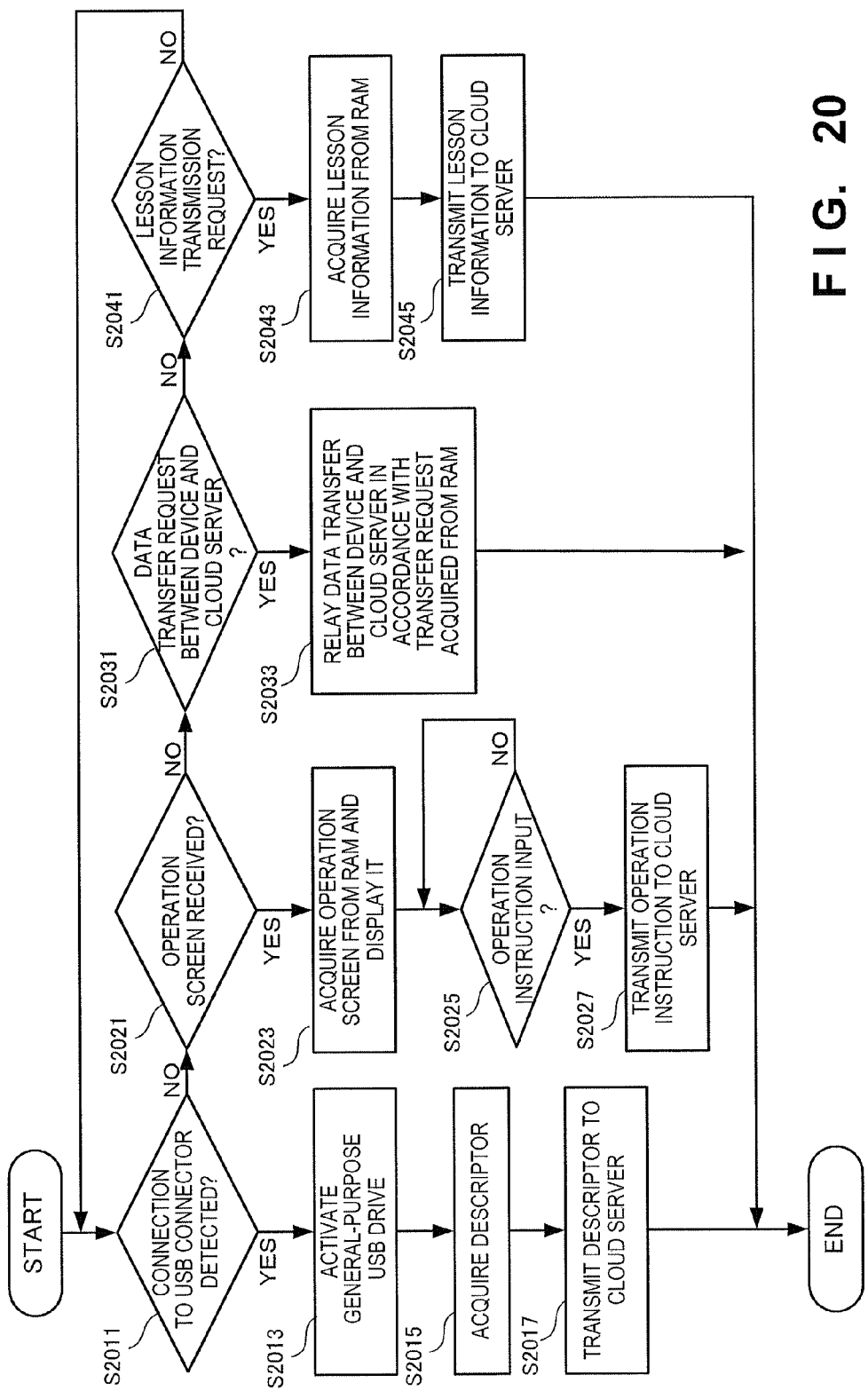
FIG. 20 is a flowchart showing the processing procedure of the communication terminal according to the second embodiment of the present invention.

FIG. 20 is a flowchart showing the processing procedure of the communication terminals 220 and 230 according to this embodiment. The CPU 1910 in FIG. 19 executes this flowchart using the RAM 1940, thereby implementing the functional building parts in FIG. 6.

In response to generation of an event, the CPU 1910 determines its content. In step S2011, the CPU 1910 determines whether a device has been connected to the USB connector. If no device has been connected to the USB connector, the CPU 1910 determines in step S2021 whether the event is reception of an operation screen from the cloud server 210. If the event is neither device connection to the USB connector or reception of an operation screen, the CPU 1910 determines in step S2031 whether data directed to a device has been received from the cloud server 210 or whether data from a device has been received. If the event is none of device connection to the USB connector, reception of an operation screen, and data transfer, the CPU 1910 determines in step S2041 whether the event is a request to transmit lesson information detected by a communication terminal or a connected device.

If a device has been connected to the USB connector, the CPU 1910 advances from step S2011 to step S2013 to activate a general-purpose USB drive. In step S2015, the CPU 1910 acquires the descriptor of the device. In step S2017, the CPU 1910 transmits the acquired descriptor to the cloud server 210.

If the event is reception of an operation screen, the CPU 1910 advances from step S2021 to step S2023 to acquire the operation screen from the application shared screen data 1946 in the RAM 1940 and display it on the display 606. In step S2025, the CPU 1910 waits for an operation input from a user. If there is an operation input from a user, the CPU 1910 advances to step S2027 to acquire an operation instruction from the input/output data 1949 in the RAM 1940, and instruct the communication controller 603 about transmission to the cloud server 210.

If the event is a request to transfer data directed to a device from the cloud server 210 or a request to receive data directed to the cloud server 210 from a device, the process advances from step S2031 to step S2033. In step S2033, the CPU 1910 designates data transfer of the device server transmission/reception packet 1948 in the RAM 1940 to the device or the cloud server.

If the CPU 1910 determines that the event is a lesson information transmission request, it advances from step S2041 to step S2043 to acquire lesson information from the input/output data 1949 in the RAM 1940 and store it in the lesson information 1945. In step S2045, the CPU 1910 instructs the communication controller 603 to transmit the lesson information 1945 to the cloud server 210.

According to the second embodiment, information necessary to evaluate a lesson by referring to history information is selectively acquired, and analysis leading to a more accurate lesson evaluation becomes possible.

[Third Embodiment]

A lesson improvement support system including a cloud server serving as an information processing apparatus according to the third embodiment of the present invention will be described next. This embodiment will give an explanation in regard to, for example, a lesson that is conducted by a teacher to students in a classroom, but the present invention is not limited to this. The cloud server according to the third embodiment is different from the second embodiment in that more accurate analysis is performed by combining a plurality of reactions or evaluations because an evaluation based on one reaction of a lesson participant is unreliable. For example, how to express a reaction or evaluation changes between countries or regions, so erroneous recognition that the same motion or expression represents a different reaction or evaluation occurs. When Japanese hears a conversation between Chinese, the voice sounds as if they quarreled. However, by combining the voice with an expression, the reaction or evaluation can be recognized more accurately and a lesson can also be analyzed more accurately. In many countries, patting the children's head is recognized as an action to praise him. However, in Nepal, it is believed that the god resides on the children's head, and it is a taboo to pat the children's head. For this reason, even if a teacher does not pat the children's head, it cannot be determined that the understanding of a lesson by the student is insufficient. According to the third embodiment, reactions or evaluations, which become unreliable from one piece of information, are grasped more accurately.

The third embodiment aims to collect pieces of lesson information in consideration of even such a habit and custom by referring to a lesson history DB. Note that the remaining arrangement and operation are the same as those in the second embodiment, and a detailed description of the same arrangement and operation will not be repeated.

According to the third embodiment, a mistake of a reaction or evaluation owing to the difference in habit or custom between countries or regions is reduced, and analysis leading to a more accurate lesson evaluation becomes possible.

<<Lesson Improvement Support System>>

A lesson improvement support system 2100 including a cloud server 2110 serving as an information processing apparatus according to this embodiment will be described with reference to FIGS. 21 and 22.

Figure 21:
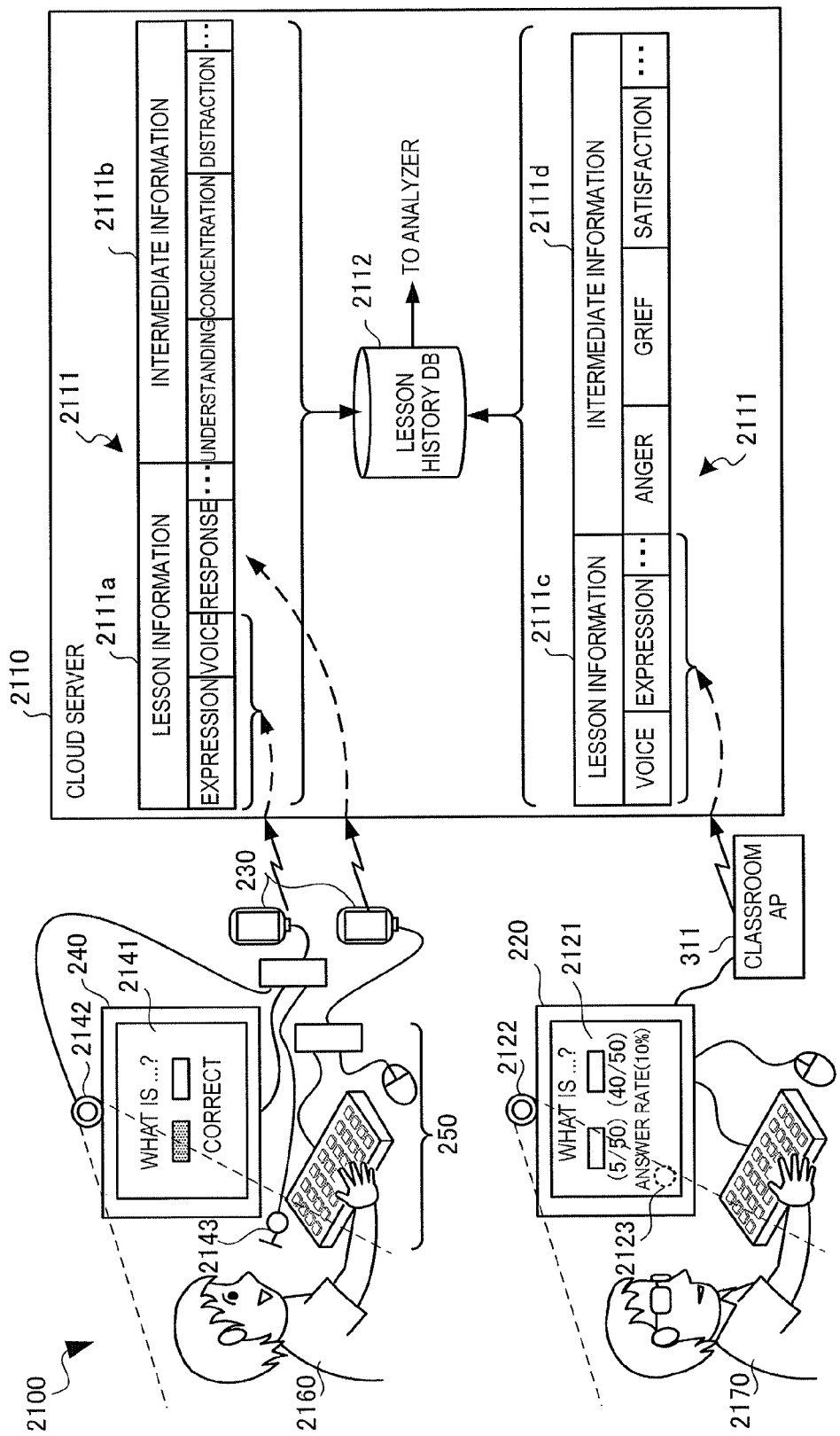
FIG. 21 is a view showing an outline of a lesson improvement support system including a cloud server according to the third embodiment of the present invention.
Figure 22:
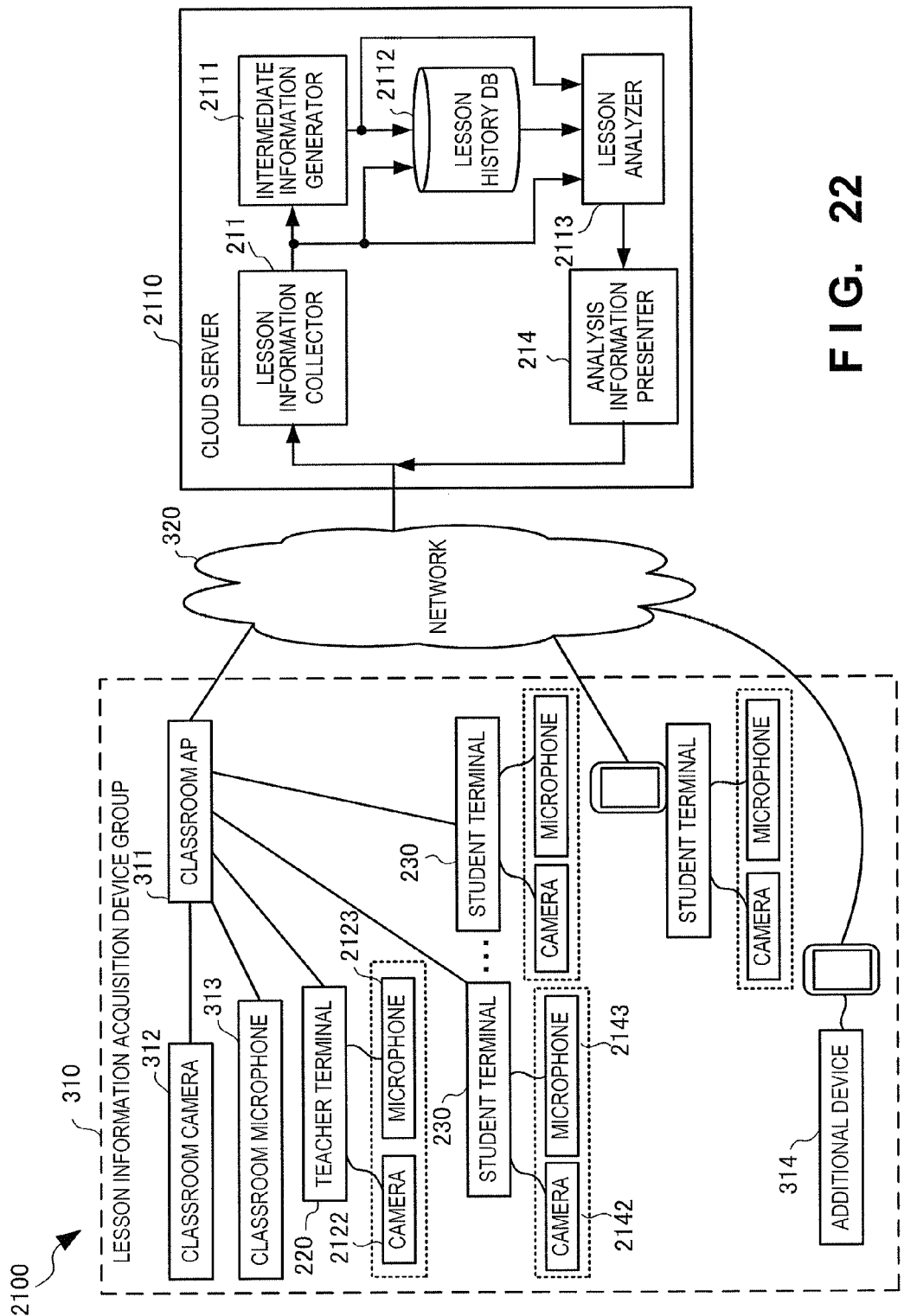
FIG. 22 is a view showing the arrangement of the lesson improvement support system including the cloud server according to the third embodiment of the present invention.

Although FIGS. 21 and 22 show an example in which a communication terminal for a teacher is a PC and portable terminals such as a smartphone are used as some communication terminals for students, the communication terminal for a teacher may be a portable terminal such as a smartphone.

(Outline of System)

FIG. 21 is a view showing an outline of the lesson improvement support system 2100 including the cloud server 2110 according to this embodiment. As a feature of this embodiment, processing in which pieces of lesson information acquired by a teacher communication terminal 220 serving as a PC or a student communication terminal 230 serving as a smartphone and transmitted to a cloud server 210 are combined to generate pieces of more accurate intermediate information and use them as pieces of lesson information in the second embodiment will be explained with reference to FIG. 21. Note that the arrangement and operation for presenting, to a teacher and students, analysis information obtained by analyzing lesson information are the same as those in the second embodiment, and an illustration and description thereof will not be repeated.

In FIG. 21, a student 2160 connects USB devices to two mobile communication terminals 230 and participates in an ITC lesson. A keyboard & pointing device 250 is connected to one mobile communication terminal 230. A display device 240, a camera 2142, and a microphone 2143 are connected to the other mobile communication terminal 230. An intermediate information generator 2111 of the cloud server 2110 relays the two mobile communication terminals 230, and receives, as pieces of lesson information 2111*a*, the expression and motion of the student from the camera 2142, the voice of the student from the microphone 2143, and an answer to a question from the keyboard & pointing device 250. The intermediate information generator 2111 generates, from a combination of the pieces of lesson information 2111*a*, pieces of intermediate information 2111*b* representing a more accurate reaction or evaluation of the student. Note that the generated pieces of intermediate information 2111*b* may be accumulated as pieces of lesson information together with the pieces of lesson information in a lesson history DB 2112, or may be further combined with the pieces of intermediate information 2111*b* to generate pieces of lesson information representing a more accurate reaction or evaluation, and accumulate them in the lesson history DB 2112.

In FIG. 21, a teacher 2170 connects the communication terminal 220 serving as a PC to a classroom AP 311, and participates in the ITC lesson. A keyboard and pointing device are connected to the communication terminal 220, and the display of the communication terminal 220 is equipped with a camera 2122 and a microphone 2123. The intermediate information generator 2111 of the cloud server 2110 relays the communication terminal 220 and the classroom AP 311, and receives, as pieces of lesson information 2111*c*, the expression and motion of the teacher from the camera 2122, the voice of the teacher from the microphone 2123, and an instruction operation from the keyboard & pointing device 250. The intermediate information generator 2111 generates, from a combination of the pieces of lesson information 2111c, pieces of intermediate information 2111d representing a more accurate reaction or evaluation of the teacher. Note that the generated pieces of intermediate information 2111d may be accumulated as pieces of lesson information together with the pieces of lesson information in the lesson history DB 2112, or may be further combined with the pieces of intermediate information 2111d to generate pieces of lesson information representing a more accurate reaction or evaluation, and accumulate them in the lesson history DB 2112.

Note that the example, shown in FIG. 21, of conversion from lesson information into intermediate information is merely an example, and the present invention is not limited to this.

(Arrangement of System)

FIG. 22 is a view showing the arrangement of the lesson improvement support system 2100 including the cloud server 2110 according to this embodiment. In FIG. 22, the same reference numerals as those in FIG. 3 denote the same building parts, and a description thereof will not be repeated.

In FIG. 22, assume that expressions, motions, and voices acquired from a pair of the camera 2122 and microphone 2123 for the teacher and a pair of the camera 2142 and microphone 2143 for the student are combined. Note that the combination of pieces of lesson information may not be fixed in the lesson improvement support system 2100, and it is also possible to learn the trend in a country or region and the features of a teacher and student by the cloud server 2110 by referring to the history accumulated in the lesson history DB 2112, and change pieces of lesson information to be combined and the number of pieces of lesson information to be combined, as needed.

The cloud server 2110 includes the intermediate information generator 2111 that combines pieces of lesson information collected by a lesson information collector 211 to generate pieces of intermediate information more accurately representing a reaction or evaluation. The lesson history DB 2112 accumulates the history of pieces of intermediate information together with pieces of lesson information and pieces of lesson analysis information. A lesson analyzer 2113 analyzes a lesson by referring to even the pieces of intermediate information together with the pieces of lesson information and the pieces of lesson analysis information.

<<Functional Arrangement of Cloud Server>>

Figure 23:
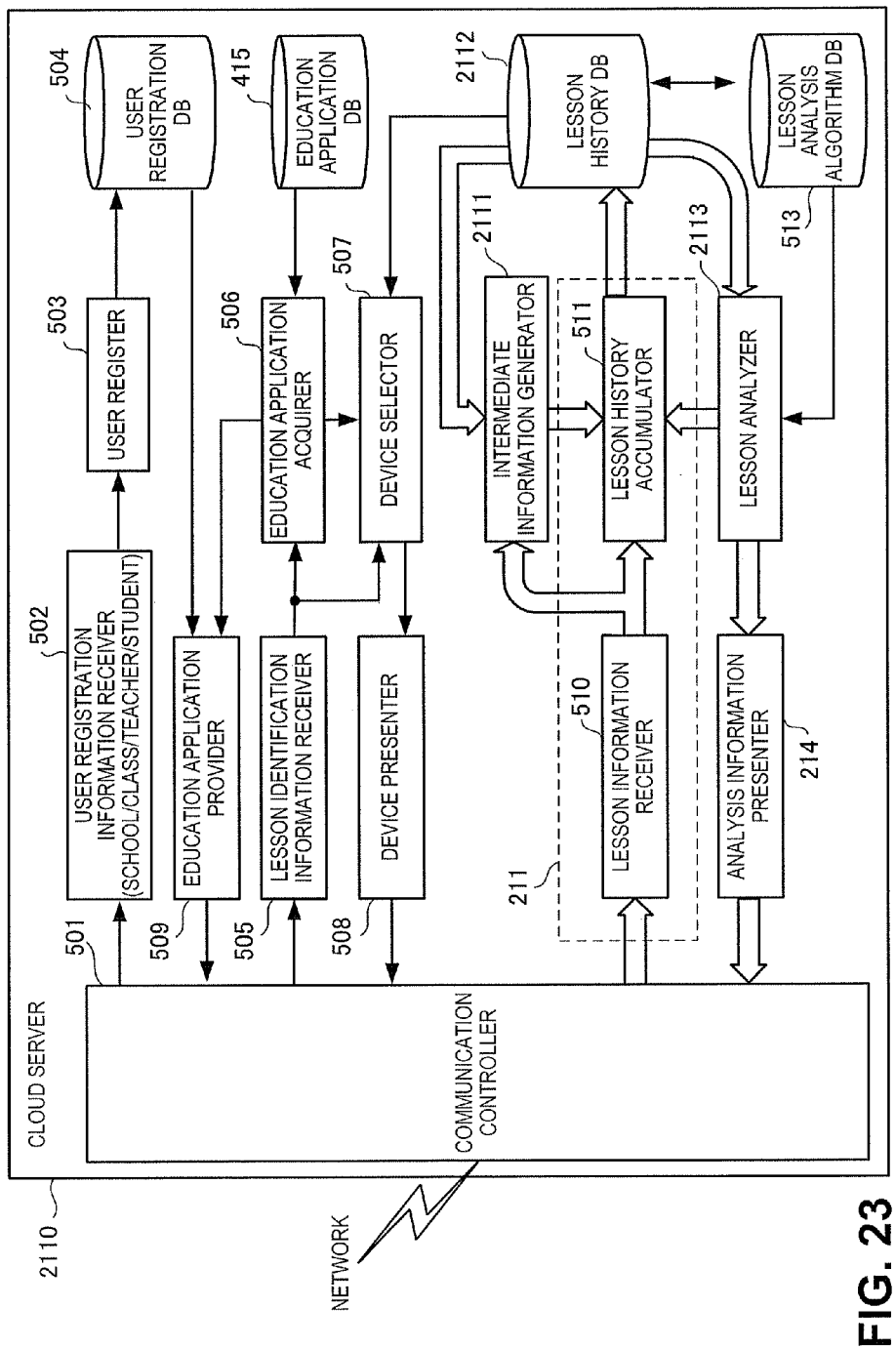
FIG. 23 is a block diagram showing the functional arrangement of the cloud server according to the third embodiment of the present invention.

FIG. 23 is a block diagram showing the functional arrangement of the cloud server 2110 according to this embodiment. In FIG. 23, the same reference numerals as those in FIG. 5 denote the same functional building parts, and a description thereof will not be repeated.

In FIG. 23, the intermediate information generator 2111 combines pieces of lesson information received from the communication terminals 220 and 230 by the lesson information receiver 510 while referring to the lesson history in the lesson history DB 2112, thereby generating pieces of intermediate information more accurately representing a reaction or evaluation. Together with the pieces of lesson information received by the lesson information receiver 510, the lesson history DB 2112 accumulates the history of pieces of intermediate information generated by the intermediate information generator 2111. Further, the lesson history accumulator 511 accumulates pieces of analysis information of the lesson analyzer 2113 in the lesson history DB 2112 in association with a lesson, an education application, and the like. The lesson analyzer 2113 analyzes a lesson by referring to even the pieces of intermediate information together with the lesson history accumulated in the lesson history DB 2112.

(Communication Format)

FIG. 24 is a view showing a communication format for generating pieces of intermediate information from a combination of pieces of lesson information by the cloud server 2110 according to this embodiment.

When a reaction or evaluation is independently recognized from each piece of lesson information, as in the second embodiment, accurate synchronization of the lesson information is unnecessary. For example, in the first embodiment, a reaction or evaluation is independently recognized from words acquired by a microphone or a motion captured by a camera. However, in the third embodiment, a reaction or evaluation is recognized by combining, for example, words acquired by a microphone and a motion captured by a camera. Thus, if the words and the motion are not synchronized, erroneous recognition occurs.

In FIG. 24, an image is acquired from the camera 2142 connected to the student communication terminal 230, and a voice is detected from the microphone 2143. A communication format 2410 is a format in which image data and voice data from the student communication terminal 230 coexist and are transmitted to the cloud server 2110. A communication format 2420 is a format in which only image data from the student communication terminal 230 is transmitted to the cloud server 2110. A communication format 2430 is a format in which only voice data from the student communication terminal 230 is transmitted to the cloud server 2110. In all the communication formats 2410 to 2430, time stamps are added to image data and voice data to transmit the data.

When intermediate information is generated by combining an image and voice in the cloud server 2110, the time stamps can combine the image and voice as a motion and voice representing the same reaction and evaluation by the same teacher or student.

(Lesson History DB)

The characteristic arrangement of the lesson history DB 2112 according to this embodiment will be explained with reference to FIGS. 25A and 25B. The lesson history DB 2112 represents the arrangement of a database added to the lesson history DB 212 according to the second embodiment shown in FIGS. 9A to 9G. Note that the arrangement of the lesson history DB 2112 is not limited to those in FIGS. 25A and 25B. For example, the history of reaction differences between countries is accumulated in FIGS. 25A and 25B, but the history of reaction differences between regions, races, or sexes may also be accumulated.

Figure 25A:
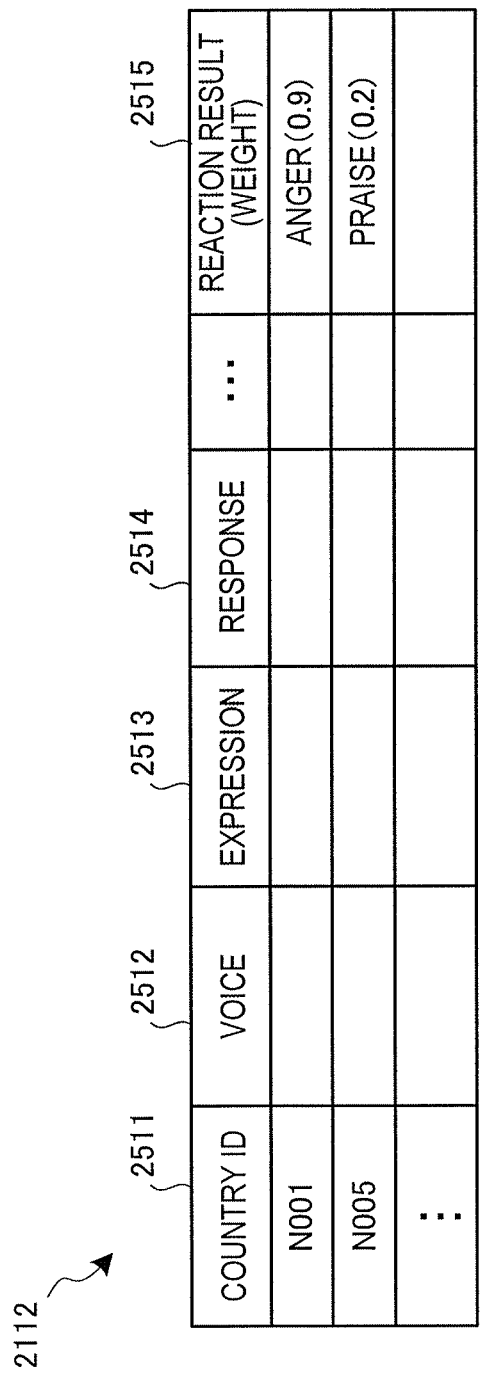
FIG. 25A is a table showing the arrangement of a lesson history DB according to the third embodiment of the present invention.

FIG. 25A is a table showing the arrangement of a reaction history in which received pieces of lesson information and a recognized reaction result are directly associated and accumulated in the lesson history DB 2112 according to this embodiment. In FIG. 25A, voice 2512, expression 2513, response 2514, and the like, which are pieces of lesson information, are stored in association with a country ID 2511. Then, a reaction result 2515 corresponding to the voice 2512, expression 2513, response 2514, and the like, which are pieces of lesson information, is stored. Note that the reliability of specified reaction is desirably stored in the reaction result 2515.

FIG. 25B is a table showing an arrangement in which a predetermined relevance between lesson information and a reaction is stored from the integration of the history in FIG. 25A in the lesson history DB 2112 according to this embodiment. In FIG. 25B, various combinations of various types of a voice 2522, various types of an expression 2523, various types of a response 2524, and the like, which are pieces of lesson information, are stored in association with a country 2521. Pieces of intermediate information 2525 generated as more accurate reactions from various combinations are stored. Note that one piece of intermediate information may be stored in correspondence with each combination. However, when recognizing one reaction, it is desirable to store possible intermediate information together with the degree of possibility from a combination of various kinds of lesson information during the reaction, and identify a more reliable reaction from the sum of the degree. Hence, reaction identification can be learnt as the history in FIG. 25A is integrated. Note that the learning method is not limited to this example.

(Intermediate Information Generation Table)

FIG. 26 is a table showing the arrangement of an intermediate information generation table 2600 according to this embodiment. The intermediate information generation table 2600 is table for generating, from a combination of pieces of lesson information, pieces of intermediate information more accurately representing a reaction or evaluation. The intermediate information generation table 2600 is stored in a RAM 1240 and used by the intermediate information generator 2111.

The intermediate information generation table 2600 stores a voice 2602, image 2603, and response 2604, which are pieces of lesson information, in association with a country ID 2601. Each piece of lesson information includes an input signal, and recognition information recognized from the input signal. Pieces of intermediate information 2605 of a recognition result obtained from a combination of the voice 2602, image 2603, and response 2604, which are pieces of lesson information, are stored.

(Lesson Information Accumulation Processing)

Figure 27:
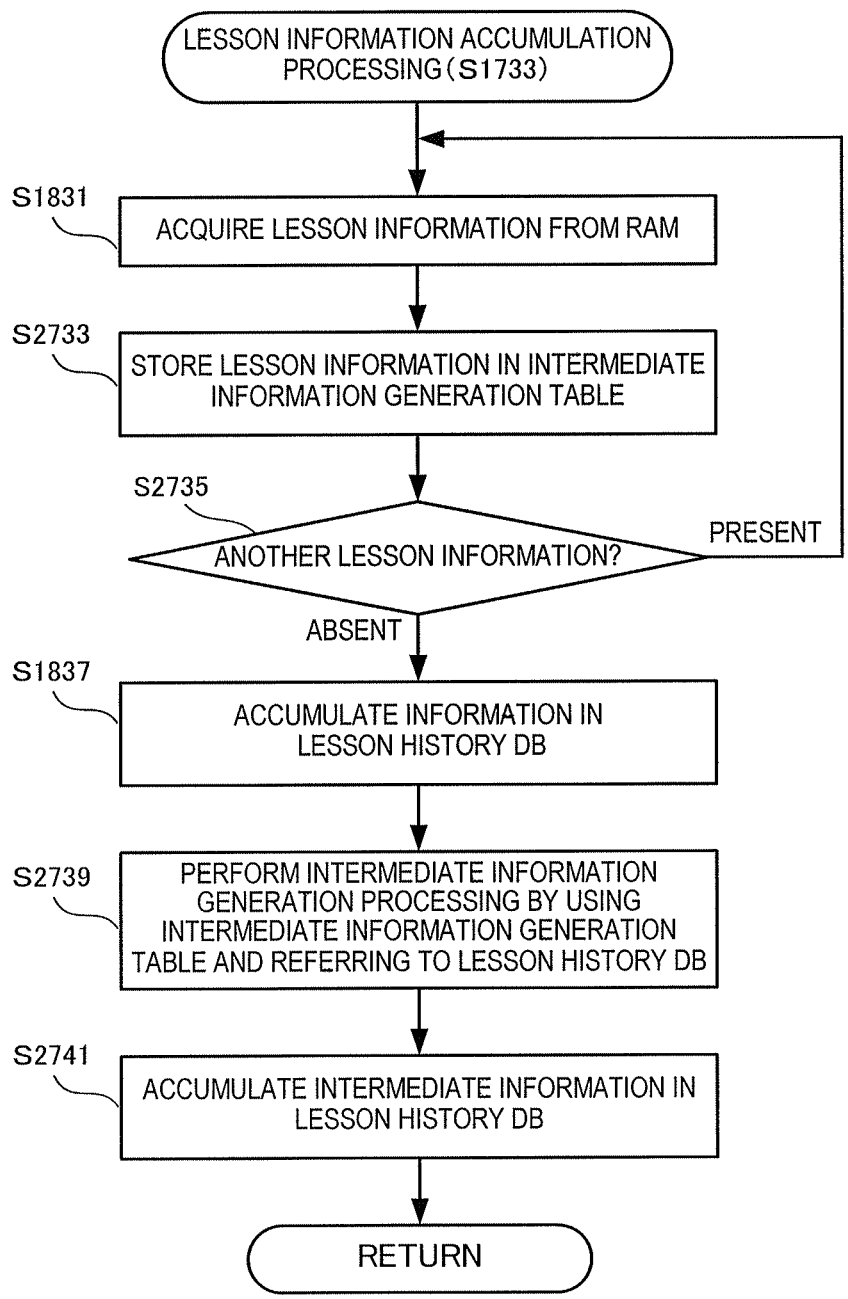
FIG. 27 is a flowchart showing the procedure of lesson information accumulation processing by the cloud server according to the third embodiment of the present invention.

FIG. 27 is a flowchart showing the procedure of lesson information accumulation processing (S1733) by the cloud server 2110 according to this embodiment. The flowchart in FIG. 27 replaces the flowchart shown in FIG. 18C according to the second embodiment, and executes lesson information accumulation processing. In FIG. 27, the same step numbers as those in FIG. 18C denote the same steps, and a description thereof will not be repeated.

In step S2733, a CPU 1210 stores acquired lesson information in the intermediate information generation table 2600. In step S2735, the CPU 1210 determines the presence/absence of another lesson information acquired at the same time from the same user. If there is another lesson information, the CPU 1210 returns to step S1831 to store the lesson information in the intermediate information generation table 2600 until all pieces of lesson information are stored.

If there is no other lesson information, the CPU 1210 advances to step S1837 to accumulate the acquired lesson information in the lesson history DB 212. In step S2739, the CPU 1210 generates intermediate information by using the intermediate information generation table 2600 and referring to the lesson history DB 2112. In step S2741, the CPU 1210 accumulates the generated intermediate information in the lesson history DB 2112 in association with the lesson information.

<<Processing Procedure of Communication Terminal>>

Figure 28:
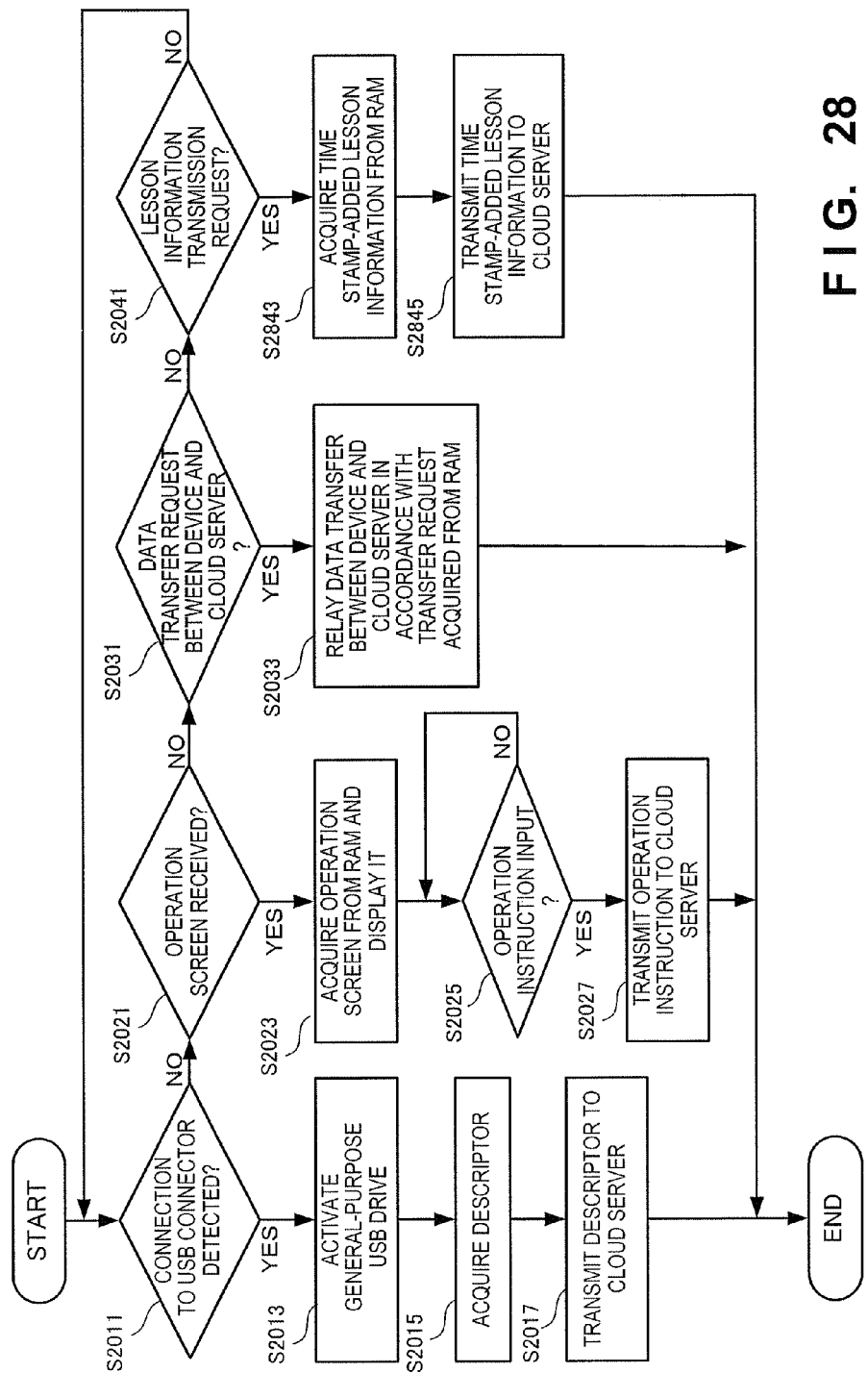
FIG. 28 is a flowchart showing the processing procedure of a communication terminal according to the third embodiment of the present invention.

FIG. 28 is a flowchart showing the processing procedure of the communication terminals 220 and 230 according to this embodiment. A CPU 1910 in FIG. 19 executes this flowchart using the RAM 1940, thereby implementing the functional building parts in FIG. 6. In FIG. 28, the same step numbers as those in FIG. 20 denote the same steps, and a description thereof will not be repeated.

In lesson information collection step S2843, the CPU 1910 acquires time stamp-added lesson information from the input/output data 1949 of the RAM 1940, and stores it in the lesson information 1945. In step S2845, the CPU 1910 instructs a communication controller 603 to transmit the lesson information 1945 to the cloud server 210.

According to the third embodiment, a mistake of a reaction or evaluation owing to the difference in habit or custom between countries or regions is reduced, and analysis leading to a more accurate lesson evaluation becomes possible.

[Fourth Embodiment]

A lesson improvement support system including a cloud server serving as an information processing apparatus according to the fourth embodiment of the present invention will be described next. This embodiment will give an explanation in regard to, for example, a lesson that is conducted by a teacher to students in a classroom, but the present invention is not limited to this. The cloud server according to the fourth embodiment is different from the second embodiment in that the result of comparison or statistical processing based on a history integrated from lessons in respective countries and respective regions using the same or similar education application software is presented. The remaining arrangement and operation are the same as those in the second embodiment, and a detailed description of the same arrangement and operation will not be repeated.

According to the fourth embodiment, a more objective lesson evaluation can be presented because many lessons using the same or similar education application software are referred to.

<<Lesson Improvement Support System>>

Figure 29:
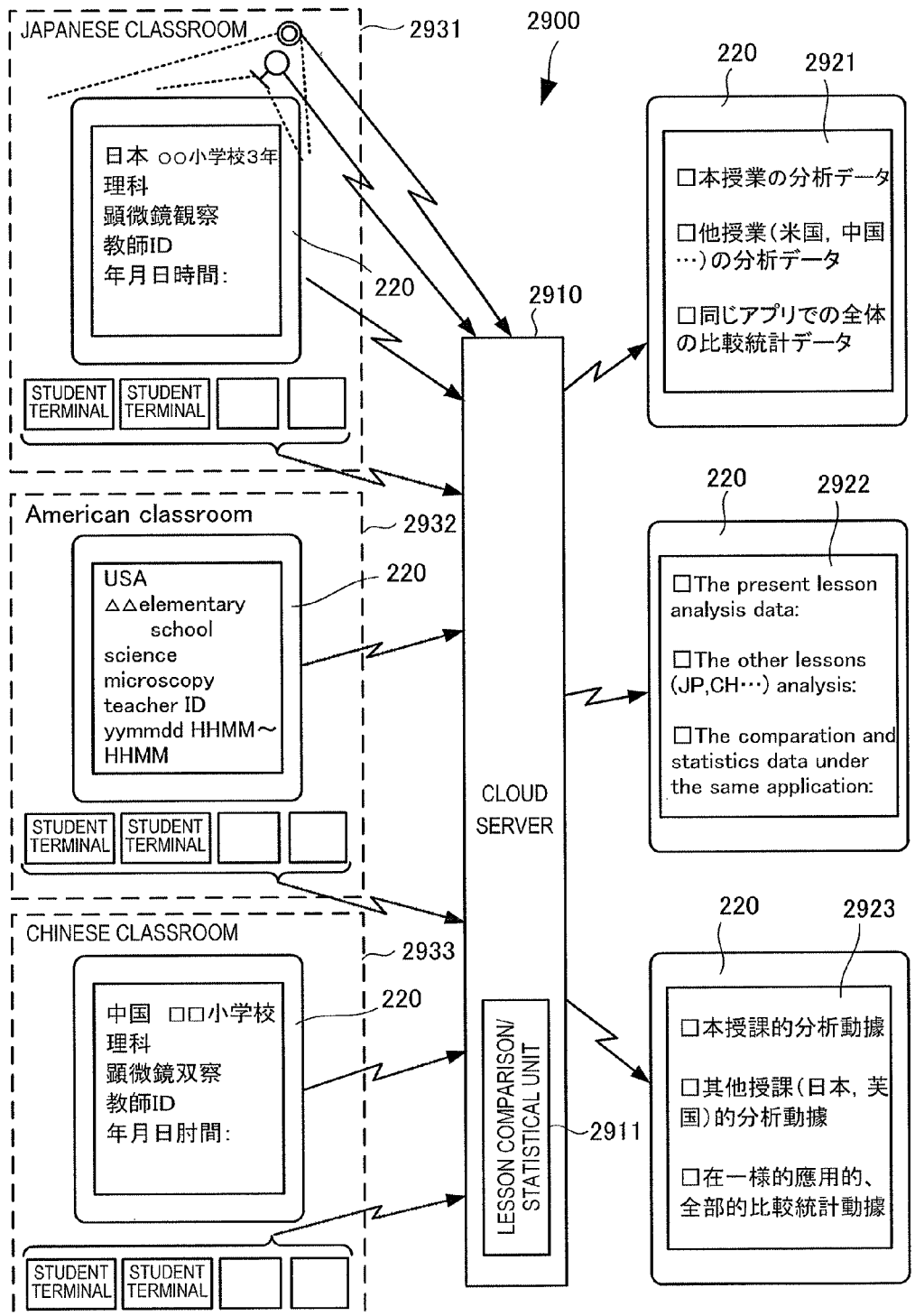
FIG. 29 is a view showing an outline of a lesson improvement support system including a cloud server according to the fourth embodiment of the present invention.
Figure 31:
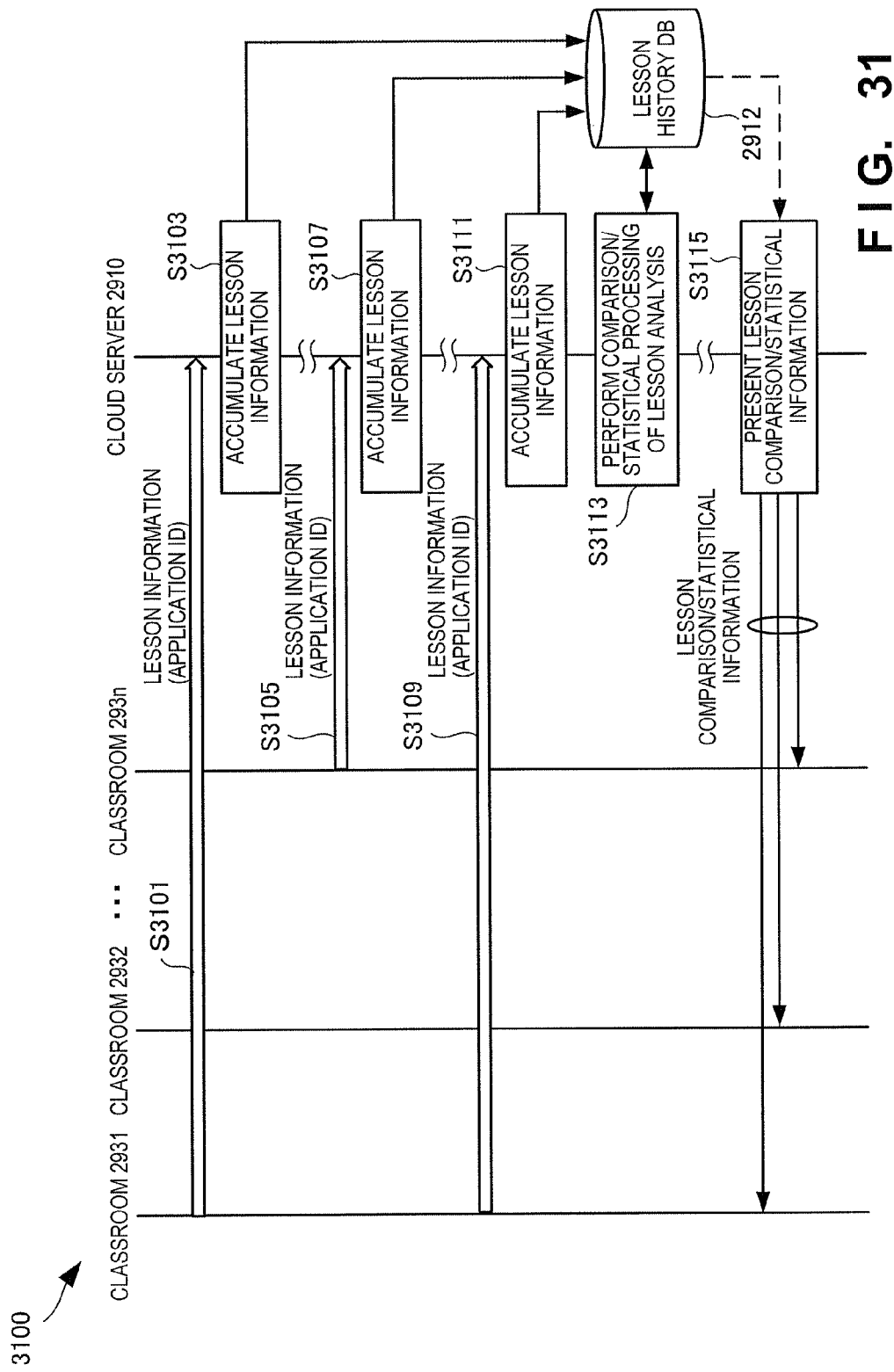
FIG. 31 is a sequence chart showing the operation procedure of the lesson improvement support system including the cloud server according to the fourth embodiment of the present invention.

A lesson improvement support system 2900 including a cloud server 2910 serving as an information processing apparatus according to this embodiment will be described with reference to FIGS. 29 to 31. Although FIGS. 29 to 31 show a display on a communication terminal for a teacher, this also applies to a communication terminal for a student. The following description will exemplify a common ITC lesson in different countries in order to clarify a feature of this embodiment. However, the following description includes even comparison/statistical processing in the case of a common ITC lesson in other schools or other classes in the same country.

(Outline of System)

FIG. 29 is a view showing an outline of the lesson improvement support system 2900 including the cloud server 2910 according to this embodiment. FIG. 29 is a view exemplifying accumulation of a lesson history, lesson analysis, and presentation of analysis information when a common ITC lesson (though used languages are different) is conducted as a "microscopy in science" lesson in elementary schools in Japan, America, and China. To avoid complexity, FIG. 29 show teacher communication terminals 220, but this also applies to even student communication terminals 230.

In a Japanese classroom 2931, a teacher conducts the "microscopy in science" lesson using the teacher communication terminal 220, and the reactions or evaluations of lesson participants including the teacher and students are collected in the cloud server 2910. In an American classroom 2932, a teacher conducts the "microscopy in science" lesson as a common ITC lesson using the teacher communication terminal 220, and the reactions or evaluations of lesson participants including the teacher and students are collected in the cloud server 2910. In a Chinese classroom 2933, a teacher conducts the "microscopy in science" lesson as a common ITC lesson using the teacher communication terminal 220, and the reactions or evaluations of lesson participants including the teacher and students are collected in the cloud server 2910.

The cloud server 2910 includes a lesson comparison/statistical unit 2911. The lesson comparison/statistical unit 2911 compares the reactions or evaluations of the lesson participants including the teachers and students to the "microscopy in science" lesson conducted as an ITC lesson common to the respective classrooms. Note that the comparison can be performed based on pieces of analysis information to the respective lessons. From the comparison information, a global lesson evaluation, the singularity of the reaction depending on the country, or the like can be analyzed. The lesson comparison/statistical unit 2911 takes the statistics of the reactions and evaluations of the lesson participants including the teachers and students to the "microscopy in science" lesson conducted as an ITC lesson common to the respective classrooms. From the statistical result, the finding of a common problem in the education application, and the like become possible. Further, from a comparison with the statistical result, the lesson evaluation based on the global standard also becomes possible.

A display screen 2921 of the communication terminal 220 of the Japanese teacher presents comparison and statistics results from the cloud server 2910. A display screen 2922 of the communication terminal 220 of the American teacher presents comparison and statistics results from the cloud server 2910. A display screen 2923 of the communication terminal 220 of the Chinese teacher presents comparison and statistics results from the cloud server 2910. Note that these results are presented in a form in which, when a menu is checked and selected on each of the display screens 2921 to 2923, each analysis or comparison statistics result appears as a graph or table and the lesson evaluation can be grasped at a glance.

(Arrangement of System)

FIG. 30 is a view showing the arrangement of the lesson improvement support system 2900 including the cloud server 2910 according to this embodiment. In FIG. 30, the same reference numerals as those in FIG. 3 or 22 denote the same building parts, and a description thereof will not be repeated.

In FIG. 30, the cloud server 2910 collects, via a network 320, pieces of lesson information detected from lesson participants including teachers and students in classrooms 2931 to 293n.

The cloud server 2910 extracts pieces of lesson information collected by a lesson information collector 211, for example, pieces of lesson information in a common ITC lesson using a common education application, and accumulates them in a lesson history DB 2912. The lesson comparison/statistical unit 2911 compares lesson histories accumulated in the lesson history DB 2912, takes statistics, and accumulates the comparison and statistics results in the lesson history DB 2912. In the accumulation of the comparison and statistics results in the lesson history DB 2912, organization necessary for the presentation of evaluation results for each country, each lesson, and each teacher may also be performed together with organization for each ITC lesson. A lesson analyzer 2913 analyzes the lesson by referring to even the comparison and statistics results together with pieces of lesson information and pieces of lesson analysis information. Further, pieces of intermediate information described in the third embodiment may also be referred to.

(Operation Procedure of System)

FIG. 31 is a sequence chart showing an operation procedure 3100 of the lesson improvement support system 2900 including the cloud server 2910 according to this embodiment. In FIG. 31, a collection source that collects pieces of lesson information may be designated by the cloud server 2910, as in the first embodiment, or pieces of lesson information may be collected without designating the collection source.

In step S3101, pieces of lesson information from the classroom 2931 are collected in the cloud server 2910. Note that an application ID for identifying an education application used is added to lesson information. In step S3103, the cloud server 2910 accumulates the pieces of lesson information from the classroom 2931 in the lesson history DB 2912. In step S3105, pieces of lesson information from the classroom 2932 are collected in the cloud server 2910. In step S3107, the cloud server 2910 accumulates the pieces of lesson information from the classroom 2932 in the lesson history DB 2912. In step S3109, pieces of lesson information from the classroom 293n are collected in the cloud server 2910. In step S3111, the cloud server 2910 accumulates the pieces of lesson information from the classroom 293n in the lesson history DB 2912.

In step S3113, the cloud server 2910 performs comparison/statistical processing of pieces of lesson information in a common ITC lesson based on especially a common education application from the lesson history accumulated in the lesson history DB 2912. The comparison/statistical processing may include processing of comparing pieces of analysis information in respective lessons, and processing of comparing analysis information of the entire statistical information and analysis information of each lesson. After that, in step S3115, the cloud server 2910 presents lesson comparison/statistical information on the teacher communication terminals in the classrooms 2931 to 293n.

(Lesson History DB)

Figure 32:
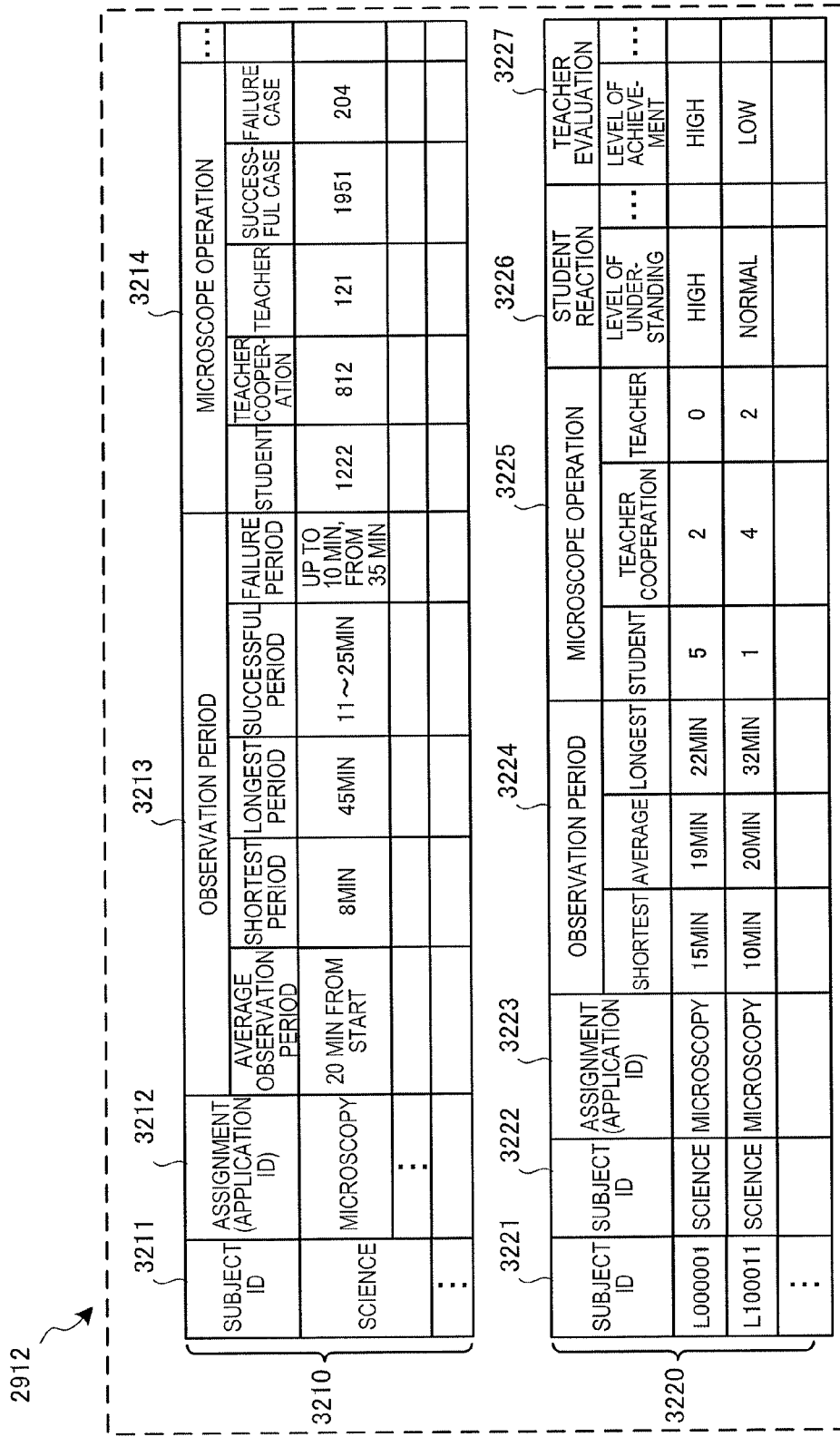
FIG. 32 is a table showing the arrangement of a lesson history DB according to the fourth embodiment of the present invention.

FIG. 32 is a table showing the characteristic arrangement of the lesson history DB 2912 according to this embodiment. The lesson history DB 2912 represents the arrangement of a database added to the lesson history DB 212 according to the second embodiment shown in FIGS. 9A to 9I, or the lesson history DB 2112 according to the third embodiment shown in FIGS. 25A and 25B. Note that the arrangement of the lesson history DB 2912 is not limited to one in FIG. 32. For example, the concrete "microscopy in science" is exemplified in FIG. 32, but proper items are prepared in accordance with another subject or content.

The lesson history DB 2912 in FIG. 32 includes a comparison/statistics result 3210 organized for each subject and each assignment from pieces of lesson information of a plurality of lessons by a common education application, and a comparison/statistics result 3220 organized for each lesson.

The comparison/statistics result 3210 stores a period 3213 of microscopy by a student, and an operation 3214 of microscopy in association with an assignment 3212 corresponding to a subject ID 3211. The comparison/statistics result 3210 also stores characteristic successful cases and failures cases. The comparison/statistics result 3220 stores a subject ID 3222, an assignment 3223, a period 3224 of microscopy by a student, an operation 3225 of microscopy, a student reaction 3226, and a teacher evaluation 3227 in association with a lesson ID 3221.

According to the fourth embodiment, an objective lesson evaluation can be performed by referring to many lessons using the same or similar education application software.

[Fifth Embodiment]

A lesson improvement support system including a cloud server serving as an information processing apparatus according to the fifth embodiment of the present invention will be described next. This embodiment will give an explanation in regard to, for example, a lesson that is conducted by a teacher to students in a classroom, but the present invention is not limited to this. The cloud server according to the fifth embodiment is different from the second to fourth embodiments in that an improvement measure of a lesson is generated from analyzed information and proposed. The remaining arrangement and operation are the same as those in the second to fourth embodiments, and a detailed description of the same arrangement and operation will not be repeated.

According to the fifth embodiment, an improvement measure suited to the goal of a lesson and the environment of the lesson is advised from the cloud server, so the quality can be improved regardless of the specialty of the lesson.

To avoid complexity, this embodiment will mainly explain especially an improvement measure for an entire lesson. However, even an improvement measure to a teacher can be proposed by time-series details such as an important point that should be explained slowly, a point that suffices to be explained for a single time, or a point that needs to be repetitively explained because it is the premise of an important point. An improvement measure to people who receive a lesson can be proposed to even students or parents.

<<Lesson Improvement Support System>>

Figure 34:
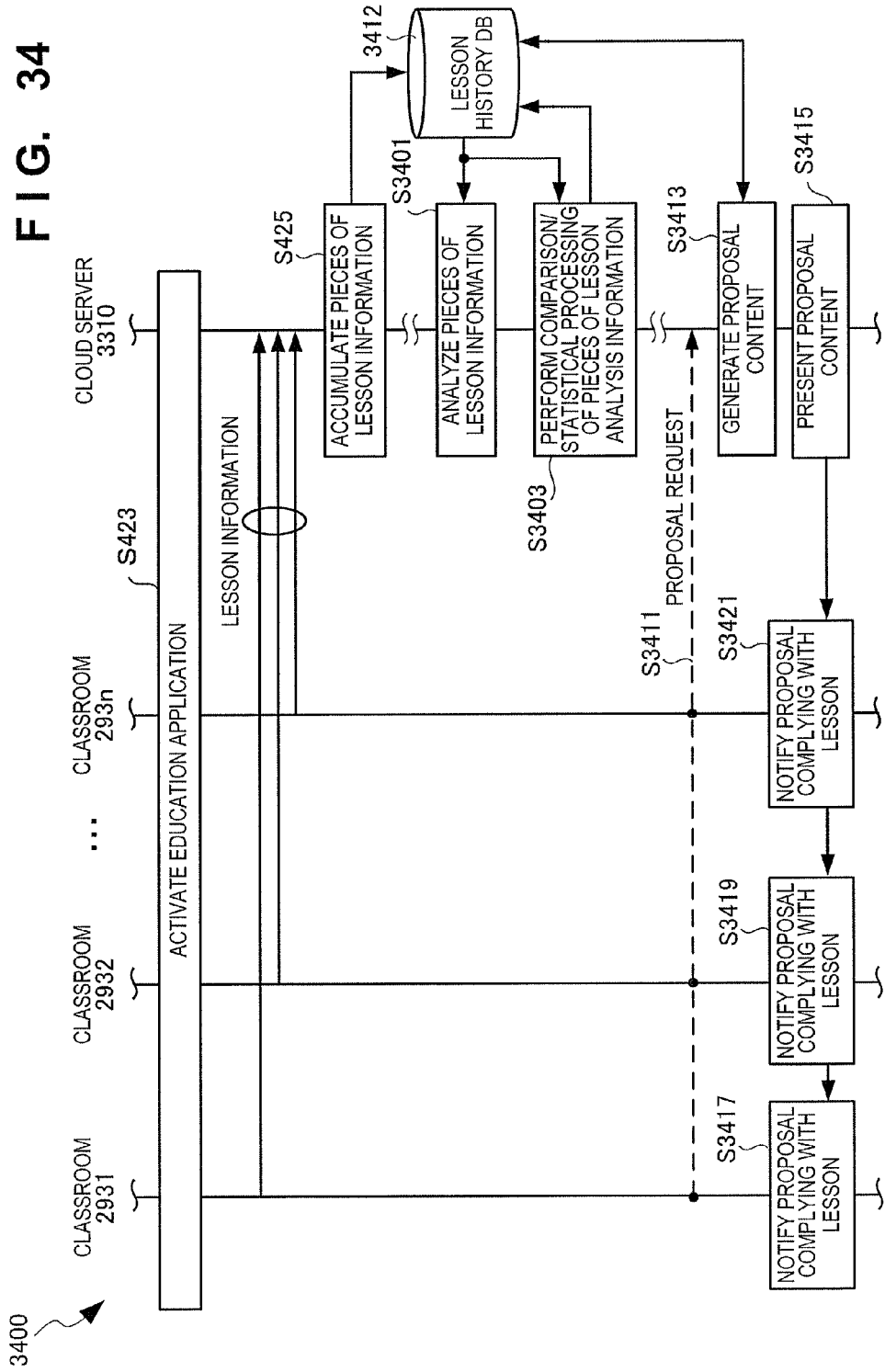
FIG. 34 is a sequence chart showing the operation procedure of the lesson improvement support system including the cloud server according to the fifth embodiment of the present invention.

A lesson improvement support system 3300 including a cloud server 3310 serving as an information processing apparatus according to this embodiment will be described with reference to FIGS. 33 and 34. Although FIGS. 33 and 34 show a display on a communication terminal for a teacher, this also applies to a communication terminal for a student. The following description will exemplify a common ITC lesson in different countries in order to clarify a feature of this embodiment. However, the following description includes even a proposal of an improvement measure based on comparison/statistical processing in the case of a common ITC lesson in other schools or other classes in the same country.

(Outline of System)

FIG. 33 is a view showing an outline of the lesson improvement support system 3300 including the cloud server 3310 according to this embodiment. In FIG. 33, the same reference numerals as those in FIG. 29 denote the same building parts, and a description thereof will not be repeated. Collection of pieces of lesson information is the same as that in FIG. 29.

The cloud server 3310 includes a proposal generator/presenter 3311. The proposal generator/presenter 3311 refers to the comparison and statistics results of a lesson comparison/statistical unit 2911, generates a proposal of an improvement measure to each lesson, and presents the proposal to lesson participants including a teacher who conducted the lesson or students who received the lesson. Note that improvement measures include those targeting the entire lesson, and those targeting each item in the lesson.

The cloud server 3310 presents an improvement measure of a lesson on a display screen 3321 of a communication terminal 220 of a Japanese teacher. The cloud server 3310 also presents an improvement measure of a lesson on a display screen 3322 of the communication terminal 220 of an American teacher. The cloud server 3310 also presents an improvement measure of a lesson on a display screen 3323 of the communication terminal 220 of a Chinese teacher. Note that the display screens 3321 to 3323 are not limited to those in FIG. 33.

Proposals of improvement measures, the execution results of improvement measures, and the like are accumulated as a lesson history in a lesson history DB 3412. They are utilized for generation of subsequent improvement measures. This produces a learning effect of amending an improvement measure of a lesson.

(Operation Procedure of System)

FIG. 34 is a sequence chart showing an operation procedure 3400 of the lesson improvement support system 3300 including the cloud server 3310 according to this embodiment. In FIG. 34, the same step numbers as those in FIGS. 4A and 4B denote the same steps, and a description thereof will not be repeated.

In step S3401, the cloud server 3310 analyzes pieces of lesson information of each lesson based on a lesson history accumulated in the lesson history DB 3412. In step S3403, the cloud server 3310 performs comparison/statistical processing of pieces of lesson analysis information as described in the fourth embodiment, and accumulates the pieces of lesson analysis information and comparison and statistics results in the lesson history DB 3412.

In step S3411, if an improvement measure proposal request is received from a communication terminal in one of classrooms 2931 to 293n, the cloud server 3310 generates a lesson improvement measure as a proposal content by referring to the lesson history DB 3412 in step S3413. In step S3415, the cloud server 3310 presents the proposal content to communication terminals in the classrooms 2931 to 293n. The communication terminals in the classrooms 2931 to 293n notify the received proposal corresponding to the lesson in steps S3417, S3419, and S3421, respectively.

In FIG. 34, the cloud server 3310 presents an improvement measure of a lesson in response to a proposal request from a communication terminal in one of the classrooms 2931 to 293n. However, the cloud server 3310 may present an improvement measure of a lesson without a proposal request.

<<Functional Arrangement of Cloud Server>>

Figure 35:
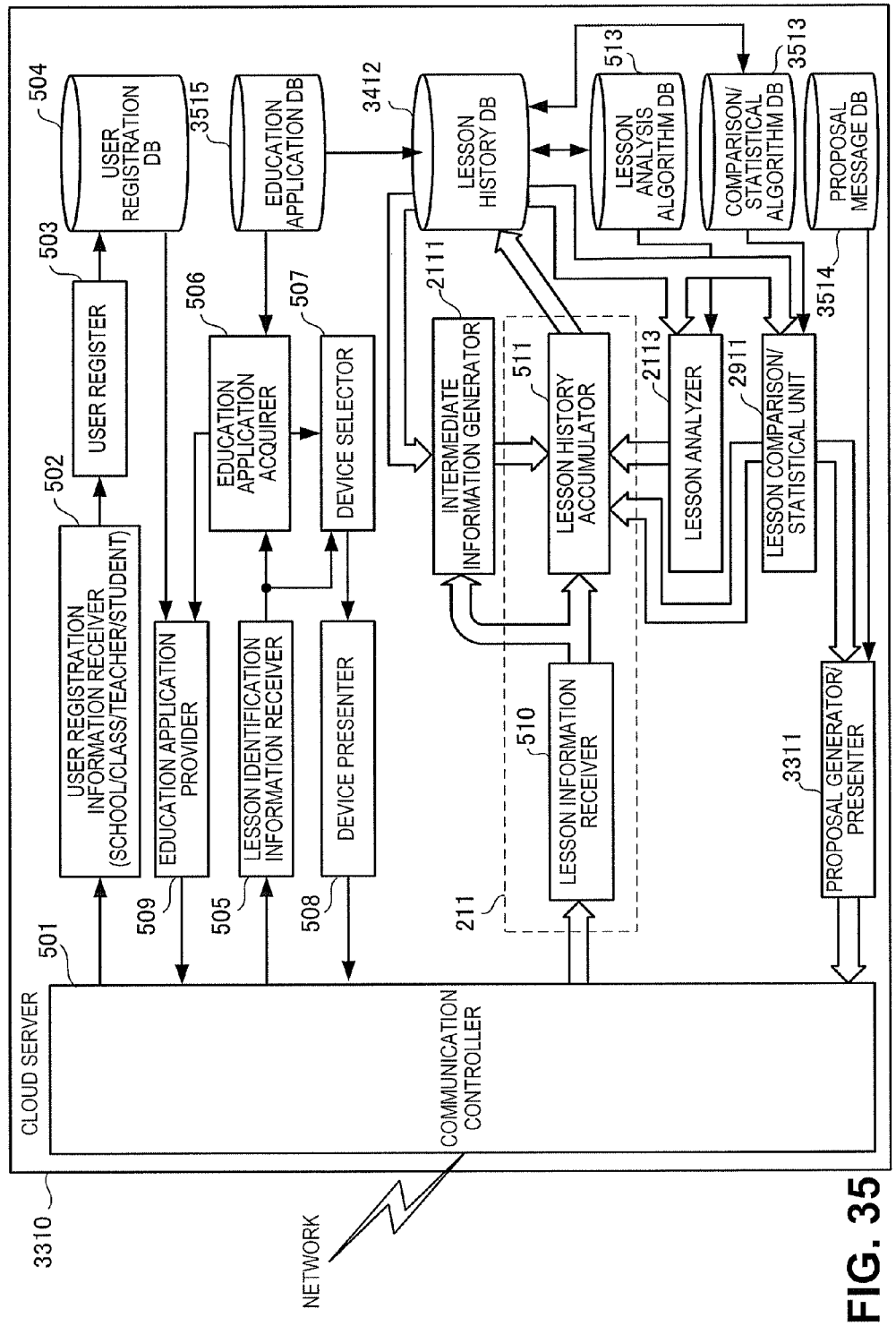
FIG. 35 is a block diagram showing the functional arrangement of the cloud server according to the fifth embodiment of the present invention.

FIG. 35 is a block diagram showing the functional arrangement of the cloud server 3310 according to this embodiment. In FIG. 35, the same reference numerals as those in FIGS. 5 and 23 denote the same functional building parts, and a description thereof will not be repeated.

The cloud server 3310 includes the lesson history DB 3412 that accumulates a lesson history collected or generated in this embodiment. The cloud server 3310 also includes an education application DB 3515 that prepares information for selecting pieces of lesson information which are collected to more appropriately generate an improvement measure of a lesson, in addition to an education application. The cloud server 3310 includes a comparison/statistical algorithm DB 3513 that stores comparison/statistical algorithms so that an algorithm can be selected based on the lesson content, the goal of the comparison and statistics results, and the like. The cloud server 3310 also includes a proposal message DB 3514 that stores the templates of proposal messages for proposing a lesson improvement measure.

The lesson comparison/statistical unit 2911 performs comparison/statistical processing of a lesson history from the lesson history DB 3412 in accordance with a comparison/statistical algorithm selected from the comparison/statistical algorithm DB 3513. The proposal generator/presenter 3311 refers to the comparison and statistics results of the lesson comparison/statistical unit 2911, generates proposals of lesson improvement measures, and presents the respective proposals in correspondence with lesson participants including a teacher and students. Note that the communication terminal receives proposal information by a proposal information receiver and displays it.

Note that the lesson comparison/statistical unit 2911 and the comparison/statistical algorithm DB 3513 are even the functional building parts of the cloud server 2910 according to the fourth embodiment.

(Education Application DB)

FIG. 36A is a table showing the characteristic arrangement of the education application DB 3515 according to this embodiment. The education application DB 3515 represents the arrangement of a database added to an education application DB 415 shown in FIG. 8. Note that the arrangement of the education application DB 3515 is not limited to one in FIG. 36A.

The education application DB 3515 stores at least one lesson acquisition goal 3612 for each education application ID 3611. The education application DB 3515 stores, in association with each lesson acquisition goal 3612, a pair of teacher-side lesson information 3613 formed from a collection point and collection target data, and student-side lesson information 3614 formed from a collection point and collection target data.

(Lesson History DB)

FIG. 36B is a table showing the characteristic arrangement of the lesson history DB 3412 according to this embodiment. The lesson history DB 3412 represents the arrangement of a database added to the lesson history DB 212 according to the second embodiment shown in FIGS. 9A to 9G, the lesson history DB 2112 according to the third embodiment shown in FIGS. 25A and 25B, or the lesson history DB 2912 according to the fourth embodiment shown in FIG. 32. Note that the arrangement of the lesson history DB 3412 is not limited to one in FIG. 36B.

In association with an education application ID 3621, the lesson history DB 3412 stores a lesson ID 3622 of a lesson using the education application, and lesson environment information 3623. Note that the lesson environment information 3623 includes pieces of information that influence a lesson, such as the country, school, teacher, and student. Pieces of lesson environment information 3623 are stored for respective lessons. Further, for each piece of lesson environment information 3623, the lesson history DB 3412 includes related teaching method information 3625 of a teacher, reaction information 3626 of a student, and comparison information 3627 with another lesson or statistical value. Also, the lesson history DB 3412 stores proposal information 3628 serving as an improvement measure of the lesson generated from these pieces of information about the lesson, and a proposal evaluation 3629 as a result of executing the improvement measure.

(Comparison/Statistical Algorithm DB)

FIG. 37A is a table showing the arrangement of the comparison/statistical algorithm DB 3513 according to this embodiment. Note that the arrangement of the comparison/statistical algorithm DB 3513 is not limited to one in FIG. 37A.

The comparison/statistical algorithm DB 3513 stores at least one lesson point 3713 for an education application ID 3711 and a lesson acquisition goal 3712. The comparison/statistical algorithm DB 3513 stores, in association with the lesson point 3713, a pair of a statistical algorithm 3714 and comparison algorithm 3715 to be used. Also, the comparison/statistical algorithm DB 3513 stores a result evaluation 3716 when the statistical algorithm 3714 and the comparison algorithm 3715 are used.

(Proposal Message DB)

FIG. 37B is a table showing the arrangement of the proposal message DB 3514 according to this embodiment. Note that the arrangement of the proposal message DB 3514 is not limited to one in FIG. 37B.

For each education application ID 3721, the proposal message DB 3514 stores a proposal category 3722 representing a category to which a proposal is made. In FIG. 37B, the lesson stance, lesson progress, and lesson speed are shown as the proposal category 3722, but the proposal category 3722 is not limited to them. The proposal message DB 3514 also stores a proposal content 3723 for each proposal category 3722. For example, when the proposal category 3722 is the lesson stance, the proposal content is "enhancement of the leadership of teachers", "respect to the autonomy of students", or the like. In correspondence with each proposal content 3723, the proposal message DB 3514 stores a proposal message 3724 suited to a proposal user.

<<Hardware Arrangement of Cloud Server>>

Figure 38:
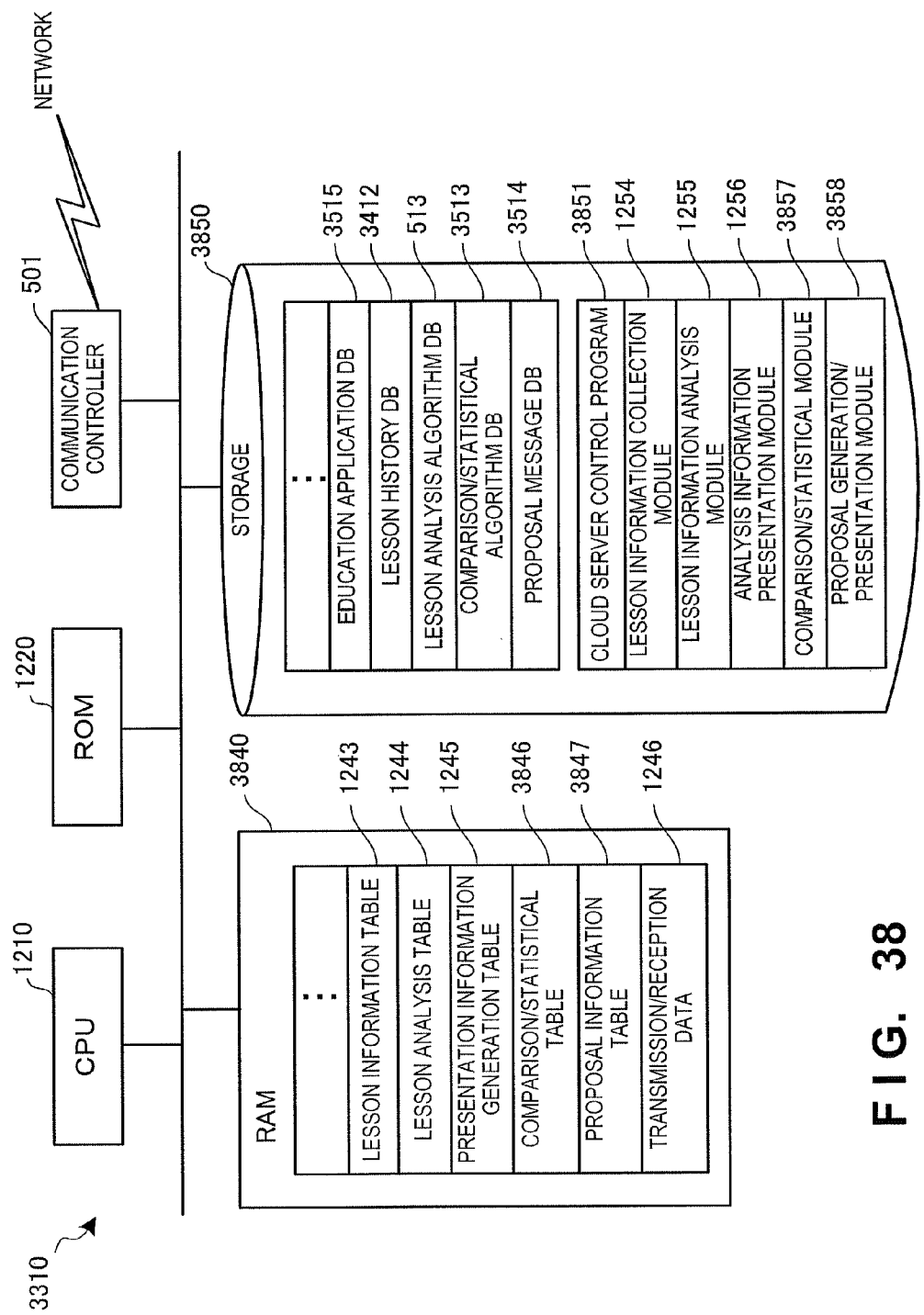
FIG. 38 is a block diagram showing the hardware arrangement of the cloud server according to the fifth embodiment of the present invention.

FIG. 38 is a block diagram showing the hardware arrangement of the cloud server 3310 according to this embodiment. In FIG. 38, the same reference numerals as those in FIG. 12 denote the same building parts, and a description thereof will not be repeated. For simplicity, the same building parts as those in FIG. 12 are omitted from a RAM 3840 and a storage 3850 in FIG. 38.

Figure 39:
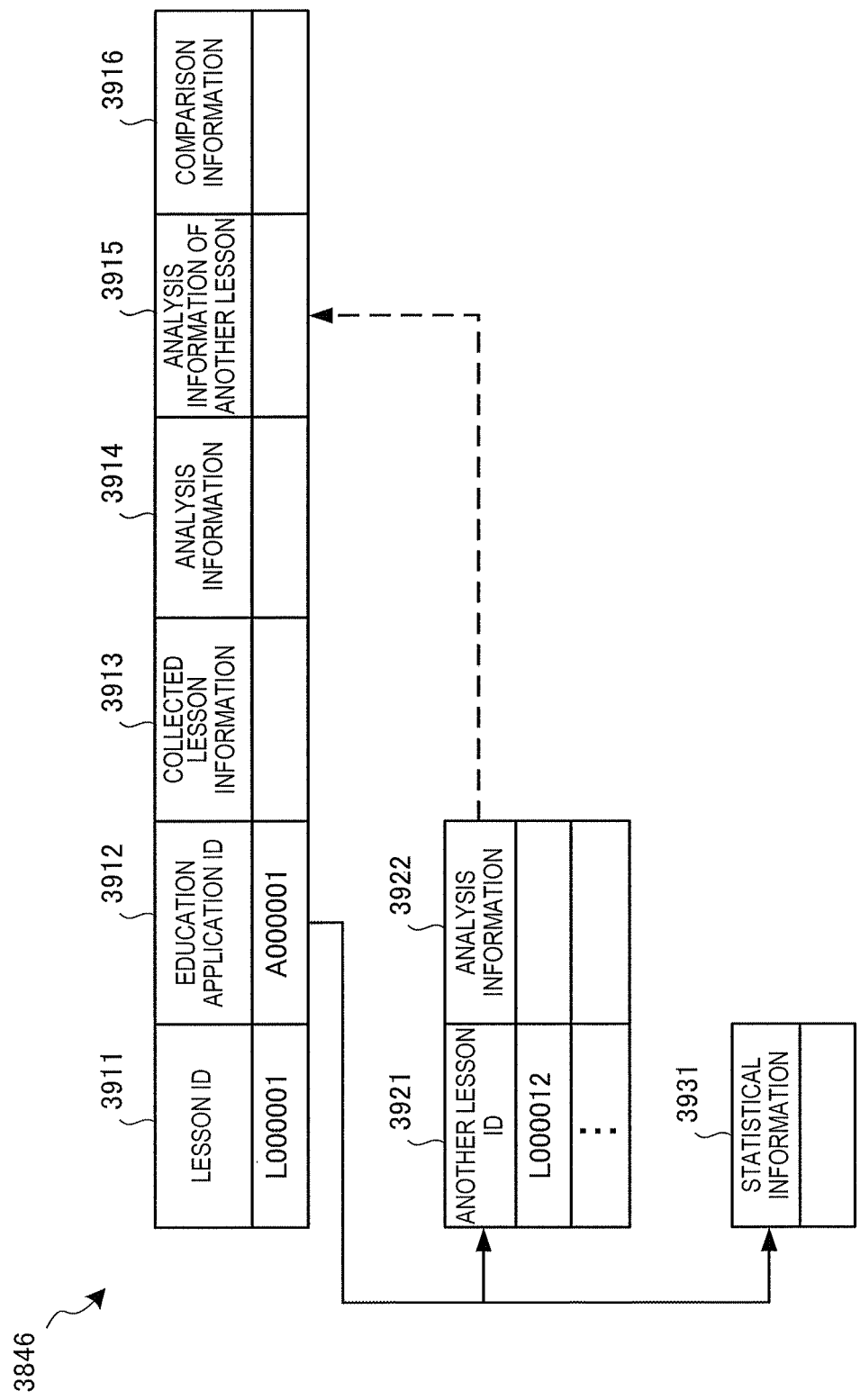
FIG. 39 is a table showing the arrangement of a comparison/statistical table according to the fifth embodiment of the present invention.

The RAM 3840 includes a comparison/statistical table 3846 for performing comparison/statistical processing using lesson information or its analysis information (see FIG. 39). The RAM 3840 also includes a proposal information table 3847 for generating a proposal serving as an improvement measure of a lesson by referring to comparison and statistics results or the like (see FIG. 40).

The storage 3850 includes the above-described education application DB 3515, lesson history DB 3412, comparison/statistical algorithm DB 3513, and proposal message DB 3514, which are used in this embodiment. The storage 3850 includes, as programs, a cloud server control program (see FIG. 41) according to this embodiment, a comparison/statistical module (see FIG. 42A), and a proposal information presentation module (see FIG. 42B).

(Comparison/Statistical Table)

FIG. 39 is a table showing the arrangement of the comparison/statistical table 3846 according to this embodiment. The comparison/statistical table 3846 is a table for generating comparison information and statistical information from lesson information and its analysis information.

The comparison/statistical table 3846 stores, in association with a lesson ID 3911, an education application ID 3912, collected lesson information 3913, analysis information 3914, analysis information 3915 of another lesson, and comparison information 3916 between pieces of analysis information. The comparison/statistical table 3846 also stores analysis information 3922 in association with another lesson ID 3921 for which the education application ID 3912 is common. Further, the comparison/statistical table 3846 stores statistical information 3931 based on many lessons for which the education application ID 3912 is common.

In FIG. 39, the statistical information 3931 is the statistics of lessons using the common education application ID 3912. However, to generate the trend in a country or school or the trend of a teacher or student, the statistical information 3931 may not be limited to the range of a common education application, and comparison statistics may be performed.

Alternatively, a specific education application may be selected to perform comparison statistics.

(Proposal Information Table)

Figure 40:
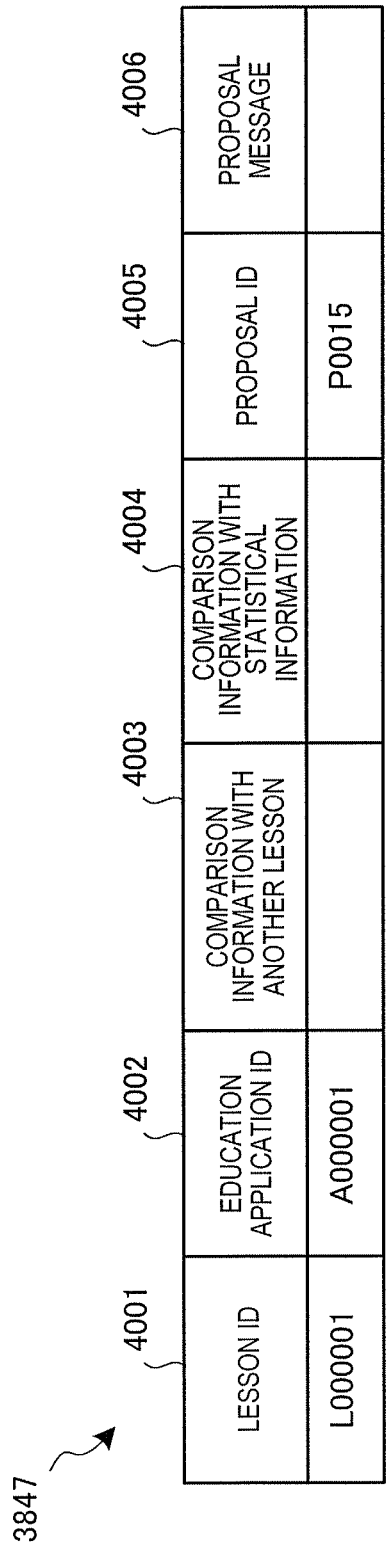
FIG. 40 is a table showing the arrangement of a proposal information table according to the fifth embodiment of the present invention.

FIG. 40 is a table showing the arrangement of the proposal information table 3847 according to this embodiment. The proposal information table 3847 is a table for proposing an improvement measure of a lesson to a lesson participant by referring to comparison information between pieces of analysis information and comparison information with statistical information.

The proposal information table 3847 stores, in association with a lesson ID 4001, a used education application ID 4002, comparison information 4003 with another lesson, and comparison information 4004 with statistical information. By referring to the comparison information 4003 and the comparison information 4004, a proposal ID 4005 and a proposal message 4006 are stored.

FIG. 40 shows an arrangement for a proposal of an improvement measure for each lesson. However, a proposal of an improvement measure for each teacher, each student, each class, or each school can also be generated by a similar arrangement.

<<Processing Procedure of Cloud Server>>

Figure 41:
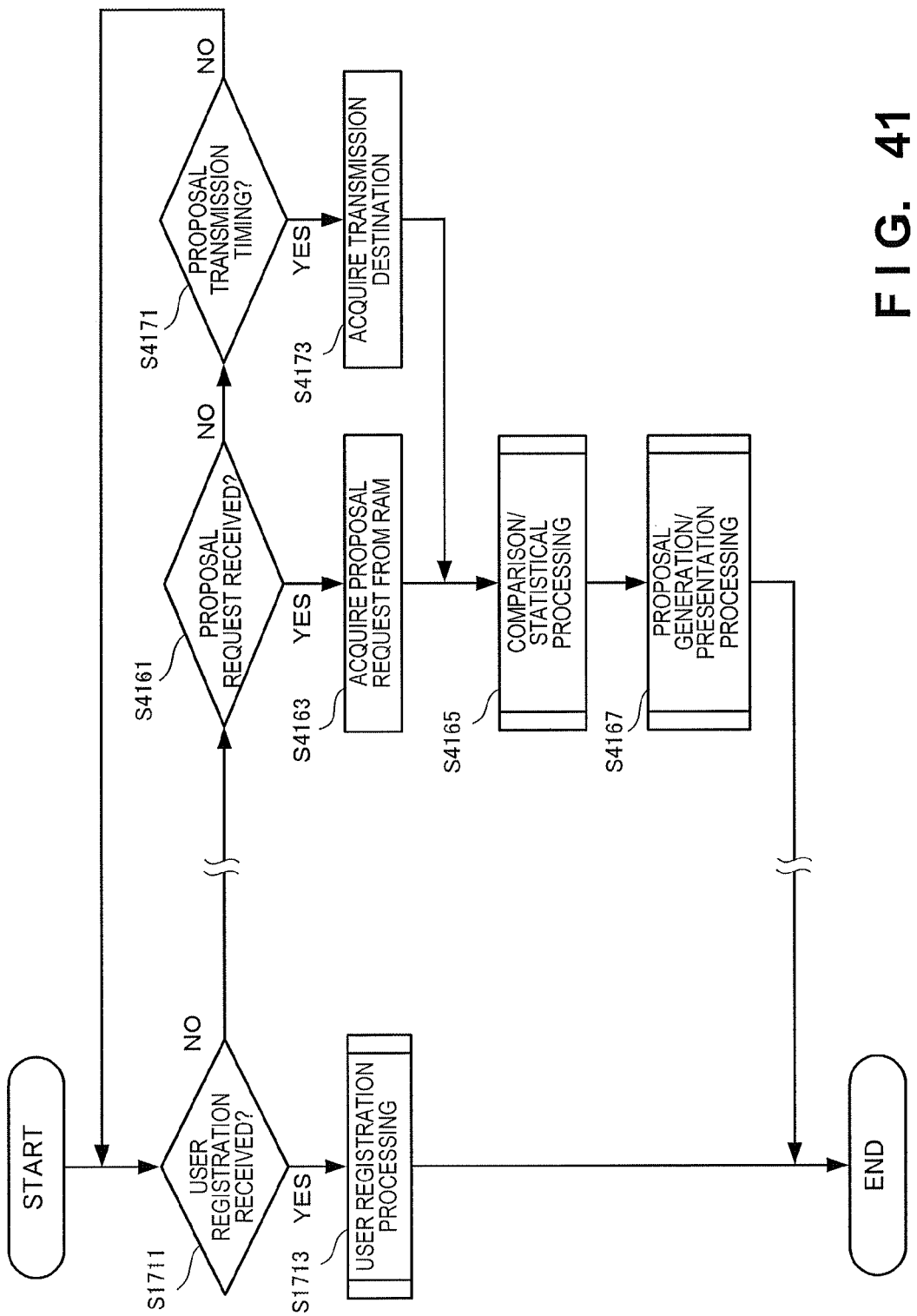
FIG. 41 is a flowchart showing the processing procedure of the cloud server according to the fifth embodiment of the present invention.

FIG. 41 is a flowchart showing the processing procedure of the cloud server 3310 according to this embodiment. A CPU 1210 in FIG. 38 executes this flowchart using the RAM 3840, thereby implementing the functional building parts in FIG. 35. In FIG. 41, the same step numbers as those in FIG. 17 denote the same steps, and a description thereof will not be repeated. In FIG. 41, some of the same steps as those in FIG. 17 are omitted.

If no user registration data has been received, no lesson identification information has been received, no lesson information has been received, neither a start request nor end request has been received, and no analysis information presentation request has been received, the process advances to step S4161 according to the flowchart of FIG. 17. In step S4161, the CPU 1210 determines whether an improvement measure proposal request from a lesson participant has been received. If the proposal request at the improvement destination has been received, the CPU 1210 advances to step S4163 to receive the proposal request from the RAM 3840, and obtain request source information or the like. In step S4165, the CPU 1210 executes comparison/statistical processing (see FIG. 42A). In step S4167, the CPU 1210 executes proposal generation/presentation processing (see FIG. 42B).

If no improvement measure presentation request has been received, the CPU 1210 determines in step S4171 whether the timing to transmit a proposal message by the cloud server 3310 has come. If the timing to transmit a proposal message has come, the CPU 1210 advances to step S4173 to acquire a transmission destination to which the proposal message will be transmitted. Subsequently, the CPU 1210 performs comparison/statistical processing in step S4165, and performs proposal generation/presentation processing in step S4167.

(Comparison/Statistical Processing)

FIG. 42A is a flowchart showing the procedure of comparison/statistical processing (S4165) according to this embodiment.

In step S4211, the CPU 1210 acquires the analysis information of another lesson using a common education application. In step S4213, the CPU 1210 compares analysis information of the present lesson and analysis information of another lesson to determine the trend of the present lesson.

In step S4215, the CPU 1210 generates statistical information from lesson information and analysis information based on the common education application. In step S4217, the CPU 1210 compares the analysis information of the present lesson with the statistical information based on the common education application, and determines the trend of the present lesson.

(Proposal Generation/Presentation Processing)

Figure 42B:
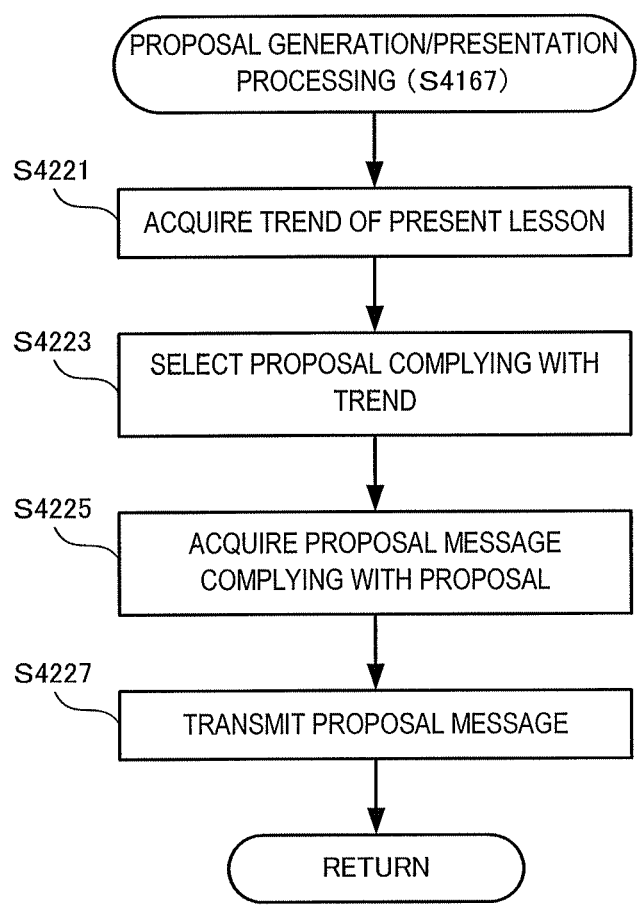
FIG. 42B is flowchart showing the procedure of proposal generation/presentation processing according to the fifth embodiment of the present invention.

FIG. 42B is flowchart showing the procedure of proposal generation/presentation processing (S4167) according to this embodiment.

In step S4221, the CPU 1210 acquires the trend of the present lesson by comparison/statistical processing. In step S4223, the CPU 1210 generates or selects a proposal corresponding to the trend of the present lesson. In step S4225, the CPU 1210 acquires a proposal message corresponding to the proposal. The CPU 1210 then transmits the acquired proposal message to the transmission destination.

According to the fifth embodiment, an improvement measure suited to the goal of a lesson and the environment of the lesson is advised from the cloud server, so the quality can be improved regardless of the specialty of the lesson.

[Sixth Embodiment]

A lesson improvement support system including a cloud server serving as an information processing apparatus according to the sixth embodiment of the present invention will be described next. This embodiment will give an explanation in regard to, for example, a lesson that is conducted by a teacher to students in a classroom, but the present invention is not limited to this. The cloud server according to the sixth embodiment is different from the second to fifth embodiments in that an education application is improved to improve a lesson based on analyzed information. The remaining arrangement and operation are the same as those in the second to fifth embodiments, and a detailed description of the same arrangement and operation will not be repeated.

According to the sixth embodiment, an education application to be provided is improved by referring to many integrated lesson histories, so the quality of an entire lesson can be improved.

The following embodiment will mainly explain an improvement of an education application. Since the improvement of the education application and the update of a device driver that drives a device are sometimes associated with each other, the device driver may also be updated.

<<Lesson Improvement Support System>>

A lesson improvement support system 4300 including a cloud server 4310 serving as an information processing apparatus according to this embodiment will be described with reference to FIGS. 43 and 44. Although a change of an "item" in an education application will be mainly described in the following explanation, the improvement of the education application is not limited to this. The improvement of the education application may be correction of more detailed contents.

(Outline of System)

FIG. 43 is a view showing an outline of the lesson improvement support system 4300 including the cloud server 4310 according to this embodiment. In FIG. 43, the same reference numerals as those in FIG. 29 denote the same building parts, and a description thereof will not be repeated. Collection of pieces of lesson information is the same as that in FIG. 29.

The cloud server 4310 includes an education application DB 4315 that can be improved by the cloud server 4310 itself. Also, the cloud server 4310 includes an education application improver 4316 that improves an education application by using lesson information, intermediate information, analysis information, comparison information, and statistical information that are accumulated in a lesson history DB 3412.

In FIG. 43, the education application DB 4315 stores, for example, an application ID (A0010) for which the items of a lesson proceed in the order of A→B→C . . . . In accordance with an improvement point in the education application improver 4316, the education application DB 4315 is updated into an application ID (A0011) for which the items of the lesson proceed in the order of B→A→C . . . . Note that the time of each item and an image and voice to be used may also be changed.

(Operation Procedure of System)

Figure 44:
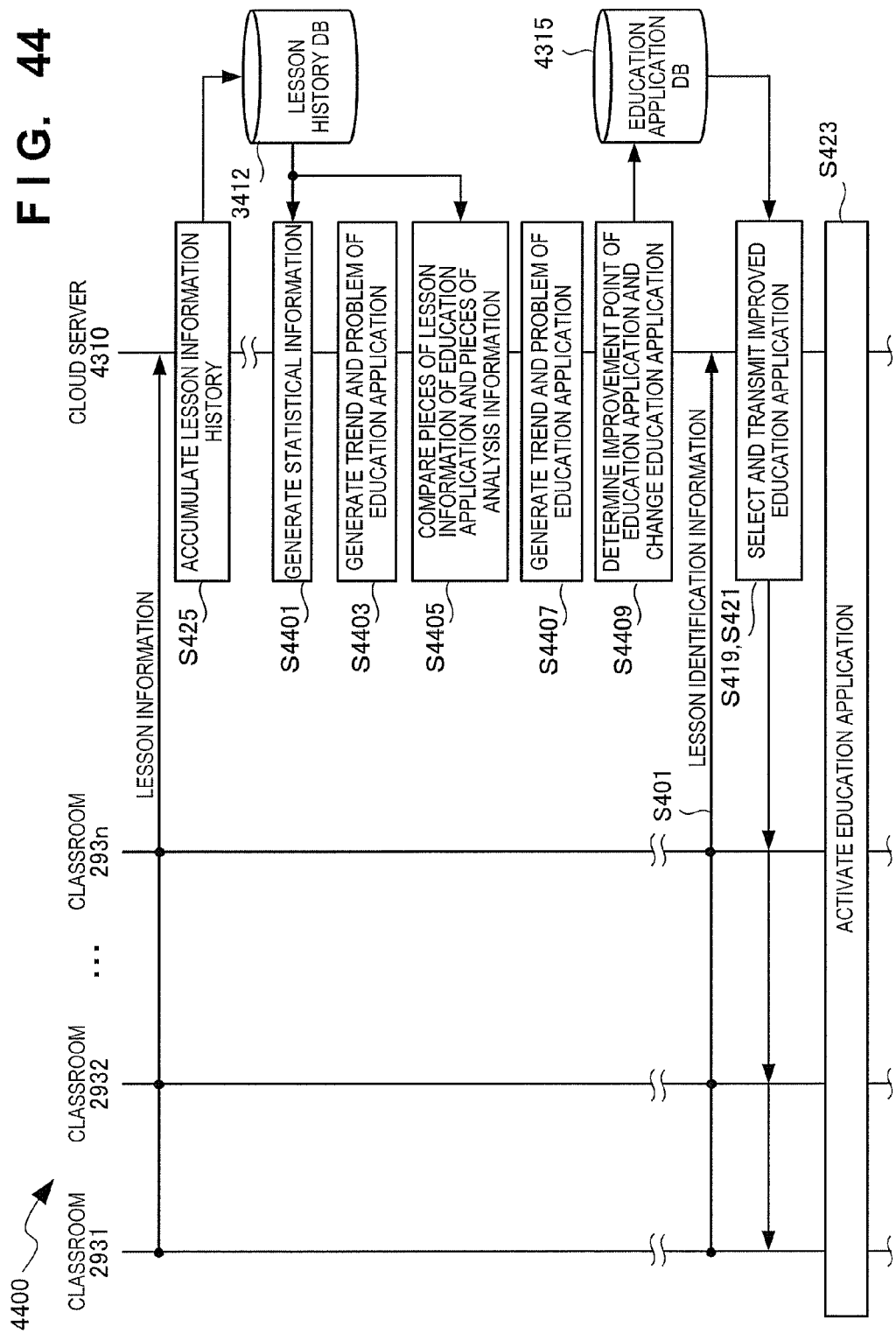
FIG. 44 is a sequence chart showing the operation procedure of the lesson improvement support system including the cloud server according to the sixth embodiment of the present invention.

FIG. 44 is a sequence chart showing an operation procedure 4400 of the lesson improvement support system 4300 including the cloud server 4310 according to this embodiment. In FIG. 44, the same step numbers as those in FIG. 4A denote the same steps, and a description thereof will not be repeated.

In step S4401, the cloud server 4310 generates statistical information of an education application by referring to the lesson history DB 3412. In step S4403, the cloud server 4310 generates the trend and problem of the education application from the generated statistical information of the education application. In step S4405, the cloud server 4310 generates comparison information by comparing pieces of lesson information obtained from lessons using the common education application and pieces of analysis information of them. In step S4407, the cloud server 4310 generates the trend and problem of the education application by referring to the generated comparison information.

In step S4409, the cloud server 4310 refers to the trend and problem of the education application that have been generated in steps S4403 and S4407, decides an improvement point of the education application, and changes the education application.

The subsequent procedure is a procedure until the changed/improved education application is activated, and complies with FIG. 4A. Note that the user may be notified of the change and improvement of the education application.

<<Functional Arrangement of Cloud Server>>

Figure 45:
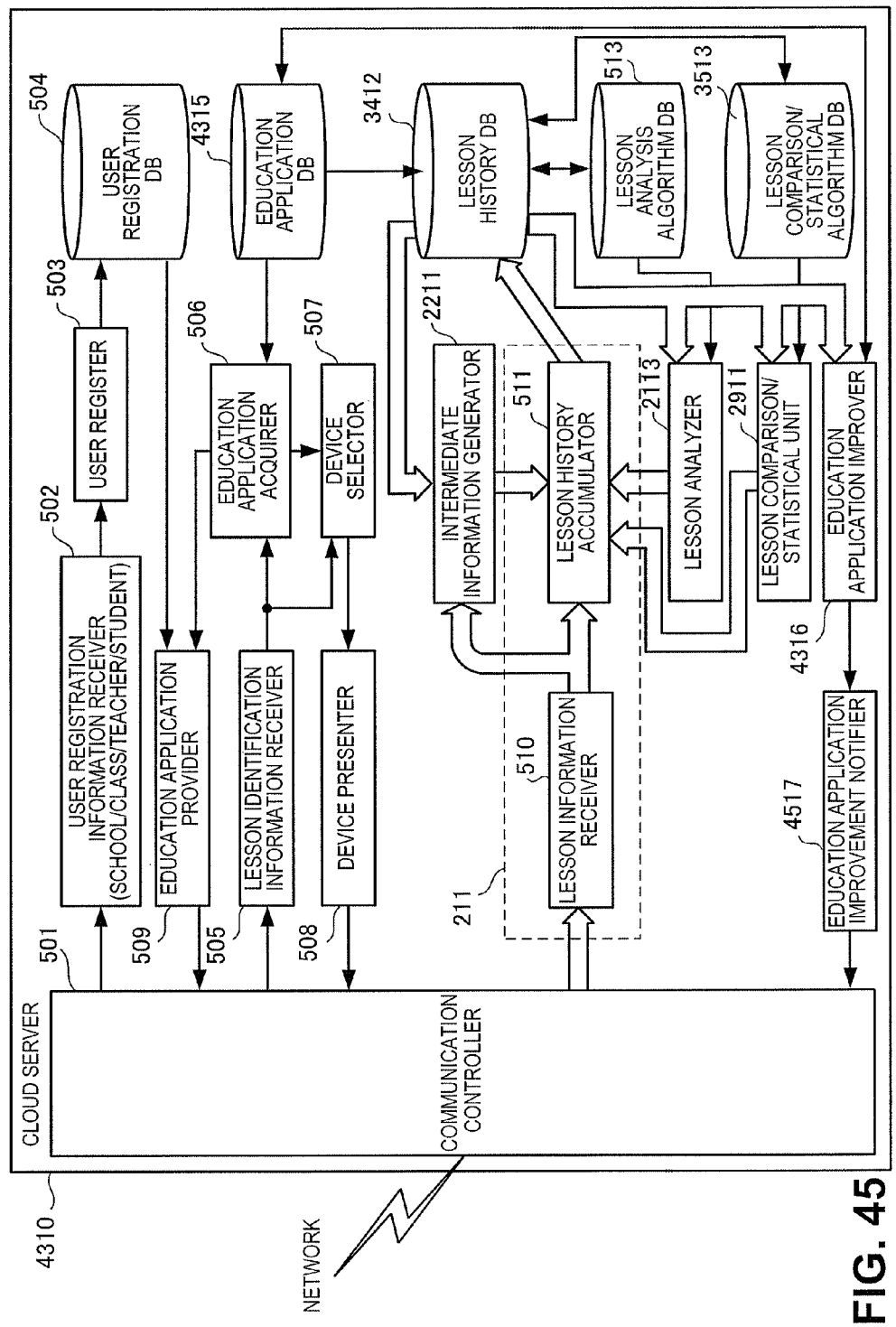
FIG. 45 is a block diagram showing the functional arrangement of the cloud server according to the sixth embodiment of the present invention.

FIG. 45 is a block diagram showing the functional arrangement of the cloud server 4310 according to this embodiment. In FIG. 45, the same reference numerals as those in FIGS. 5, 23, and 35 denote the same functional building parts, and a description thereof will not be repeated.

In FIG. 45, the education application DB 4315 stores an education application that can be improved by the cloud server 4310 itself according to this embodiment. The education application improver 4316 improves an education application by using lesson information, intermediate information, analysis information, comparison information, and statistical information that are accumulated in the lesson history DB 3412. An education application improvement notifier 4517 is an optional functional building part, and if necessary, notifies a user that the education application has been improved.

(Education Application DB)

FIG. 46 is a table showing the characteristic arrangement of the education application DB 4315 according to this embodiment. The education application DB 4315 represents the arrangement of a database added to an education application DB 415 shown in FIG. 8 and an education application DB 3515 shown in FIG. 36A. Note that the arrangement of the education application DB 4315 is not limited to one in FIG. 46.

The education application DB 4315 stores a plurality of versions 4602 in association with an education application ID 4601. The education application DB 4315 stores, in association with each version 4602, an improvement date 4603, an improvement point 4604, an improvement target 4605, a preferable combination driver ID 4606 for this version, and a lesson evaluation 4607 based on this version.

(Lesson Successful Case Analysis Table and Education Application Improvement Table)

Figure 47:
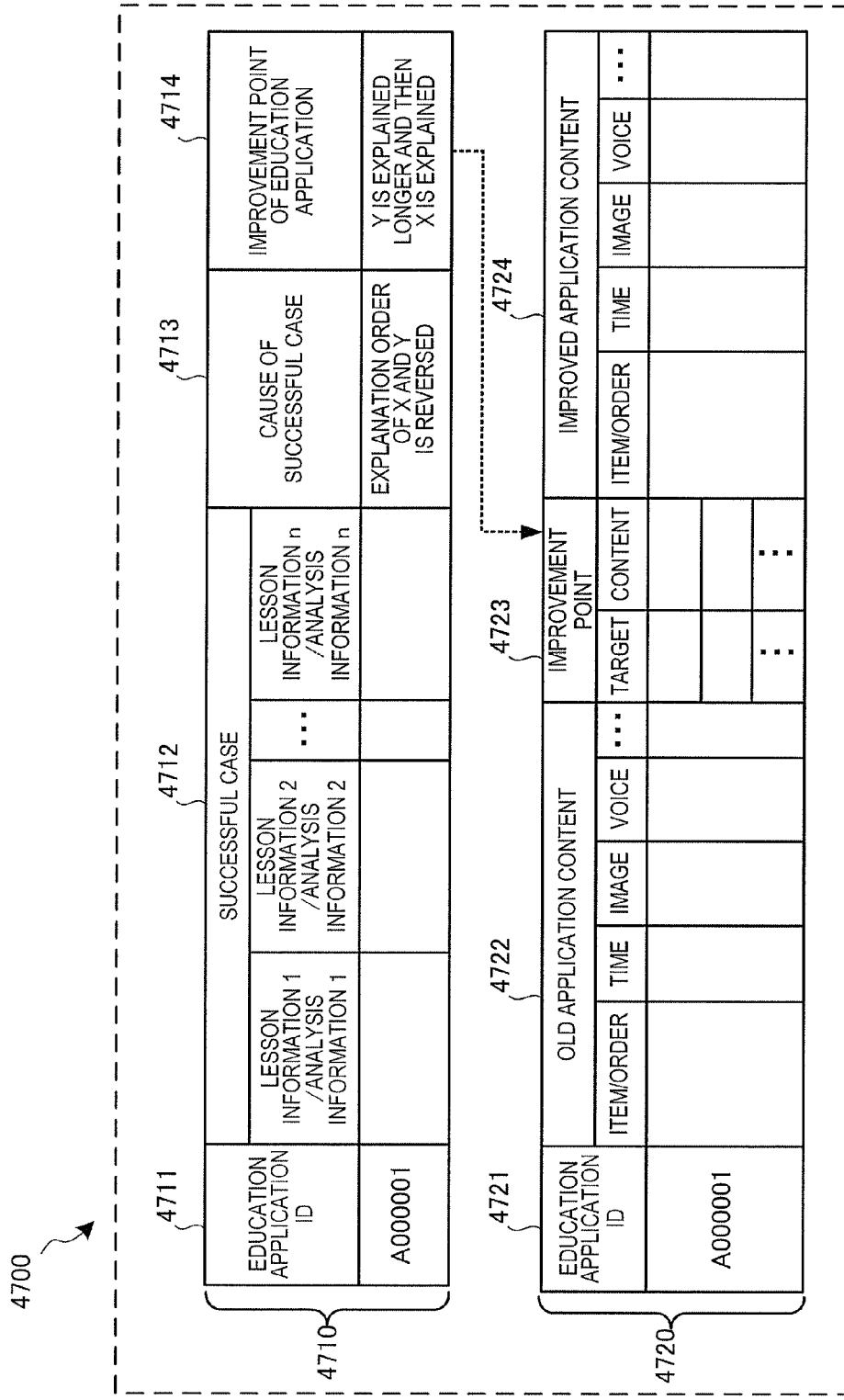
FIG. 47 is a table showing the arrangements of a lesson successful case analysis table and education application improvement table according to the sixth embodiment of the present invention.

FIG. 47 is a table showing an arrangement 4700 of a lesson successful case analysis table 4710 and education application improvement table 4720 according to this embodiment. The lesson successful case analysis table 4710 and the education application improvement table 4720 are stored in a RAM 3840, and used in the education application improver 4316 in order to analyze a lesson history in the lesson history DB 3412 and improve the education application. Although FIG. 47 shows an improvement of the education application based on successful cases of lessons, the analysis of failure cases of lessons may also be used.

The lesson successful case analysis table 4710 stores, in association with an education application ID 4711, a successful case 4712 of a lesson using this education application, a cause 4713 of the successful case, and an improvement point 4714 of the education application for universalizing the cause of the success.

The education application improvement table 4720 stores, in association with an education application ID 4721, an old application content 4722 before improvement, an improvement point 4723 from the lesson successful case analysis table 4710, and an improved application content 4724 after improvement.

<<Processing Procedure of Cloud Server>>

FIG. 48 is a flowchart showing the processing procedure of the cloud server 4310 according to this embodiment. A CPU 1210 in FIG. 38 executes this flowchart using the RAM 3840, thereby implementing the functional building parts in FIG. 45. In FIG. 48, the same step numbers as those in FIG. 17 denote the same steps, and a description thereof will not be repeated. In FIG. 48, some of the same steps as those in FIG. 17 are omitted.

If no user registration data has been received, no lesson identification information has been received, no lesson information has been received, neither a start request nor end request has been received, and no analysis information presentation request has been received, the process advances to step S4881 according to the flowchart of FIG. 17. In step S4881, the CPU 1210 determines whether an education application update timing has come. Note that the update timing is considered to be periodic, be the timing when a serious defect is detected in the education application, or be the timing when a characteristic successful case is reported. However, the update timing is not limited to them. If the update timing is recognized, the CPU 1210 advances to step S4883 to execute lesson successful case analysis processing (see FIG. 49A). In step S4885, the CPU 1210 executes education application (driver) improvement processing (see FIG. 49B).

(Lesson Successful Case Analysis Processing)

FIG. 49A is a flowchart showing the procedure of lesson successful case analysis processing (S4883) according to this embodiment.

In step S4911, the CPU 1210 collects successful cases of lessons using an education application ID from the lesson history DB 3412. In step S4913, the CPU 1210 analyzes pieces of lesson information of the successful cases, and generates comparison information and statistical information. In step S4915, the CPU 1210 analyzes the cause of the successes by using the comparison information and the statistical information.

Note that a procedure to analyze the cause of failures from failure cases is also the same as the above-described procedure.

(Application (Driver) Improvement Processing)

FIG. 49B is a flowchart showing the procedure of education application (driver) improvement processing (S4885) according to this embodiment.

In step S4921, the CPU 1210 specifies an improvement target of the education application that corresponds to the analyzed cause of successes of lessons. In step S4923, if necessary to update the specified improvement target, the CPU 1210 updates the device driver. In step S4925, the CPU 1210 stores the improved education application in the education application DB 4315.

Note that a procedure to analyze the cause of failures from failure cases is also the same as the above-described procedure.

According to the sixth embodiment, an education application to be provided is improved by referring to many integrated lesson histories, so the quality of an entire lesson can be improved.

[Other Embodiments]

The present invention has been described above with reference to the embodiments. However, the present invention is not limited to those embodiments. Various changes understandable by those skilled in the art within the scope of the present invention can be made for the arrangements and details of the present invention. The present invention also incorporates a system or apparatus that somehow combines different features included in the respective embodiments.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention on the computer, a medium storing the program, and a WWW (World Wide Web) server that causes a user to download the program.

This application claims the benefit of Japanese Patent Application No. 2012-222792 filed on Oct. 5, 2012, which is hereby incorporated by reference herein in its entirety.

The invention claimed is:

1. An information processing apparatus comprising:
an education site history accumulator that accumulates a history of pieces of education site information representing reactions or evaluations of education site participants including an educator and an educatee at an education site using an education application software, and the education application software in association with each other;
an education site information receiver that receives, from a communication terminal, the pieces of education site information acquired by the communication terminal or a device connected to the communication terminal; and
an analysis information generator that generates analysis information of the education site from the received pieces of education site information and the history of the pieces of education site information.

2. The information processing apparatus according to claim 1, wherein the analysis information includes information representing a relevance between the education application software, the education site, the educator or the educatee, and the reactions or evaluations of the education site participants.

3. The information processing apparatus according to claim 1, further comprising an analysis information presenter that presents the analysis information to the communication terminal.

4. The information processing apparatus according to claim 1, further comprising a proposal generation presenter that analyzes each education site based on analysis of the analysis information, generates a proposal of an improvement of the education site, and presents the proposal to the communication terminal.

5. The information processing apparatus according to claim 1, to further comprising an education application improver that evaluates the education application software based on the analysis of the analysis information, and generates, updates, or selects education application software to be provided.

6. The information processing apparatus according to claim 1, wherein said analysis information generator generates the analysis information based on comparison information obtained by comparing a plurality of education sites using common education application software, or statistical information from the plurality of education sites.

7. The information processing apparatus according to claim 1, wherein
said education site history accumulator further accumulates a history of correspondences between pieces of education site information, and reactions or evaluations of education site participants recognized from a combination of the pieces of education site information,
the information processing apparatus further comprises an intermediate information generator that generates, as intermediate information, the reactions or evaluations of the education site participants in correspondence with the combination of the pieces of education site information received by said education site information receiver, and
said analysis information generator generates the analysis information by further referring to the intermediate information generated by said intermediate information generator.

8. The information processing apparatus according to claim 1, wherein
said education site history accumulator further accumulates a history of a device used to acquire the pieces of education site information and education content identification information for identifying an education content in association with each other, and
the information processing apparatus further comprises:
an education content identification information receiver that receives the education content identification information from the communication terminal;
a device selector that selects, in correspondence with the received education content identification information, a device to be used to acquire the pieces of education site information; and
a device presenter that presents the selected device to the communication terminal.

9. The information processing apparatus according to claim 1, further comprising:
a descriptor receiver that receives, from the communication terminal, a descriptor for identifying a device connected to the communication terminal; and
a driver selector that selects a device driver corresponding to the received descriptor.

10. The information processing apparatus according to claim 1, wherein the communication terminal includes a portable terminal.

11. A control method of an information processing apparatus, comprising:
accumulating, in an education site history accumulator, a history of pieces of education site information representing reactions or evaluations of education site participants including an educator and an educatee at an education site using an education application software, and the education application software in association with each other;
receiving, from a communication terminal, the pieces of education site information acquired by the communication terminal or a device connected to the communication terminal; and
generating analysis information of the education site from the received pieces of education site information and the history of the pieces of education site information.

12. A non-transitory storage medium storing a control program of an information processing apparatus for causing a computer to execute a method, comprising:
accumulating, in an education site history accumulator, a history of pieces of education site information representing reactions or evaluations of education site participants including an educator and an educatee at an education site using an education application software, and the education application software in association with each other;
receiving, from a communication terminal, the pieces of education site information acquired by the communication terminal or a device connected to the communication terminal; and
generating analysis information of the education site from the received pieces of education site information and the history of the pieces of education site information.

13. A communication terminal comprising:
an education content identification information transmitter that transmits, to an information processing apparatus, education content identification information for identifying an education content;
a device information receiver that receives, from the information processing apparatus, information of a device to be used to acquire education site information selected by the information processing apparatus in correspondence with the transmitted education content identification information;
an education site information transmitter that transmits, to the information processing apparatus, pieces of education site information which have been acquired by the communication terminal or the device connected to the communication terminal, and represent reactions or evaluations of education site participants including an educator and an educatee at an education site using the education application software;
an analysis information receiver that receives, from the information processing apparatus, analysis information of the education site generated by the information processing apparatus from the transmitted pieces of education site information and a history of the pieces of education site information; and
a notifier that notifies the received analysis information.

14. The communication terminal according to claim 13, wherein the analysis information includes information representing a relevance between the education application software, the education site, the educator or the educatee, and the reactions or evaluations of the education site participants.

15. The communication terminal according to claim 13, further comprising a proposal information receiver that receives, from the information processing apparatus, proposal information of an improvement of each education site generated by the information processing apparatus based on analysis of the analysis information, and
wherein said notifier notifies the received proposal information.

16. The communication terminal according to claim 13, further comprising a descriptor transmitter that transmits, to the information processing apparatus, a descriptor which has been acquired from the device connected to the communication terminal and identifies the device, in order to select a device driver corresponding to the descriptor.

17. The communication terminal according to claim 13, wherein the communication terminal includes a portable terminal.

18. A control method of a communication terminal, comprising:
transmitting, to an information processing apparatus, education content identification information for identifying an education content;
receiving, from the information processing apparatus, information of a device to be used to acquire education site information selected by the information processing apparatus in correspondence with the transmitted education content identification information;
transmitting, to the information processing apparatus, pieces of education site information which have been acquired by the communication terminal or the device connected to the communication terminal, and represent reactions or evaluations of education site participants including an educator and an educatee at an education site using the education application software;
receiving, from the information processing apparatus, analysis information of the education site generated by the information processing apparatus from the transmitted pieces of education site information and a history of the pieces of education site information; and
notifying the received analysis information.

19. A non-transitory storage medium storing a control program of a communication terminal for causing a computer to execute a method, comprising:
transmitting, to an information processing apparatus, education content identification information for identifying an education content;
receiving, from the information processing apparatus, information of a device to be used to acquire education site information selected by the information processing apparatus in correspondence with the transmitted education content identification information;
transmitting, to the information processing apparatus, pieces of education site information which have been acquired by the communication terminal or the device connected to the communication terminal, and represent reactions or evaluations of education site participants including an educator and an educatee at an education site using the education application software;

receiving, from the information processing apparatus, analysis information of the education site generated by the information processing apparatus from the transmitted pieces of education site information and a history of the pieces of education site information; and notifying the received analysis information.

20. An education site improvement support system comprising:
   an education site history accumulator that accumulates a history of pieces of education site information representing reactions or evaluations of education site participants including an educator and an educatee at an education site using an education application software, and the education application software in association with each other;
   an education site information acquirer that acquires the pieces of education site information from a communication terminal or a device connected to the communication terminal;
   an analysis information generator that generates analysis information of the education site from the acquired pieces of education site information and the history of the pieces of education site information; and
   a presenter that presents the analysis information from the communication terminal.

21. An education site improvement support method comprising:
   acquiring, from a communication terminal or a device connected to the communication terminal, pieces of education site information representing reactions or evaluations of education site participants including an educator and an educatee at an education site using the education application software;
   generating analysis information of the education site from a history of pieces of education site information acquired from an education site history accumulator that accumulates the history of the pieces of education site information in association with the education application software, and the pieces of education site information acquired by the device; and
   presenting the analysis information from the communication terminal.

* * * * *